(12) United States Patent
Kurita et al.

(10) Patent No.: US 6,741,525 B2
(45) Date of Patent: May 25, 2004

(54) RECORDING AND/OR REPRODUCING APPARATUS EMPLOYING DISC CARTRIDGE

(75) Inventors: Kazuhito Kurita, Kanagawa (JP); Tadami Nakamura, Saitama (JP); Yasuhiro Habara, Kanagawa (JP); Makoto Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/306,226

(22) Filed: Nov. 29, 2002

(65) Prior Publication Data

US 2003/0076749 A1 Apr. 24, 2003

Related U.S. Application Data

(62) Division of application No. 09/555,433, filed as application No. PCT/JP99/05429 on Oct. 1, 1999, now Pat. No. 6,631,112.

(30) Foreign Application Priority Data

Oct. 1, 1998 (JP) .......................... P10-294630
Oct. 1, 1998 (JP) .......................... P10-294631
Oct. 1, 1998 (JP) .......................... P10-294632

(51) Int. Cl.$^7$ .......................... G11B 11/00; G11B 17/04
(52) U.S. Cl. .................... 369/13.12; 369/77.2
(58) Field of Search .................. 369/13.2, 13.21, 369/75.1, 75.2, 77.1, 77.2, 13.12

(56) References Cited

U.S. PATENT DOCUMENTS 5,659,530 A * 8/1997 Kurita ........................ 369/77.2

FOREIGN PATENT DOCUMENTS

| JP | 59-218680 | 12/1984 |
|---|---|---|
| JP | 2-81354 | 3/1990 |
| JP | 5-342685 | 12/1993 |
| JP | 7-98915 | 4/1995 |
| JP | 7-192418 | 7/1995 |
| JP | 8-297900 | 11/1996 |
| JP | 9-282766 | 10/1997 |

* cited by examiner

Primary Examiner—George J. Letscher
(74) Attorney, Agent, or Firm—Oblon, Spivak, McClelland, Maier & Neustadt, P.C.

(57) ABSTRACT

A recording and/or reproducing apparatus includes a base member at least having a rotation driving mechanism for rotationally driving a disc housed in a disc cartridge, a holder into which is inserted the disc cartridge and an ejection lever formed by an elastically flexible lever. The holder is mounted for movement between a first position in which the disc inserted in the disc cartridge is loaded on the rotation driving mechanism and a second position in which the disc housed in the disc cartridge is spaced apart from the rotation driving mechanism. The second position is higher in level than the first position. The ejection lever is elastically flexed by the disc cartridge inserted into the holder from a position protruded into the holder to the position extending along the back side of the holder. When elastically flexed to the position extending along the back surface of the holder, the ejection lever is engaged with the holder moved to the first position. When the holder is moved from the first position to the second position, the ejection lever is disengaged from the holder and is elastically restored in the direction of being intruded into the holder to eject the disc cartridge from the holder.

29 Claims, 34 Drawing Sheets

RECORDING AND/OR REPRODUCING APPARATUS EMPLOYING DISC CARTRIDGE

This application is a division of Ser. No. 09/555,433, filed on Jul. 10, 2000, which is the national stage of PCT/Jp99/05429, filed on Oct. 1, 1999.

TECHNICAL FIELD

This invention relates to a recording and/or reproducing apparatus employing a disc housed in a disc cartridge and a disc cartridge ejection device.

BACKGROUND ART

There has hitherto been employed a disc recording and/or reproducing which has a disc cartridge accommodating therein a disc-shaped recording medium, as an information recording medium, such as an optical disc or a magneto-optical disc, and which is miniaturized to a portable size.

In this sort of the disc recording and/or reproducing apparatus, such an apparatus is now in use in which the disc cartridge is loaded in position for recording and/or reproduction on a main body portion of the recording and/or reproducing apparatus, using a holder supported for rotation by the main body portion of the apparatus having arranged therein a disc rotating and driving mechanism, an optical pickup and a magnetic head representing recording and/or reproducing means.

In this disc recording and/or reproducing apparatus, a cartridge loading unit for loading a disc cartridge is mounted on an upper surface of the main body portion of the apparatus. The holder accommodating and holding the disc cartridge is mounted on the main body portion of the apparatus for rotation between a lowered position towards the cartridge loading unit and an elevated position spaced apart from the cartridge loading unit. When the holder is moved towards the cartridge loading unit, the disc cartridge accommodated and held therein is loaded on the cartridge loading unit. When the disc cartridge, held by the holder, is moved to the elevated position spaced apart from the cartridge loading unit, the disc cartridge is spaced apart from the cartridge loading unit, while being protruded outwardly of the holder.

As an ejection device for protruding the cartridge holder, accommodated and held in the holder, to outside the holder, such a one has hitherto been used which is provided with an ejection lever rotationally operated by the disc cartridge held by the holder. This ejection lever is rotationally supported on a base member arranged in the main body portion of the apparatus and is rotationally biased by a biasing member, provided independently of the ejection lever, in a direction of protruding the disc cartridge held by the holder in a direction protruding from the holder. When the disc cartridge is inserted and held in the pre-set intruded position in the holder, the ejection lever is engaged by a portion of the ejection releasing mechanism provided on the main body portion of the apparatus, so that the ejection lever is held in a state of not thrusting the disc cartridge held by the holder.

If the ejection releasing mechanism is actuated, as the disc cartridge is held by the holder, such that the ejection releasing mechanism is unlocked, the ejection lever is rotated, under the bias of the biasing member, so that the disc cartridge held by the holder is projected outside of the holder.

In the conventional ejection mechanism, at least the ejection lever and the biasing member rotationally biasing this ejection lever are provided independently of each other, whilst there is provided a mechanism for locking the ejection lever when the disc cartridge is inserted and held in the holder, resulting in an increased number of component parts and a complicated structure.

As this sort of the disc recording and/or reproducing apparatus, there is such an apparatus in which a lid is mounted for rotation on the main body portion of the apparatus for overlying the holder. The lid, provided on this apparatus, is rotated in unison with the holder rotation, such that, when the holder has been moved towards the cartridge loading unit, the lid is locked by a lock mechanism provided between the lid and the main body portion to maintain the closed state of the cartridge loading unit. When rotated to a position closing the cartridge loading unit, the lid closes a cartridge entrance/exit aperture provided in the front surface opposite to the proximal end provided with the rotary pivot of the holder. When rotated to a raised position spaced from the main body portion for opening the cartridge loading unit, the lid opens the cartridge entrance/exit aperture provided in the holder.

The lid which is rotated in unison with holder rotation and which when rotated to the lower position closing the cartridge loading unit or to the raised position opening the cartridge loading unit closes and opens the cartridge entrance/exit aperture in the holder, respectively, is rotated in a direction away from the holder to open the cartridge entrance/exit aperture when the lock by the lock mechanism is released to permit the lid to be rotated in a direction away from the holder.

Thus, there is provided a spring member between the lid and the holder for rotating the lid in a direction away from the holder when the lid is released from the locked state by the lock mechanism and is rotated in the upward direction away from the main body portion.

The holder is also provided with a spring member for thrusting and supporting the disc cartridge held by the holder against the cartridge loading unit when the holder is rotated towards the cartridge loading unit. This spring member thrusts and supports the disc cartridge loaded on the cartridge loading unit to prevent the disc cartridge from being floated from the cartridge loading unit to load the disc cartridge in position on the cartridge loading unit. The holder is also provided with a shutter opening/closing member constituted by a spring plate adapted for controlling the movement of a shutter member provided on the disc cartridge held by the holder, permitting relative movement between the main cartridge body portion housing the disc-shaped recording medium and the shutter member and for opening/closing a recording and/or reproducing aperture provided on the main cartridge body portion.

Meanwhile, a spring member, adapted to rotate the lid away from the holder, is formed independently of the lid or the holder, and is mounted on the lid or the holder. Also, the spring member for thrusting and supporting the disc cartridge loaded on the cartridge loading unit and the shutter opening/closing member are formed independently of the lid or the holder and are mounted on the holder using a caulking pin or a set screw.

Thus, in the disc recording and/or reproducing apparatus, in which each spring member is formed independently of the lid or the holder, not only the number of component parts increased and the assembling complicated, but it becomes difficult to reduce the thickness and the size of the apparatus itself more significantly.

If, in a disc recording and/or reproducing apparatus, which has enabled the recording of information signals employing an optical disc, information signals are recorded on an optical disc, the magnetic head is caused to approach to the major surface of the optical disc provided with the signal recording area. In reproducing information signals recorded on the optical disc, there is no necessity for applying an external magnetic field from the magnetic head, so that the magnetic head is moved to a position spaced apart from the major surface of the optical disc. By separating the magnetic head from the optical disc in this manner in case there is no necessity of using the magnetic head, the magnetic head and the optical disc are prevented from being worn out due to relative sliding contact between the magnetic head and the optical disc to improve the durability of the magnetic head and the optical disc.

In a disc recording and/or reproducing apparatus employing, as a recording medium, an optical disc enabling the recording of information signals, a holder rotatably supported by a main body portion of the apparatus, provided with a disc rotating driving unit and an optical pickup constituting recording and/or reproducing means, is used for loading the disc cartridge in position for recording and/or reproduction on the main body portion of the apparatus. This disc recording and/or reproducing apparatus is configured so that a magnetic head is mounted on the distal end of a head supporting arm extended on the holder and so that the head supporting arm is rotationally driven in operative association with holder rotation.

If, in the disc recording and/or reproducing apparatus in which the head supporting arm supporting the magnetic head on a holder rotationally mounted on the main body portion of the apparatus, information signals are to be recorded, the magnetic head is intruded into the holder through a head inserting aperture provided in the holder into sliding contact with the optical disc loaded in the recording and/or reproducing position. If, in this disc recording and/or reproducing apparatus, the disc cartridge is intruded or ejected, as the magnetic head remains intruded into the holder, the disc cartridge collides against the magnetic head to destruct the head.

If, in this sort of the disc recording and/or reproducing apparatus, the disc cartridge is intruded into or ejected from the holder, the magnetic head is moved to an elevated position, further outwardly of the holder from the position of reproducing the information signals recorded on the optical disc, in order to positively prohibit the disc cartridge from colliding against the magnetic head.

Meanwhile, the disc recording and/or reproducing apparatus, employing an optical disc enabling recording of information signals, as a recording medium, the magnetic head position in the vertical direction is controlled depending on the recording mode of recording information signals on the optical disc, reproducing mode of reproducing information signals recorded on the optical disc or the ejection mode of ejecting the optical disc loaded at the recording and/or reproducing position.

The magnetic head is adapted to be uplifted or lowered by causing corresponding movement by a driving motor of an uplifting/lowering control lever designed for uplifting or lowering an uplifting/lowering operating member configured for uplifting/lowering the magnetic head. Meanwhile, the uplifting/lowering operating member and the uplifting/lowering control lever are interconnected by a connecting member.

For controlling the vertical position of the magnetic head depending on the respective operating modes, the magnetic head position is detected by detecting the position of the uplifting/lowering lever, and the driving motor is driven depending on the detected position of the magnetic head to control the magnetic head position. This control is performed by detecting the magnetic head position by detection switches provided in association with the recording mode position, a reproducing mode position and an ejection mode position. If the detection switches are provided in this manner at the respective magnetic head positions to be detected, not only is the number of the detection switches increased, but is the mounting space for the detection switches increased to render it difficult to reduce the size of the disc recording and/or reproducing apparatus.

DISCLOSURE OF THE INVENTION

It is an object of the present invention to provide a novel recording and/or reproducing apparatus and a novel ejection device in which it is possible to resolve the problem inherent in a conventional recording and/or reproducing apparatus.

It is another object of the present invention to provide a recording and/or reproducing apparatus and an ejection device in which it is possible to simplify the mechanism and to reduce the number of component parts and the size of the apparatus itself.

It is still another object of the present invention to provide a recording and/or reproducing apparatus in which the mechanism for detecting the position of the magnetic head uplifted and lowered to plural positions depending on the operating mode to simplify the apparatus.

It is still another object of the present invention to provide a recording and/or reproducing apparatus in which the magnetic head can be protected reliably.

It is still another object of the present invention to provide a recording and/or reproducing apparatus in which a disc cartridge can be reliably intruded into and ejected from the holder.

It is still another object of the present invention to provide a recording and/or reproducing apparatus in which a disc cartridge can be positively supported in a cartridge loading unit provided on the disc recording and/or reproducing apparatus to permit the disc to be rotationally driven in a stable state.

It is yet another object of the present invention to provide a recording and/or reproducing apparatus in which the shutter member can be reliably opened or closed in association with the disc cartridge intrusion and ejection.

The recording and/or reproducing apparatus of the present invention, proposed for accomplishing the above object, includes a base member at least having a rotation driving mechanism for rotationally driving a disc housed in a disc cartridge, a holder into which is inserted the disc cartridge, and an ejection lever formed by an elastically flexible lever. The holder is mounted for movement between a first position in which the disc inserted in the disc cartridge is loaded on the rotation driving mechanism and a second position in which the disc housed in the disc cartridge is spaced apart from the rotation driving mechanism, the second position being higher in level than the first position. The ejection lever is elastically flexed by the disc cartridge inserted into the holder from a position protruded into the holder to the position extending along the back side of the holder. When elastically flexed to the position extending along the back surface of the holder, the ejection lever is engaged with the holder moved to the first position.

As the holder is moved from the first position to the second position, the releasing portion provided on the holder operates the engaging portion provided on the ejection lever to disengage the holder to restore the ejection lever in a direction of being projected into the holder to project the disc cartridge from the holder.

The recording and/or reproducing apparatus according to the present invention also includes an optical pickup device mounted for movement along the radius of the disc housed in a disc cartridge loaded on a rotation driving mechanism and a magnetic head device mounted facing the optical pickup device on the holder. This magnetic head device is moved along the disc radius in unison with the optical pickup device to record information signals on the disc in cooperation with the optical pickup device.

The recording and/or reproducing apparatus also includes an uplifting/lowering mechanism adapted to be moved between a position of descent protruded into the holder through an opening provided in the magnetic head device and an uplifted position released from the holder opening and spaced apart from the holder, so that, with movement of the holder, the magnetic head device is moved between the first and second positions with holder movement.

The magnetic head device also includes a magnetic head portion and a supporting arm carrying the magnetic head portion at its distal end and which is mounted for rotation between a position of descent and an uplifted position. The uplifting/lowering mechanism includes an uplifting/lowering actuating portion for rotationally driving the supporting arm, a driving portion for driving the uplifting/lowering portion and a detecting portion for detecting the position of the driving portion. The operation of the driving portion is controlled based on a detection output from the detecting portion.

The driving portion includes a control lever engaged with the uplifting/lowering portion when the holder is at the first position, and a motor for driving the control lever. The detecting portion detects the position of the control lever, whilst the motor is controlled based on the detection output from the detecting portion. This driving portion is controlled so as to be driven n the direction of transiently moving the magnetic head device to the uplifted position after power up of the apparatus.

The recording and/or reproducing apparatus according to the present invention includes a base member provided on a main body portion of the apparatus and having a loading unit on which is loaded a disc housed in a disc cartridge having a shutter for opening/closing a recording and/or reproducing aperture adapted to cause the disc to face outwards, a holder into which is inserted the disc cartridge, a lid rotationally mounted on the main body portion of the apparatus for rotation along with the holder, an ejection lever formed by an elastically flexible lever and which is elastically flexed by the disc cartridge inserted into the holder from a position protruded into the holder to the position extending along the back side of the holder, and a lock mechanism for locking the lid at the position of closing the loading unit. The holder is mounted for movement between a first position in which the disc inserted in the disc cartridge is loaded on the rotation driving mechanism and a second position in which the disc housed in the disc cartridge is spaced apart from the rotation driving mechanism, with the second position being higher in level than the first position. When elastically flexed to a position extending along the back surface of the holder, the ejection lever is engaged with the holder moved to the first position. The ejection lever is disengaged from the holder when the holder is moved towards the second position.

The recording and/or reproducing apparatus also includes an optical pickup device movable along the radius of the disc housed in the disc cartridge loaded on the rotation driving mechanism and a magnetic head device mounted on the holder for facing the optical pickup device. The magnetic head device is movable along the radius of the disc as one with the optical pickup device.

The holder is integrally formed by an elastic flexing piece comprised of a thrusting portion for thrusting the intruded disc cartridge to the loading unit and a biasing portion for biasing the lid from the closure position in a direction of opening the loading unit, and an opening actuating unit for moving the shutter of the intruded disc cartridge in a direction of opening the recording and/or reproducing aperture. The elastic flexing piece is formed by the thrusting portion and the biasing portion each with urging operating in contrary directions. The holder has a shutter holding portion holding the shutter in the position of opening the recording and/or reproducing aperture. The shutter holding portion is engaged with the shutter to move the shutter in a direction of closing the recording and/or reproducing aperture when the disc cartridge is ejected by the ejection lever.

The recording and/or reproducing apparatus according to the present invention also includes a base member provided on a main body portion of the apparatus and having a loading unit on which is loaded a disc housed in a disc cartridge having a shutter for opening/closing a recording and/or reproducing aperture adapted to cause the disc to face outwards, a holder into which is inserted the disc cartridge, a lid rotationally mounted on the main body portion of the apparatus for rotation along with the holder and rotation along with the holder, and a lock mechanism for locking the lid at a position of closing the loading unit. The holder is mounted for movement between a first position in which the disc inserted in the disc cartridge is loaded on the rotation driving mechanism and a second position in which the disc housed in the disc cartridge is spaced apart from the rotation driving mechanism, with the second position being higher in level than the first position. The holder is integrally formed by an elastic flexing piece comprised of a thrusting portion for thrusting the intruded disc cartridge to the loading unit and a biasing portion for biasing the lid from the closure position in a direction of opening the loading unit, and an opening actuating unit for moving the shutter of the intruded disc cartridge in a direction of opening the recording and/or reproducing aperture.

Other objects and advantages of the present invention will become apparent from the following description which is made with reference to the accompanying drawings.

BEST MODE FOR CARRYING OUT THE INVENTION

An embodiment of the present invention, as applied to a disc recording and/or reproducing apparatus employing an optical disc as a recording medium is hereinafter explained.

Figure 1:
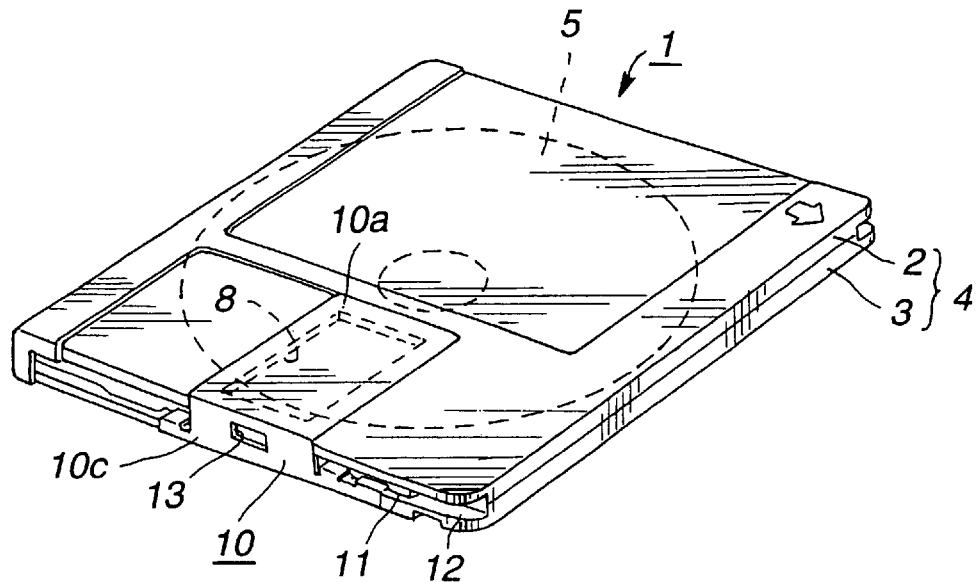
FIG. 1 is a perspective view showing a disc cartridge used in a disc recording and/or reproducing apparatus according to the present invention.
Figure 2:
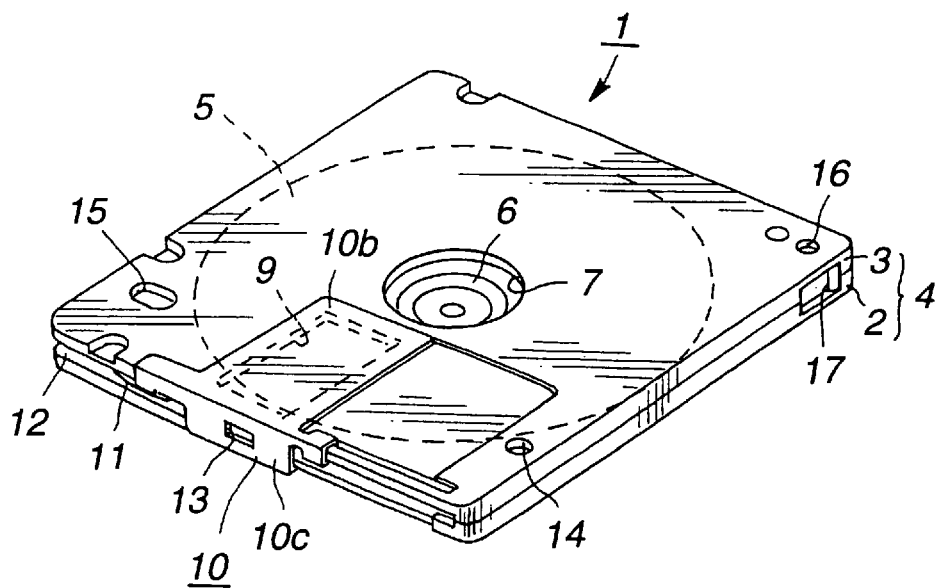
FIG. 2 is a perspective view showing the lower surface of the disc cartridge.

First, a disc cartridge employed in a disc recording and/or reproducing apparatus according to the present invention is explained. Referring to FIGS. 1 and 2, an optical disc 5, enabling the recording of the information signals, is rotationally accommodated in a main cartridge body unit 4 formed on abutting an upper cartridge half 2 and a lower cartridge half 3 to each other and combining them together. At a mid portion of the lower surface of the main cartridge body unit 4 is bored a center aperture 7 through which a disc hub 6 having its center mounted on the optical disc 5 accommodated in the main cartridge body unit 4 is exposed to outside, as shown in FIG. 2. In upper and lower surfaces of the main cartridge body unit 4, facing each other, there is bored a recording and/or reproducing aperture 9 for exposing a portion of a signal recording area on the major surface of the optical disc 5 housed in the main cartridge body unit 4 to outside across the inner and outer rims of the disc. These apertures 8, 9 are formed at a mid portion in the left-and-right direction of the main cartridge body unit 4 for extending from the vicinity of the mid portion of the main cartridge body unit 4 towards a lateral side of the main cartridge body unit 4.

On the main cartridge body unit 4, there is movably mounted a shutter member 10 adapted for opening/closing the recording aperture 8 and the recording and/or reproducing aperture 9. The shutter member 10 is formed by warping a thin metal plate to a U-shaped cross-section and is mounted as by fitting from a lateral side of the main cartridge body unit 4 for movement along a lateral side of the main cartridge body unit 4. When the shutter member 10 is closing the apertures 8, 9, it is locked by a shutter lock member 11 provided in the main cartridge body unit 4 and thereby controlled with respect to movement. When the disc cartridge 1 is intruded into the holder, the shutter member 10 is released from the locked state by the shutter lock member 11 and is moved in a direction of opening the apertures 8, 9.

In a mid portion of a connecting piece 10c interconnecting shutter portions 10a, 10b, respectively closing the recording aperture 8 and the recording and/or reproducing aperture 9 of the shutter member 10, there is bored an engagement opening 13 engaged by a movement controlling member provided on the holder.

A groove 12 for intrusion by the shutter member 10 is formed for opening in a lateral surface of the main cartridge body unit 4 along which is moved the shutter member 10.

The disc cartridge 1, thus constructed, is intruded into the holder with the lateral side in which is opened the groove 12 as an intruding end.

In the lower surface of the main cartridge body unit 4 are formed a pair of positioning holes 14, 15 on both lateral sides of the recording and/or reproducing aperture 9, as shown in FIG. 2. In the main cartridge body unit 4, there are also provided a mistaken recording detection opening 16 for verifying whether or not information signals can be recorded on the optical disc 5 and a mistaken recording inhibiting member 17 for opening/closing this mistaken recording inhibiting member 16, as shown in FIG. 2.

Figure 3:
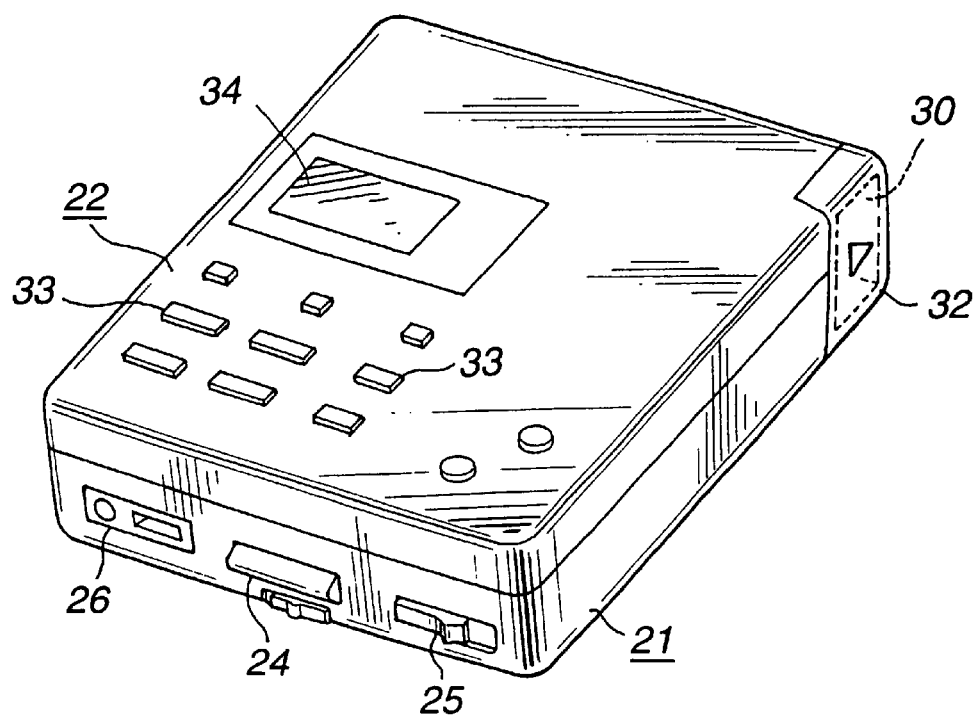
FIG. 3 is a perspective view showing a lateral surface of the dics recording and/or reproducing apparatus according to the present invention.
Figure 4:
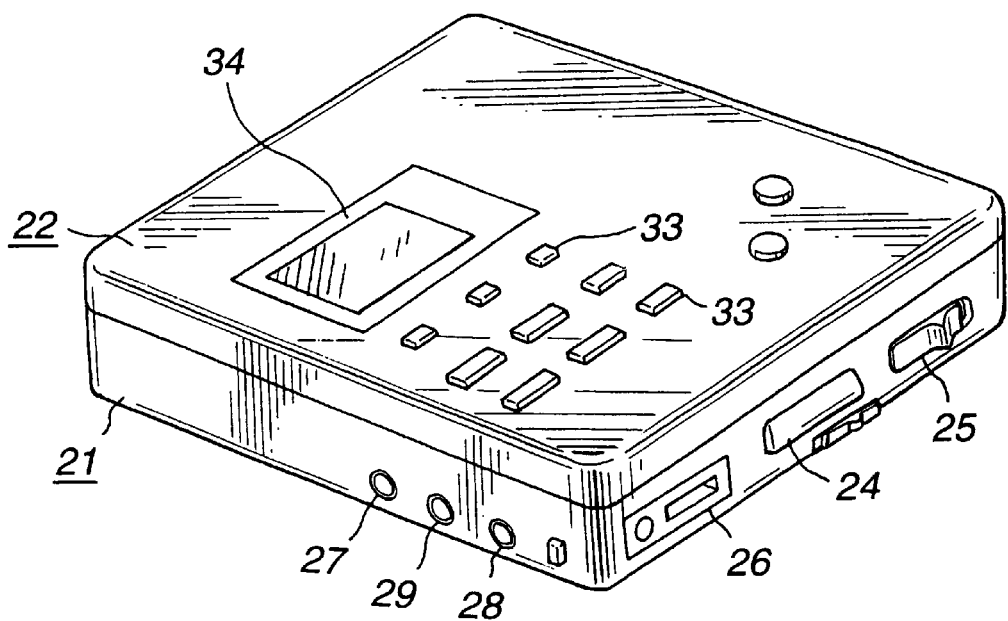
FIG. 4 is a perspective view showing the other edge side of a disc recording and/or reproducing apparatus according to the present invention.
Figure 5:
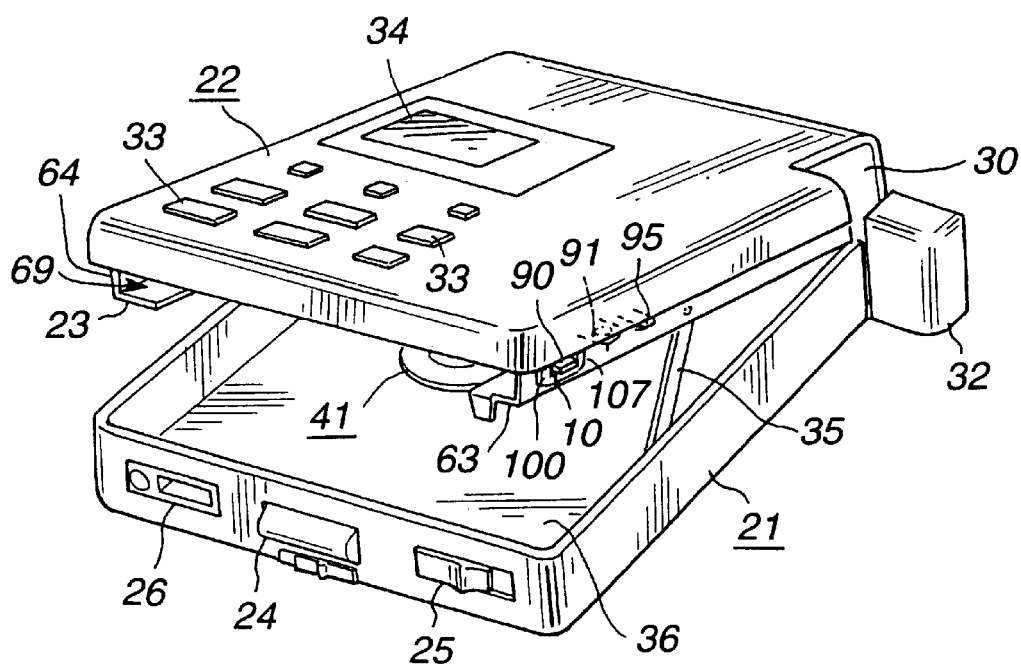
FIG. 5 is a perspective view of a disc recording and/or reproducing apparatus showing the opened state of a lid.

The disc recording and/or reproducing apparatus, employing the holder device of the present invention in which is inserted and held the above-described disc cartridge 1, includes a main body portion 21, a lid 22 for opening/closing a cartridge loading unit provided on an upper surface of the main body portion 21, and a holder 23, positioned between the main body portion 21 and the lid 22 and rotationally driven in operative association with the lid 22 to load the disc cartridge on the cartridge loading unit provided on the main body portion 21, as shown in FIGS. 3 to 5. The main body portion 21 houses therein a disc rotating driving unit for rotationally driving the optical disc 5 housed in the disc cartridge 1 mounted on the recording and/or reproducing apparatus to record information signals, and an optical pickup device constituting a recording and/or reproducing mechanism adapted to record and/or reproduce information signals for the optical disc 5.

The main body portion 21 is formed as a substantially rectangular casing and, as shown in FIGS. 3 and 4, includes, on a front surface, a lid opening actuating button 24 for releasing the lock of the lid 22 locked at the position of closing the upper surface of the main body portion 21, a recording mode selection button 25 for selecting the recording mode, and a remote controller selection unit 26 to which is connected a remote controller for remote-controlling the disc recording and/or reproducing apparatus as shown in FIGS. 3 and 4. On a lateral surface of the main body portion 21, there are provided input/output jacks 27, 28 for connection to an external equipment and a microphone connection jack 29, as shown in FIG. 4. On the back side of the main body portion 21, there is provided a cell housing unit 30 housing a cell adapted to supply the power used for driving the disc recording and/or reproducing apparatus. The insertion and removal of the cell to or from the cell housing unit 30 is through a cell insertion/removal opening provided in the opposite lateral surface of the main body portion 21. The cell insertion/removal opening is opened/closed by a cell lid 32 mounted on the main body portion 21.

On the upper surface of the lid 22, there are provided plural operating mode selection buttons 33 for selecting the operating mode of the present disc recording and/or reproducing apparatus and a display unit 34 employing a liquid crystal display panel adapted to display the contents of information signals being recorded and/or reproduced or the operating state, as shown in FIG. 3.

The lid 22 is rotationally mounted on the main body portion 21, by having its proximal end secured to a rotation supporting member rotationally mounted on the back side of the main body portion 21, to open/close the upper surface of the main body portion 21. Between the lateral side of the lid 22 and the main body portion 21 is connected a rotary arm 35 for realizing stable rotation of the lid 22, as shown in FIG. 5.

Within the interior of the main body portion 21 is mounted a base member 36 carrying a disc rotating driving unit and the optical pickup device making up the recording and/or reproducing unit of the disc recording and/or reproducing apparatus. This base member 36 is formed of a tough metal plate as a flat rectangular plate large enough in size to be accommodated in the main body portion 21, as shown in FIGS. 6 and 7.

On the upper surface of the base member 36 is mounted a cartridge loading unit 37 on which the disc cartridge 1 used for this disc recording and/or reproducing apparatus is loaded in position. On the upper surface of the base member 36 carrying the cartridge loading unit 37, there are formed a pair of positioning pins 38, 39 engaging in a pair of positioning pins 38, 39 engaged in positioning openings 14, 15 provided on the disc cartridge 1. The disc cartridge 1 is loaded on the cartridge loading unit 37 in position by having the positioning openings 14, 15 engaged by the positioning pins 38, 39, respectively. On the upper surface of the base member 36, there is provided a cartridge detection switch 40 for detecting the loading of the disc cartridge 1 on the cartridge loading unit 37.

Figure 6:
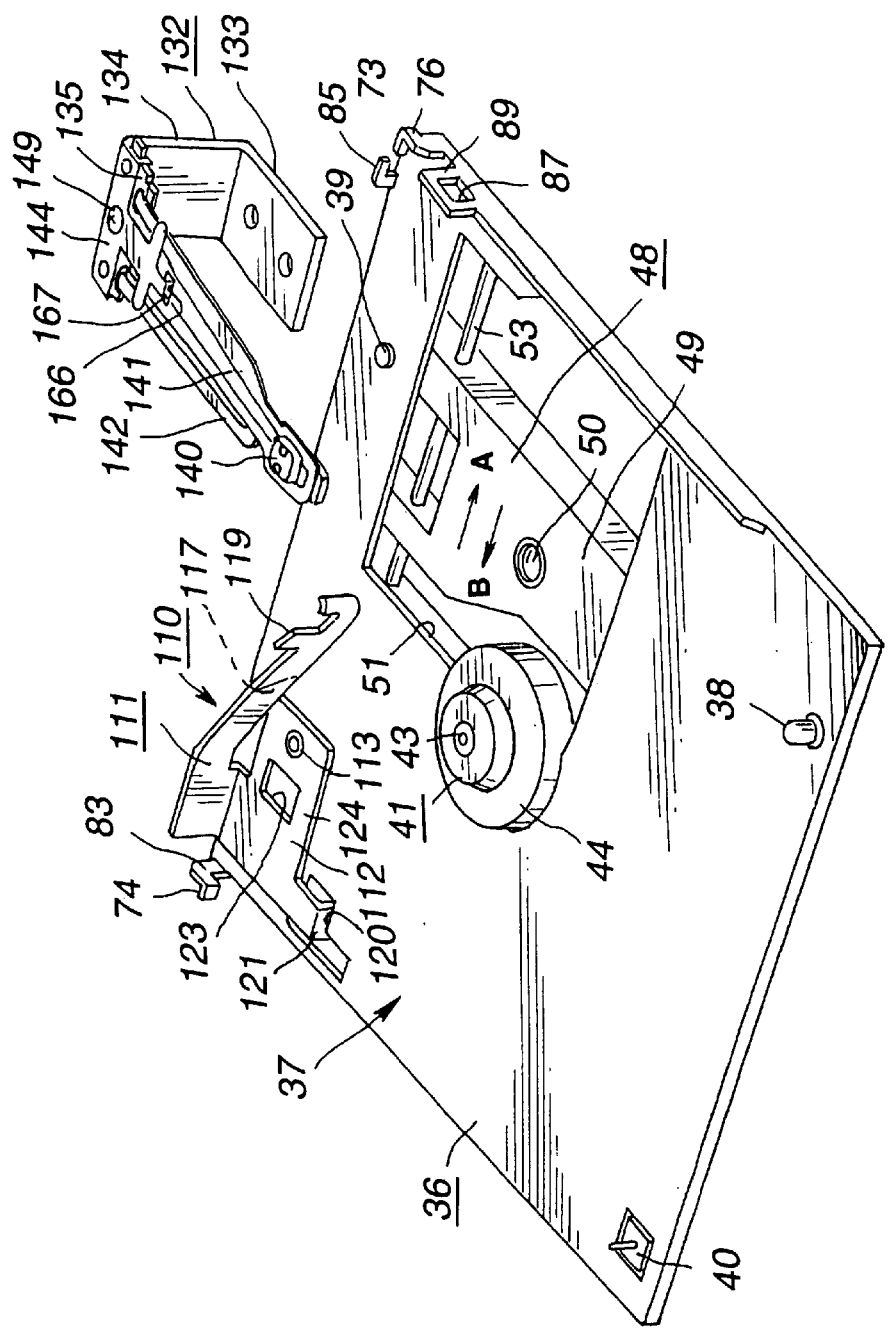
FIG. 6 is an exploded perspective view showing a recording and/or reproducing unit of the disc recording and/or reproducing apparatus according to the present invention.
Figure 7:
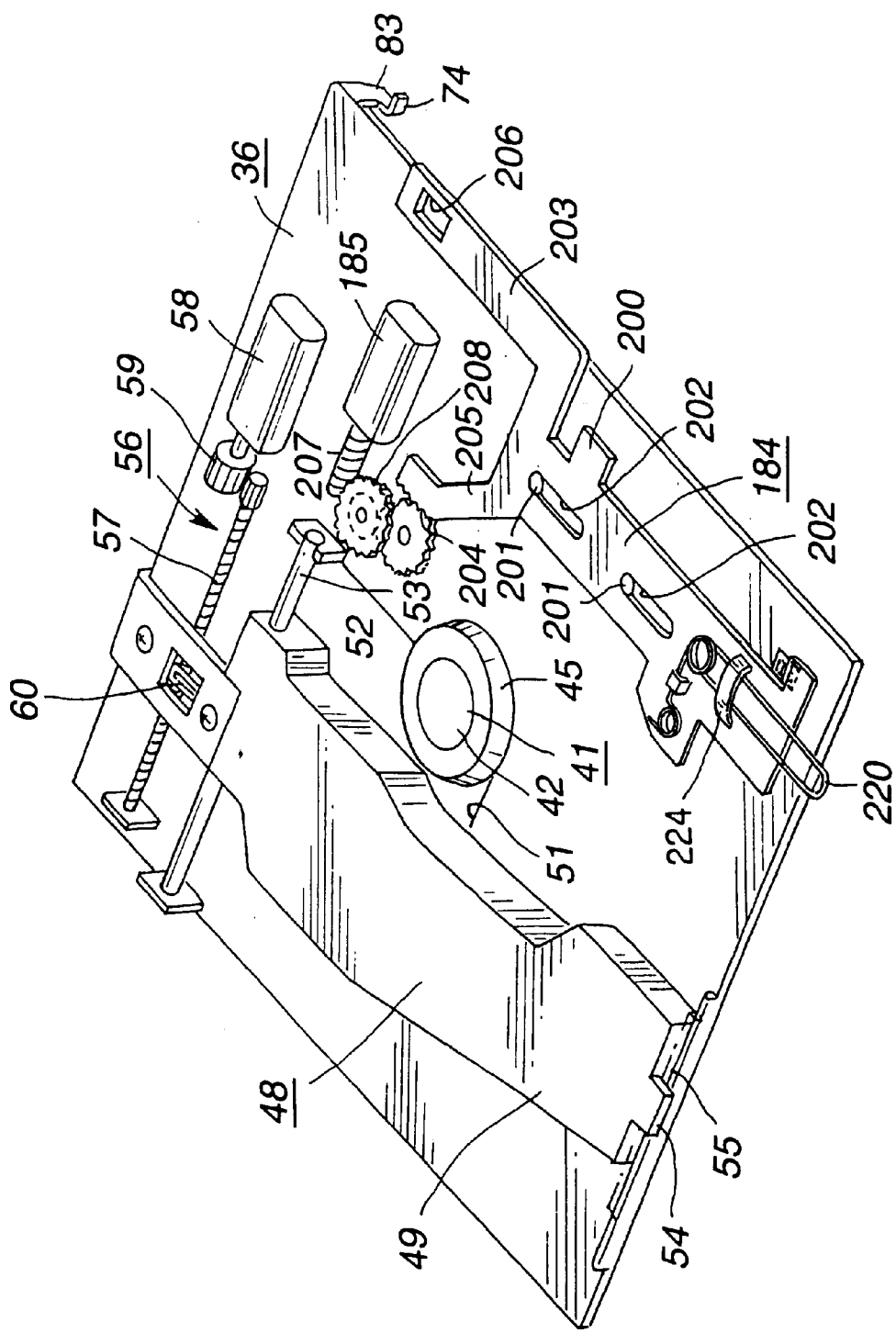
FIG. 7 is a perspective view showing the bottom surface of a base member carrying the recording and/or reproducing unit.

At a mid portion of the base member 36, there is mounted a disc rotating driving unit 41 for rotationally driving the optical disc 5 housed in the disc cartridge 1 loaded on the cartridge loading unit 37, as shown in FIG. 6. The disc rotating driving unit 41 includes a spindle motor 42 and a disc table 44 mounted on a spindle 43 of the spindle motor 42 for rotation in unison therewith, as shown in FIGS. 6 and 7. The spindle motor 42 is mounted on the lower surface of the base member 36 via a motor mounting plate 45, with the spindle 43 protruding on the upper surface of the base member 36, as shown in FIG. 6. The disc table 44 is mounted as-one with the distal end of the spindle 43 protruded on the upper surface of the base member 36, as shown in FIG. 6.

When the disc cartridge 1 is loaded on the cartridge loading unit 37, the optical disc 5, housed in the disc cartridge 1, is set on the disc table 44 of the disc rotating driving unit 41, and is clamped for rotation in unison with the disc table 44 as the disc hub 6 is centered by being attracted by a magnet, not shown, provided on the disc table 44.

An optical pickup device 48, clamped on the disc table 44, and adapted to radiate an light beam scanning the signal recording area of the optical disc 5 rotationally driven in unison by the disc table 44, is mounted on the base member 36. The optical pickup device 48 includes an optical block 49, enclosing optical elements, such as a semiconductor laser as a light source for radiating a light beam scanning the signal recording surface of the optical disc 5, photodetector element, for detecting the return light beam reflected back from the optical disc 5, and a beam splitter for separating the return light beam reflected back from the optical disc. The optical pickup device 48 also includes an objective lens 50 for converging and radiating the light beam radiated from the semiconductor laser on the signal area of the optical disc 5, and a biaxial actuator for driving and displacing the objective lens 50 along the optical axis and in a plane perpendicular to the optical axis of the objective lens 50 in such a manner that the light beam illuminated via the objective lens 50 on the optical disc 55 will be focussed on the signal recording area of the optical disc to follow the recording track formed on the optical disc.

The optical pickup device 48 is provided on the lower surface of the base member 36 so that the objective lens 50 will face the major surface of the optical disc 4 set on the optical disc 5, as shown in FIG. 6. The optical pickup device 48 is supported for movement in a direction towards and away from the disc table 44 by having a guide shaft 53 mounted on the lower surface of the base member 36 passed through a shaft through-hole 52 provided in one end of an optical block 49 and by having a guide supporting portion 54 formed at the other end of the optical block 49 engaged by a guide piece 55 formed by bending the guide support 54 at the opposite end of the optical block 49 towards a lateral side of the base member 36 in parallel with the guide shaft 53, as shown in FIG. 7.

The optical pickup device 48 is fed by an optical pickup feed unit 56 provided on the lower surface of the base member 36 so that the optical pickup device 48 is moved in a direction towards and away form the disc table 44 under guidance by the guide shaft 53 and the guide piece 55. The optical pickup unit 56 includes a feed screw 57 mounted on the lower surface of the base member 36 parallel to the guide shaft 53 and a feed motor 58 for rotationally driving the feed screw 57. The feed screw 57 is connected to a driving shaft of a feed motor 58 through a connection gearing 56. The optical pickup device 48 is connected to the optical pickup feed unit 56 by having a screw engagement piece 60 mounted on an end of the optical block 49 engaged by the feed screw 57. If the feed motor 58 of the optical pickup feed unit 56 is driven to run the feed screw 57 into rotation, the optical pickup device 48 is fed in the direction indicated by arrows A and B, that is in a direction towards and away from the disc table 44, under guidance by the guide shaft 53 and the guide piece 55, by the screw engagement piece 60 being moved under guidance by screw threads of the feed screw 57.

Since the optical pickup device 48 is supported by the guide shaft 53 and the guide piece 55 so that the optical axis of the objective lens 50 will be on the centerline of the disc table 44, the signal recording surface of the optical disc 5 can be correctly scanned across its inner and outer rims by a light beam illuminated through the objective lens 50.

Figure 8:
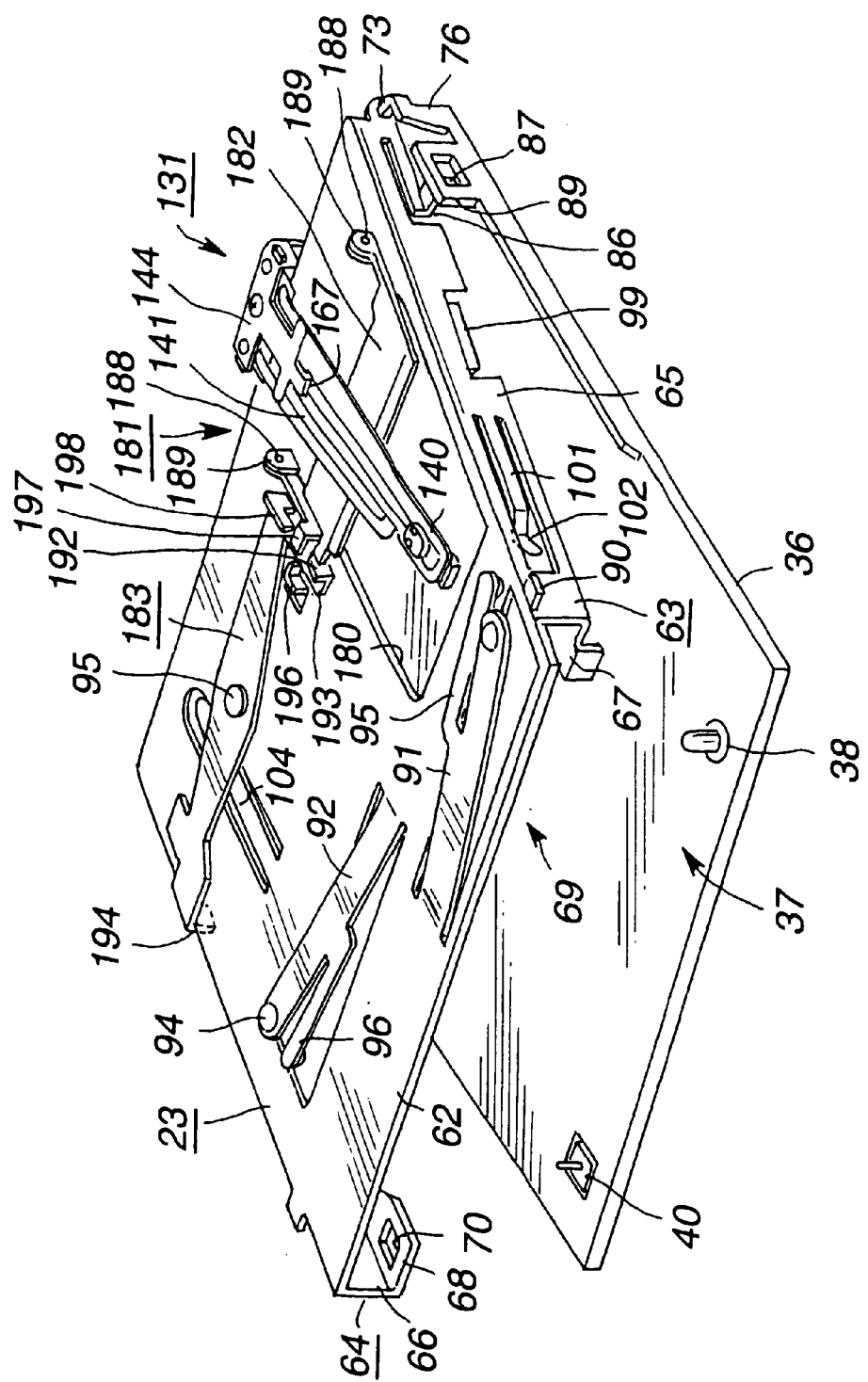
FIG. 8 is a perspective view showing a state a holder is mounted on the base member.
Figure 9:
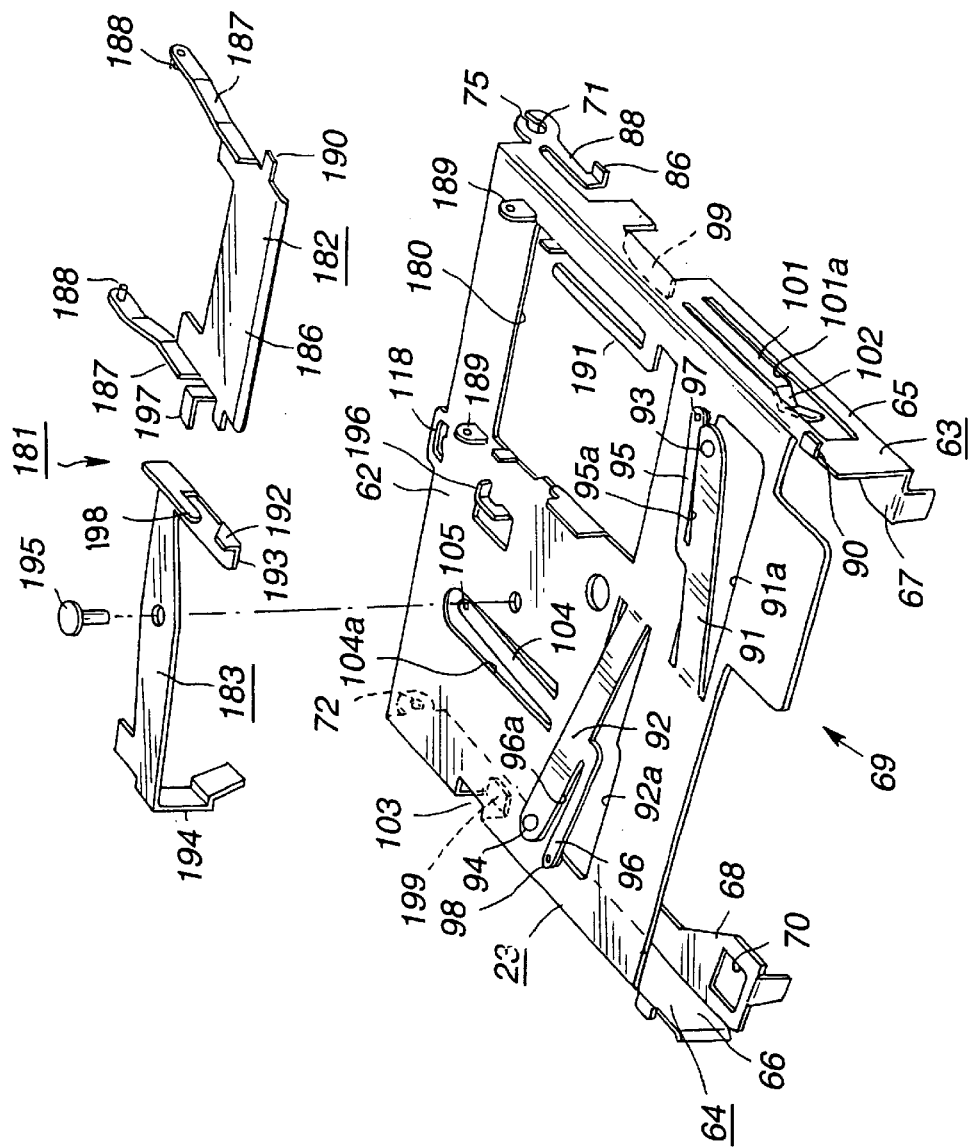
FIG. 9 is a perspective view showing a holder used in the disc recording and/or reproducing apparatus according to the present invention.

On the upper surface of the base member 36 carrying the cartridge loading unit 37, the holder 23 for loading the cartridge loading unit 1 on the cartridge loading unit 37 is rotationally mounted, as shown in FIG. 8. The holder 23 is formed by warping a thin metal sheet, such as a stainless steel sheet, and is dimensioned to accommodate and hold the disc cartridge 1 therein. Referring to FIGS. 8 and 9, the holder 23 has a substantially rectangular ceiling plate 62, dimensioned to cover the upper surface of the disc cartridge 1. On both lateral sides of the ceiling plate 62, there are formed first and second cartridge holding units 63, 64 adapted for supporting both lateral sides of the disc cartridge 1 inserted into the holder 23. These cartridge holding units 63, 64 are made up of sidewall sections 65, 66, formed by vertically warping the distal ends of the ceiling plate 62, and cartridge supporting pieces 67, 68 formed by warping the distal ends of the sidewall sections 65, 66 in parallel with the ceiling plate 62.

An open area of the holder 23, defined between the first and second cartridge holding units 63, 64, on the front side perpendicular to both lateral sides carrying the first and second cartridge holding units 63, 64, serves as a cartridge entrance/ejection opening 69, through which the disc cartridge 1 is introduced into the space between the first and second cartridge holding units 63, 64. The disc cartridge 1, introduced into the holder 23, is carried by the first and second cartridge holding units 63, 64 on one lateral side thereof carrying the shutter member 11 and the lateral side thereof opposite to the shutter member carrying side.

In the distal end of the cartridge supporting piece 68 of the cartridge holding unit 64, there is bored a switch opening 70 through which a cartridge detection switch 40 provided on the base member 36 is protruded into the holder 23 when the holder 23 is rotated towards the cartridge loading unit 37.

Figure 10:
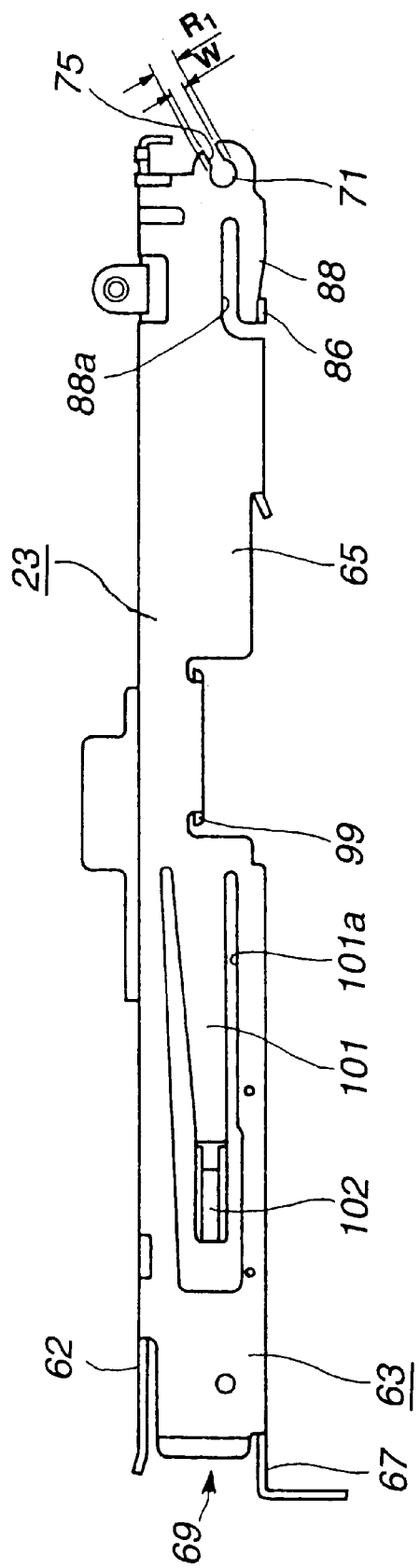
FIG. 10 is a side view showing a side of the holder.
Figure 11:
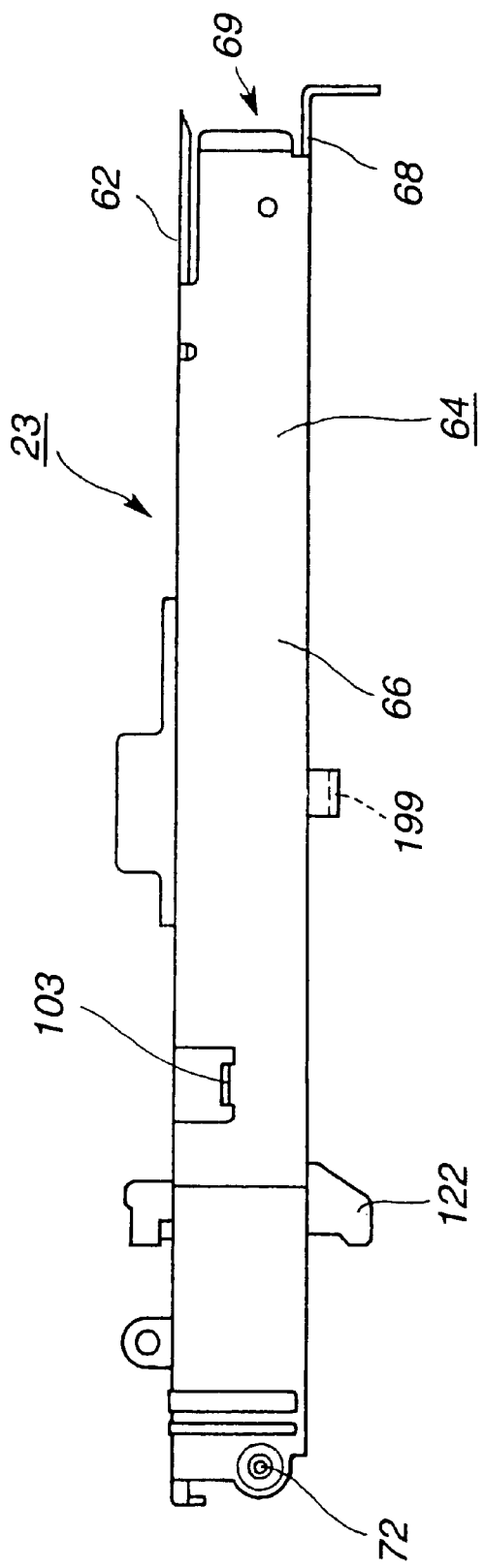
FIG. 11 is a side view showing the other side of the holder.

Referring to FIGS. 10 and 11, the holder 23 is rotatably supported by the base member 36 by engaging first and second shaft openings 71, 72 in the proximal end of the sidewall sections 65, 66 of the first and second cartridge holding units 63, 64 engaged by first and second shafts 73, 74 formed on both sides of the proximal end of the base member 36, as shown in FIG. 6.

In the proximal end of the sidewall section 65 provided with the first shaft opening 71 is formed a cut-out 75 communicating with the first shaft opening 71. This cut-out 75 is engaged by the first shaft 73 which is to be engaged in the first shaft opening 71 when the holder 23 is mounted on the base member 36. This cut-out 75 is formed for being inclined from the first shaft opening 71 towards the ceiling plate 62.

Figure 12:
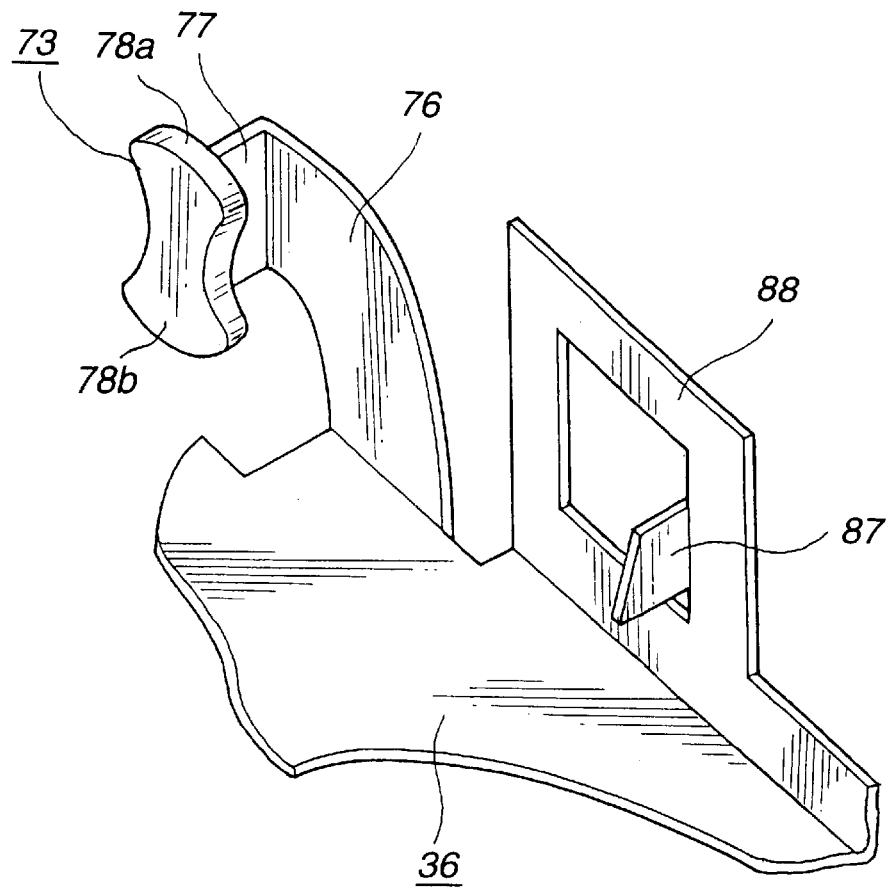
FIG. 12 is a perspective view showing a shaft portion provided on the base member carrying the holder.
Figure 13:
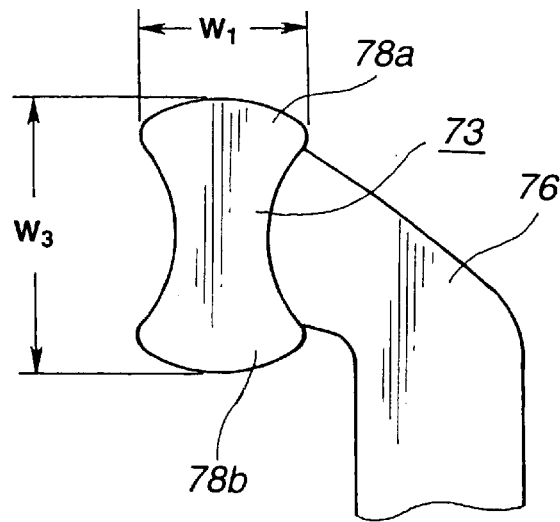
FIG. 13 is a front view of the shaft portion.

The first shaft 73, engaged in the first shaft opening 71, is formed at the distal end of a bend 77 formed by bending the distal end of an upstanding piece 76 formed on the proximal end of the base member 36. This first shaft 73 is formed with arcuate swollen-out portions 78*a*, 78*b* on its short sides perpendicular to its longitudinal direction corresponding to the vertical direction with respect to the base member 36, as shown in FIGS. 12 and 13. The first shaft 73 has a width $W_1$ along its short sides carrying the swollen-out portions 78*a*, 78*b* smaller than the inner diameter $R_1$ of the first shaft opening 71 and larger than the width $W_2$ of the cut-out 75. By forming the first shaft 73 in this manner, it is necessary for the cut-out 75 to be engaged from the short side carrying the swollen-out portion 78*a* in order for the first shaft opening 71 to be engaged from the direction perpendicular to the first shaft 73. Thus, if the first shaft 73 is engaged in the first shaft opening 71 via the cut-out 75, and the holder 23 is rotated towards the base member 36 until the cut-out 75 faces the longitudinal direction of the first shaft 73, the first shaft 73 is prohibited from being detached from the first shaft opening 71.

Figure 14:
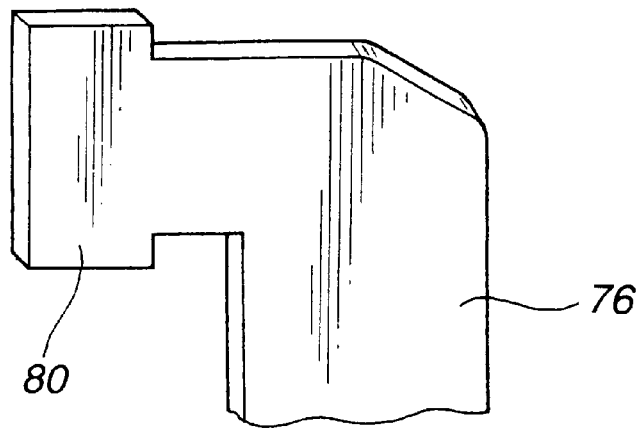
FIG. 14 is a perspective view showing an upstanding piece provided on the base member constituting the shaft portion.
Figure 15:
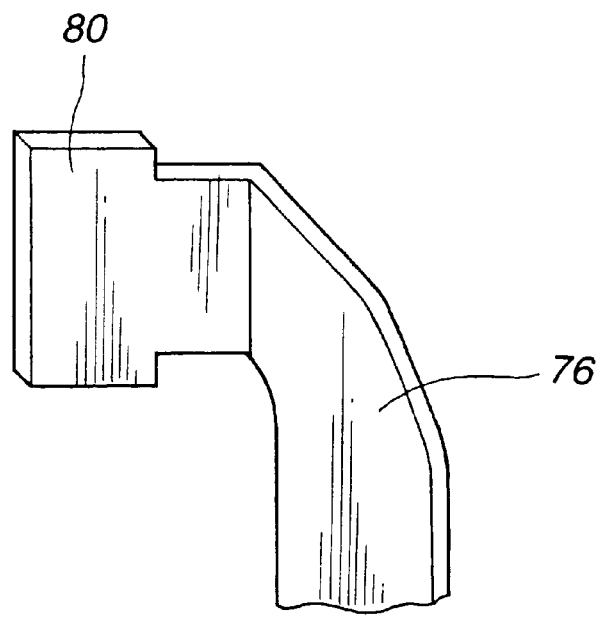
FIG. 15 is a perspective view showing the bent state of a lug constituting the shaft portion formed at the distal end of the upstanding piece.
Figure 16:
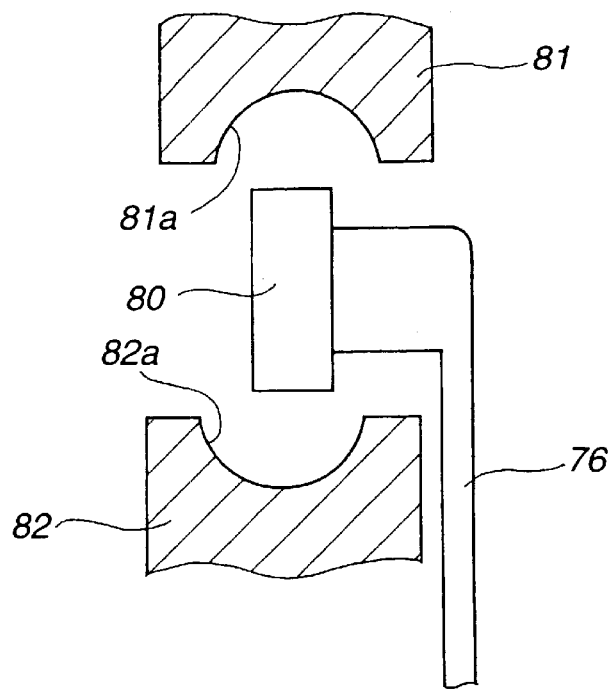
FIG. 16 is a front view showing the state of molding a lug to form the shaft portion.

The first shaft 73, constructed as described above, is manufactured by the following process:

First, as shown in FIG. 14, a substantially cross-shaped upstanding piece 76 having a lug 80 of a rectangular cross-section is formed on one lateral side of the base member 36 so as to have the height-wise direction as the longitudinal direction. The distal end of the upstanding piece 76, carrying the lug 80, is warped by 90° towards the interior of the base member 36, as shown in FIG. 15. Then, from the short sides perpendicular to the longitudinal direction of the lug 80, the lug 80 is deformed by a pair of metal molds 81, 82 having arcuate molding surfaces 81*a*, 82*a* by applying a pair of metal molds 81, 82, to complete the first shaft 73 having the arcuate swollen-out portions 78*a*, 78*b* on the short sides of the lug 80.

Since the first shaft 73 is completed in this manner integrally by press-molding the lug 80 formed at the distal end of the upstanding piece 76 formed in turn by warping a portion of the base member 36, there is no necessity of mounting an independently formed shaft thus reducing the number of component parts while simultaneously enabling the shaft to be produced easily.

A second shaft 74, engaged in a second engagement opening 72, is formed by warping a portion of the distal end of an upstanding piece 83 formed upright on the side of the base member 36 opposite to its proximal end towards the outside of the base member 36, as shown in FIG. 6. The second shaft 74 is of a diameter to permit its insertion through the second engagement opening 72. Similarly to the first shaft 73, the second shaft 74 may be formed with arcuate swollen-out portions by deforming a rectangular lug provided on the distal end of the upstanding piece 83 by a pair of metal molds having arcuate molding surfaces. By forming these swollen-out portions, the circular second engagement opening 72, engaged by the second shaft 74, permits smooth rotation.

Figure 17:
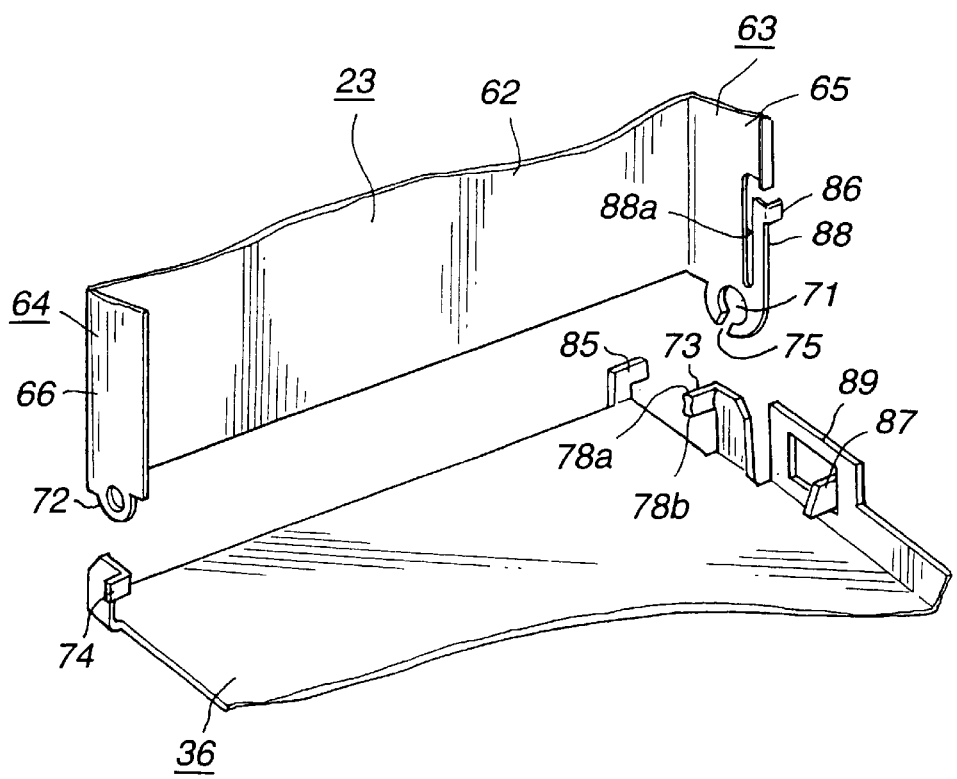
FIG. 17 is a perspective view showing how the holder is mounted on the base member.

For rotatably supporting the holder 23 relative to the base member 36 using a supporting mechanism comprised of the first and second shaft openings 71, 72 and the first and second shafts 73, 74 engaged in these shaft openings 71, 72, the holder 23 is placed substantially at right angles to the base member 36, as shown in FIG. 17. At this time, the cut-out 75 communicating with the first shaft opening 71 faces the short side of the first shaft 73 formed with the swollen-out portion 78a so that the first shaft 73 can traverse the first shaft opening 71. The second shaft 74 then is passed through the second engagement opening 72 and the first shaft 73 is engaged in the first shaft opening 71 through the cut-out 75 to get the holder 23 supported for rotation by the base member 36 through the first and second shafts 73, 74.

If the first and second shafts 73, 74 are engaged in the first and second shaft openings 71, 72 and the holder 23 then is rotated towards the base member 36, the cut-out 75 faces the longitudinal direction perpendicular to the short side of the first shaft 73 carrying the swollen-out portions 78a, 78b to prevent the first shaft opening 71 from being disengaged from the first shaft 73 to keep the first and second shaft openings 71, 72 engaged by the first and second shafts 73, 74.

Figure 18:
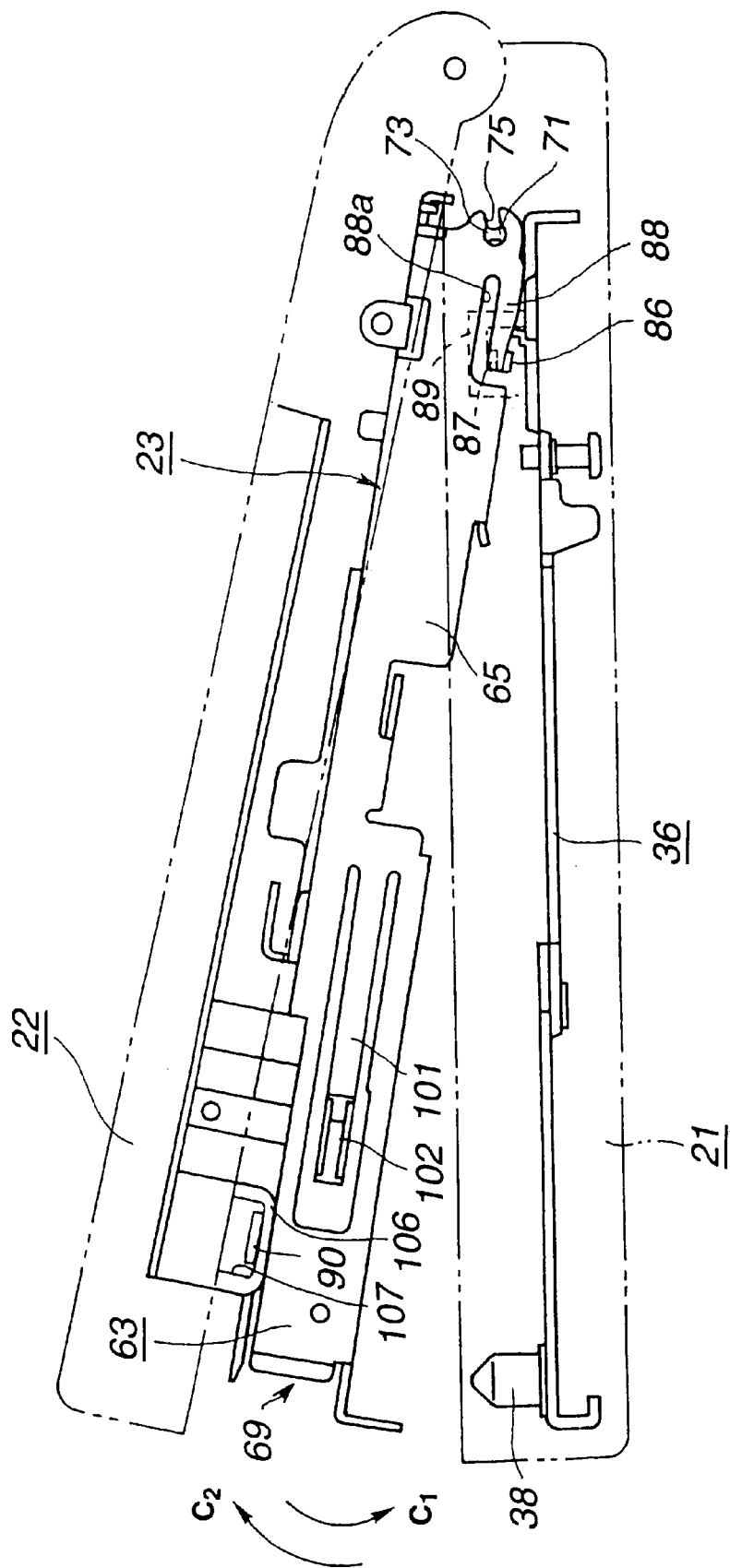
FIG. 18 is a side view showing the state in which the holder has been mounted on the base member.

If the holder 23 is rotated towards the base member 36 in the direction indicated by arrow $C_1$ in FIG. 18 until the state shown in FIG. 18 is reached, the proximal end of the sidewall section 65 carrying the cut-out 75 faces one end of a movement retainer 85 formed upright on the proximal end of the base member 36 to restrict movement in the axial direction of the first and second shafts 73, 74 to prohibit detachment from the first and second shafts 73, 74.

Meanwhile, if the holder 23 is rotated towards the base member 36 in the direction indicated by arrow $C_1$ until the state shown in FIG. 18 is reached, an engagement piece 86 formed at the proximal end of the sidewall section 65 is engaged with the retainer 87 provided on the base member 36 to restrict rotation in the direction away from the base member 36 as indicated by arrow $C_2$ in FIG. 18. When the engagement piece 86 is engaged with the retainer 87, the holder 23 has been rotated a predetermined amount from the base member 36, about the first and second shafts 73, 74 as the center of rotation, with the cartridge entrance/ejection opening 69 on the front side facing to outside of the main body portion 21 to permit entrance/ejection of the disc cartridge 1, as shown in FIG. 5. Thus, the holder 23 is placed at the position enabling insertion/ejection of the disc cartridge 1, with the front side cartridge entrance/ejection opening 69 facing to outside of the main body portion 21.

Figure 19:
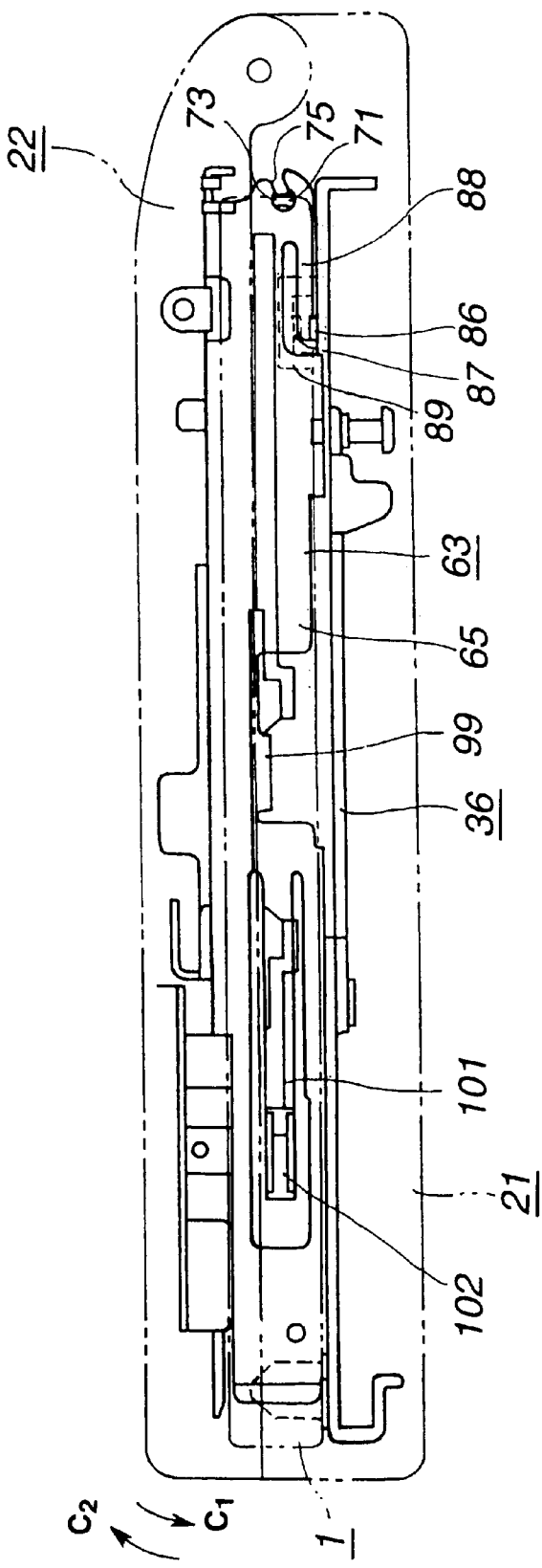
FIG. 19 is a side view showing the state in which the holder has been rotated towards the base member.

The retainer 87 serves only for retaining the engagement piece 86 of the holder 23 to restrict further movement of the holder 23 in the direction indicated by arrow $C_2$ in FIG. 18 when the holder 23 is rotated in the direction indicated by arrow $C_1$ in FIG. 18. The retainer 87 permits the holder 23 to be rotated further from the state shown in FIG. 18 in the direction indicated by arrow $C_2$ in FIG. 18. The holder 23 is rotated in the direction indicated by arrow $C_1$ in FIG. 18, about the first and second shafts 73, 74 as the center of rotation, until the holder is parallel to the base member 36, as shown in FIG. 19. That is, the holder 23 is rotatable between an uplifted position spaced apart from the base member 36 as shown in FIG. 18 and a lowered position proximate to the base member 36, as shown in FIG. 19.

The state of FIG. 19, in which the holder 23 has been rotated to its lower position proximate to the base member 36, is such a state in which the disc cartridge 1 inserted and held in the holder 23 has been loaded in position on the cartridge loading unit 37 provided on the base member 36, that is the state in which the optical disc 5 housed in the disc cartridge 1 is loaded on the disc rotating driving unit 41 to cause its rotation to record and/or reproduce information signals.

The engagement piece 86 provided on the holder 23 is formed by folding a portion of the distal end of an elastic flexing piece 88 to outside of the holder 23. The elastic flexing piece 88 is formed by boring a slit 88a in the proximal end of the sidewall section 65 constituting the first cartridge holding portion 63. On the other hand, the retainer 87 for retaining the engagement piece 86 is formed by warping a lug, formed by boring a slit at a mid portion of an upstanding piece 89, in turn formed upright on one side of the base member 36, towards the inside of the base member 36.

The holder 23, rotationally mounted on the base member 36 arranged in the interior of the main body portion 21, has a rotation interlock piece 90 engaged in an engagement opening 107 bored in a connecting piece 106 provided on the front end of the lid 22. The rotation interlock piece 90 is formed on the front end of the sidewall section 65 constituting the first cartridge holding portion 63, as shown in FIG. 18. By having the rotation interlock piece 90 engaged with the connecting piece 106 provided on a front end side of the lid 22, the holder 23 can be rotated in unison with the rotation of the lid 22.

Since the engagement opening 107 bored in the connecting piece 106 engaged by the rotation interlock piece 90 is larger in size than the thickness of the connecting piece 91, the lid 22 can be rotated further in the direction indicated by arrow $C_2$ in FIG. 18 away from the holder 23 within the extent of the engagement opening 107. Since the lid 22 can be rotated in a direction away from the holder 23, the cartridge entrance/ejection opening 69 formed in the front surface of the holder 23 can be opened further by the lid 22 being further rotated in the direction indicated by arrow $C_2$ in FIG. 18 on rotation of the holder 23 to the position enabling the entrance/ejection of the disc cartridge 1 even in cases wherein the lid is formed to such a shape as to cover the cartridge entrance/ejection opening 69 towards the front side from the rim of the holder 23. By the cartridge entrance/ejection opening 69 being significantly, the disc cartridge 1 can be intruded or ejected positively.

Figure 20:
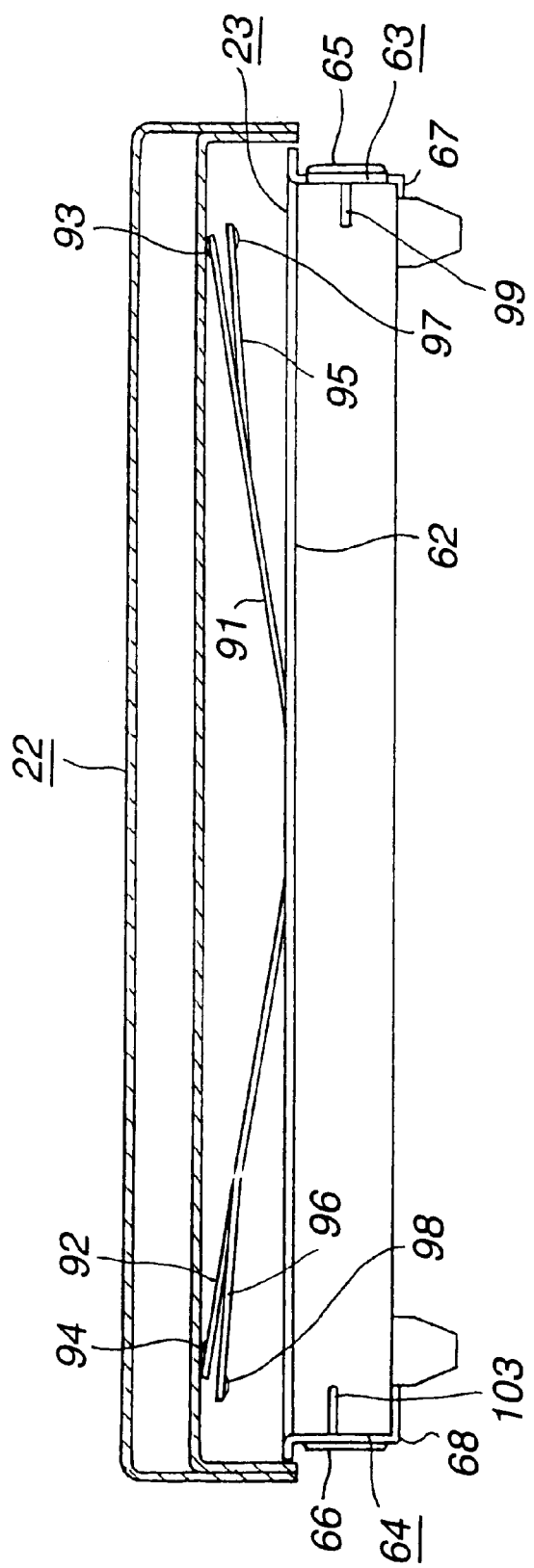
FIG. 20 is a front view showing the state in which the lid has been separated from the holder by first and second lid rotation biasing plates provided on the holder.

Meanwhile, the holder 23 is provided with first and second paired lid rotation biasing plates 91, 92, constituting a first elastic flexing unit for further rotating the lid 22 in a direction away from the holder 23 when the holder 23 has been rotated to the uplifted position spaced apart from the base member 36 to permit the entrance/ejection of the disc cartridge 1, as shown in FIGS. 8 and 9. The these first and second paired lid rotation biasing plates 91, 92 are formed as-one with the ceiling plate 62 by boring U-shaped slits 91a, 92a in the ceiling plate 62 of the holder 23, as shown in FIG. 9. The first and second paired lid rotation biasing plates 91, 92 are formed for extending towards the first and second cartridge holding portion 63, 64, with the mid portion of the ceiling plate 62 as a mid portion of the ceiling plate 62 as an articulated portion, as shown in FIG. 9. That is, the first and second paired lid rotation biasing plates 91, 92 are flexed so that the free ends thereof are protruded upwardly form the ceiling plate 62 to thrust and bias the inner surface of the lid 22 arranged to overlie the ceiling plate 62, as shown in FIG. 20. That is, the first and second paired lid rotation biasing plates 91, 92 are formed with a tilt for being protruded upwardly from the articulated portion to the ceiling plate 62 to the free ends, as shown in FIG. 20. The free ends of the first and second paired lid rotation biasing plates 91, 92 are formed with lid thrusting lugs 93, 94 for positively thrusting the inner surface of the lid 22.

Figure 21:
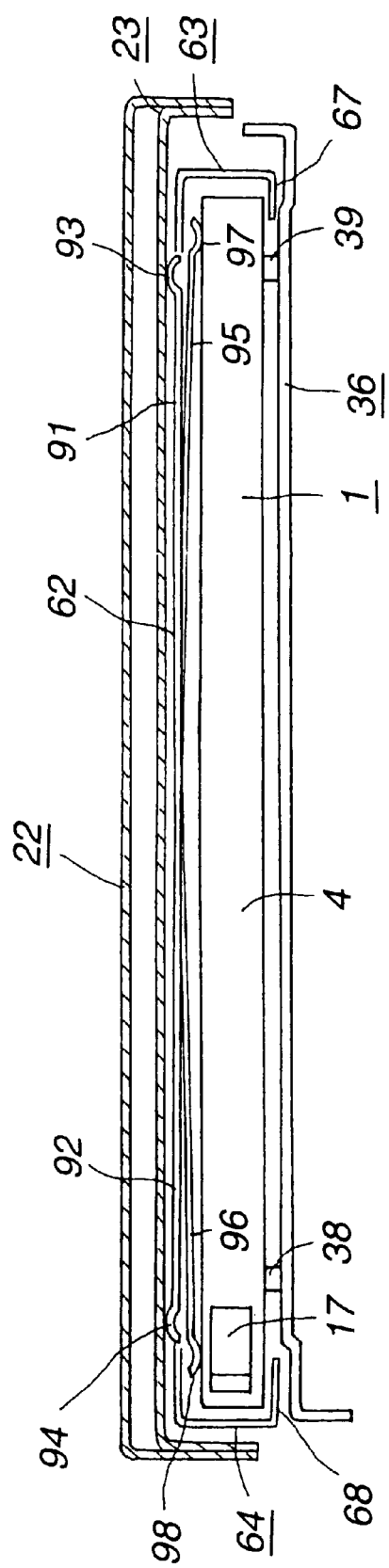
FIG. 21 is a front view showing the state in which the lid has been rotated to the position closing the main body portion of the apparatus and in which the first and second lid rotation biasing plates provided on the holder have been elastically deformed by the lid.

The first and second paired lid rotation biasing plates 91, 92 are formed as-one with first and second cartridge thrusting pieces 95, 96 constituting a first elastic flexing portions. These cartridge thrusting pieces 95, 96 are formed by bifurcating portions of the first and second paired lid rotation biasing plates 91, 92 and are formed by boring slits 95a, 95b extending from the free ends towards the proximal ends. The first and second cartridge thrusting pieces 95, 96 are flexed towards the holder 23 so as to be intruded into the holder 23 when the lid 22 is rotated to the position of closing the main body portion 21 and the holder 23 has been rotated to the recording and/or reproducing position, with the first and second paired lid rotation biasing plates 91, 92 being thrust by the lid 22 and elastically flexed towards the ceiling plate 62, as shown in FIG. 21. The first and second cartridge thrusting pieces 95, 96 are formed with different initial flexure values along the thickness of the holder 23 with respect to the first and second paired lid rotation biasing plates 91, 92.

The free ends of the first and second cartridge thrusting pieces 95, 96 are formed with thrusting projections 97, 98 for positively thrusting the upper surface if the disc cartridge 1 mounted on the cartridge loading unit 37.

At a mid portion along the length of the sidewall section 65 constituting the first cartridge holding portion 63 of the holder 23, there is formed a shutter opening member 99 by being bent towards the inside of the holder 23, as shown in FIGS. 9 and 10. The shutter opening member 99 is adapted for being intruded into a shutter member groove 12 formed in a lateral side of the disc cartridge 1 inserted into the holder 23 to elastically flex and unlock the shutter member 10. The shutter opening member 99 also causes relative movement of the shutter member 10 relative to the main cartridge body portion 4 inserted into the holder 23 to open the recording aperture 8 and the recording and/or reproducing aperture 9.

At a position in the sidewall section 65 of the first cartridge holding portion 63 closer to the cartridge entrance/ ejection opening 69 than the shutter opening member 99, there is provided a shutter member holding piece 101 adapted for holding the shutter member 10 carried by the disc cartridge 1 inserted into the holder 23 at a position of opening the recording and/or reproducing apertures 8, 9, holding the shutter member 10 with respect to the main cartridge body portion 4 moved in a direction of being protruded from the holder 23 in ejecting the disc cartridge 1 from the holder 23 and for causing the movement of the shutter member 10 in a direction of closing the recording aperture 8 and the recording and/or reproducing aperture 9. This shutter member holding piece 101 is formed as-one with the sidewall section 65 by boring a U-shaped slit 101a in the sidewall section 65. The shutter member holding piece 101 is formed for extending from the proximal end of the sidewall section 65 towards its distal end and carries an engagement projection 102 at its distal end engaged in an engagement opening 13 bored in the connecting piece 10c of the shutter member 10, as shown in FIG. 10. The engagement projection 102 is formed by warping a portion of the distal end of the shutter member holding piece 101 towards the inside of the holder 23.

The proximal end of the sidewall section 66 constituting the second cartridge holding portion 64 of the holder 63 is provided with a mistaken insertion inhibiting piece 103 adapted for inhibiting mistaken intrusion of the disc cartridge 1, as shown in FIG. 11. This mistaken insertion inhibiting piece 103 is formed by inwardly warping a portion of the sidewall section 66 towards the inside of the holder 23. The mistaken insertion inhibiting piece 103 serves for restricting insertion into the holder 23 to prevent mistaken insertion for such case in which the disc cartridge is inserted at 90° offset position from the regular inserting direction, as when the disc cartridge 1 is inserted into the holder 23 with its side carrying the shutter member 10 first.

The ceiling plate 62 of the holder 23 is formed as-one with a third cartridge thrusting piece 104 constituting a fourth elastic flexing unit thrusting and supporting the upper surface of the intruding end of the disc cartridge 1 inserted into the holder 23. The third cartridge thrusting piece 104 is formed by boring a U-shaped slit 104a in the ceiling plate 62 for extending in the intruding direction of the ceiling plate 62 into the holder 23. The third cartridge thrusting piece 104 is flexed so that the distal end thereof will be protruded inwardly of the holder 23 to thrust the disc cartridge 1 intruded into the holder 23 against the cartridge holding pieces 67, 68 of the first and second cartridge holding portion 63, 64. The distal end of the third cartridge thrusting piece 104 is provided with a lug 105 protruded towards the interior of the holder 23.

By proving the third cartridge thrusting piece 104 thrusting the disc cartridge 1 intruded into the holder 23, the disc cartridge 1 can be prevented for, floating from the cartridge supporting pieces 67, 68 of the disc cartridge 1 to permit the disc cartridge to be intruded into the holder 23 in a stable state. When the holder 23 has been moved to a recording and/or reproducing position lowered towards the base member 36 as shown in FIG. 19, the third cartridge thrusting piece 104 thrusts the disc cartridge 1 held in the holder 23 against the cartridge loading unit 37.

The elastically displaced members or components, provided on the holder 23, such as first and second paired lid rotation biasing plates 91, 92, rotationally biasing the lid 22 in a direction away from the holder 23 when the holder 23 has been moved, along with the lid 22, to the second elevated position spaced from the base member 36 enabling the insertion/ejection of the disc cartridge 1, first and second cartridge thrusting pieces 95, 96, thrusting the disc cartridge 1 held by the holder 23 towards the cartridge loading unit 37, shutter member holding piece 101 o the third cartridge thrusting piece 104 thrusting the disc cartridge 1 inserted into the holder 23, are formed as one with the holder 23, thus enabling the number of component parts to be reduced to facilitate the assembling of the holder 23.

The disc recording and/or reproducing apparatus according to the present invention is provided with an ejection mechanism 110 for ejecting the disc cartridge 1 inserted and held in the holder 23 from the holder 23 when the holder 23 is rotated from the first lower position towards the cartridge loading unit 37 to the elevated second position. This ejection mechanism 110 includes an ejection lever 111 arranged on one side on the back surface of the base member 36 and which is elastically displaced by the intruding end of the disc cartridge 1 intruded into the holder 23 rotatably supported on the base member 36, as shown in FIG. 6.

Figure 22:
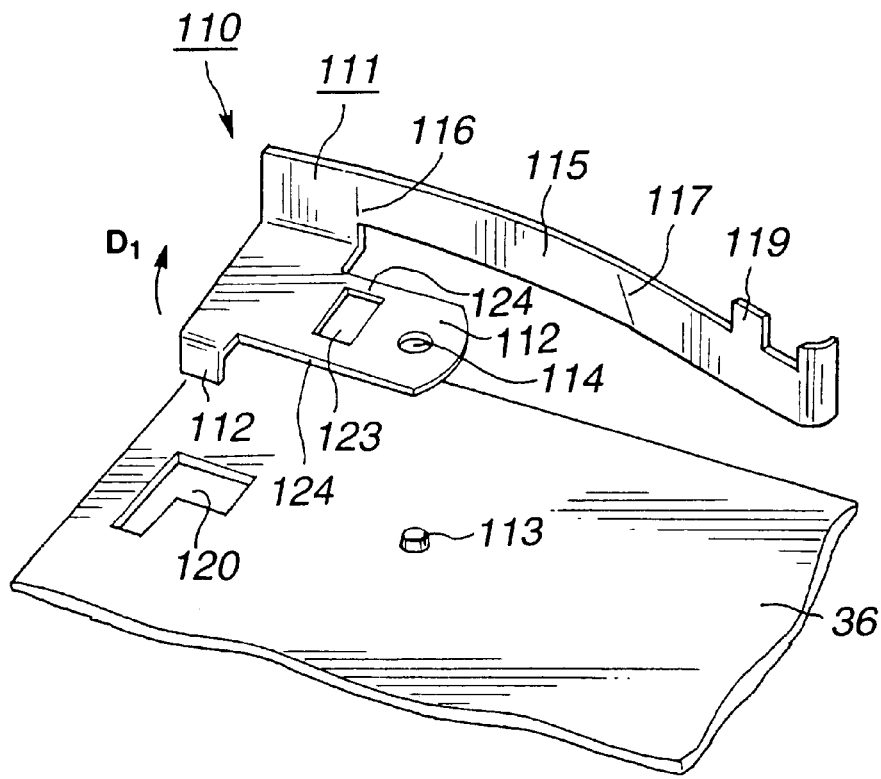
FIG. 22 is an exploded perspective view showing an ejection mechanism used in the disc recording and/or reproducing apparatus according to the present invention.
Figure 23:
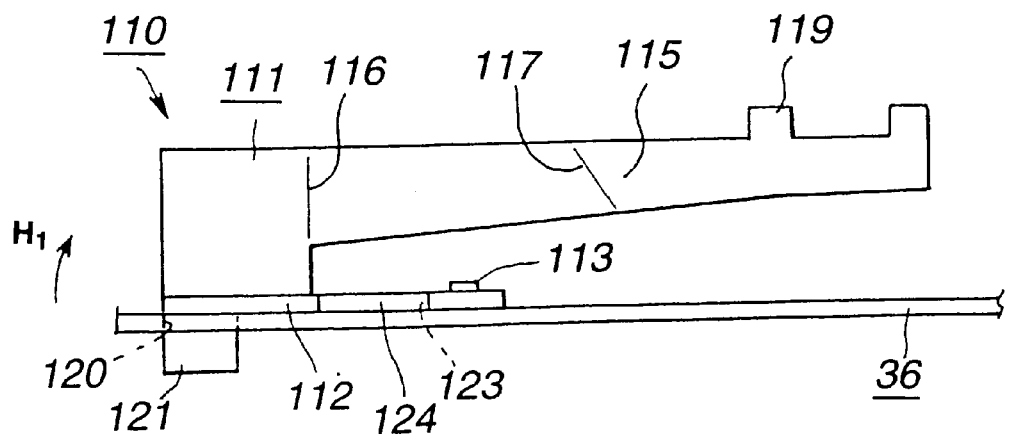
FIG. 23 is a front view showing the state in which an ejection lever has been mounted on the base member.

The ejection lever 111 is formed by an elastically flexed metal spring plate and is provided with a mounting piece 112 as a securing end to the base member 36, as shown in FIG. 22. In one end of the mounting piece 112 is bored a shaft opening 114 as a securing end passed through by a calking shaft 113 set upright on the base member 36. From a lateral side on the opposite end of the mounting piece 112 is extended a thrusting operating portion 115 thrust by an inserting end of the disc cartridge 1 introduced into the holder 23 towards the shaft opening 114. This thrusting operating portion 115 is extended at an inclination from the mounting piece 112 so that, when the ejection lever 111 is mounted on the base member 36, the distal end of the thrusting operating portion 115 will be spaced apart from the base member 36. The thrusting operating portion 115 is warped in substantially a chevron shape along bends 116, 117 provided on the articulated portion to the mounting piece 112 and partway. That is, the thrusting operating portion 115 is profiled and deformed so that, when the ejection lever 111 is mounted on the base member 36, the disc cartridge introduced into the holder 23 will be ejected from the holder 23, as shown in FIG. 23. Meanwhile, the bend 117, provided partway on the thrusting operating portion 115, is provided obliquely so that the distal end of the thrusting operating portion 115 will be deformed in an upward direction in which the distal end of the thrusting operating portion 115 will be spaced apart from the base member 36.

On the upper edge on the distal end of the thrusting operating portion 115 is protuberantly formed an engagement piece 119 engaging in an engagement opening 118 formed in the back surface of the ceiling plate 62, as shown in FIG. 9. This engagement piece 119 is elastically displaced by the thrusting operating portion 115 being thrust by the disc cartridge 1 intruded into the holder 23 until the engagement piece 119 is engaged with the engagement opening 118 when the engagement piece 119 has been moved to the back surface side of the holder 23. The thrusting operating portion 115 is held at the elastically deformed position by the disc cartridge 1 by the engagement piece 119 being retained in the engagement piece 119 to restrict the thrusting of the disc cartridge 1 held by the holder 23.

On the opposite side of the mounting piece 112, there is provided an engagement piece 121 intruded into a rotation restricting opening 120 bored in the base member 36 so as to be protruded on the lower surface of the base member 36, as shown in FIG. 22. When the holder 23 rotatably supported on the base member 36 is rotated to the recording and/or reproducing position as the lowered position, the engagement piece 121 is engaged with a disengagement piece 122 formed by downwardly folding a portion of the cartridge supporting piece 68 constituting the cartridge holding portion 64 of the holder 23, as shown in FIG. 11.

A cut-out opening 123 is formed between an end of the mounting piece 112 having the shaft opening 114 as the securing end and the articulating portion of the thrusting operating portion 115. On both sides of the cut-out opening 123 are formed a pair of elastic flexing portions 124, 124 which enable the mounting piece 112 to be elastically displaced in the direction indicated by arrow $D_1$ in FIG. 2, that is in a direction perpendicular to the direction of extension of the thrusting operating portion 115.

Figure 24:
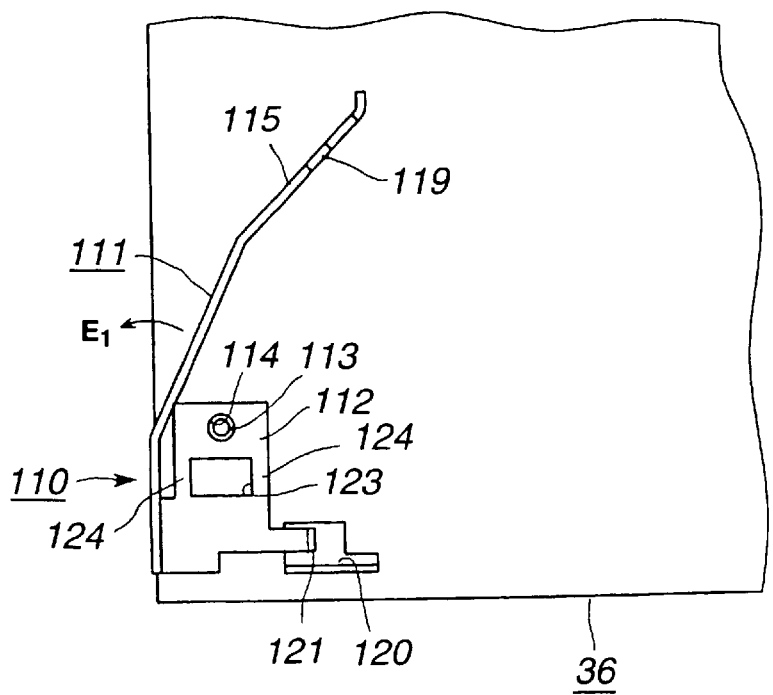
FIG. 24 is a plan view showing an ejection mechanism arranged on the base member.

The ejection lever 111, constructed as described above, is rotationally mounted on the base member 36, about a caulking pin 113 as center, by positioning the thrusting operating portion 115 for extending to the back side of the base member 36, introducing the caulking pin 113 through a rotation restricting opening 120, and folding back the distal end of the caulking pin 113, as shown in FIG. 24. At this time, the ejection lever 111 is rotatable within the extent of movement of the engagement piece 121 in the rotation restricting opening 120 about the caulking pin 113 as center of rotation.

Figure 25:
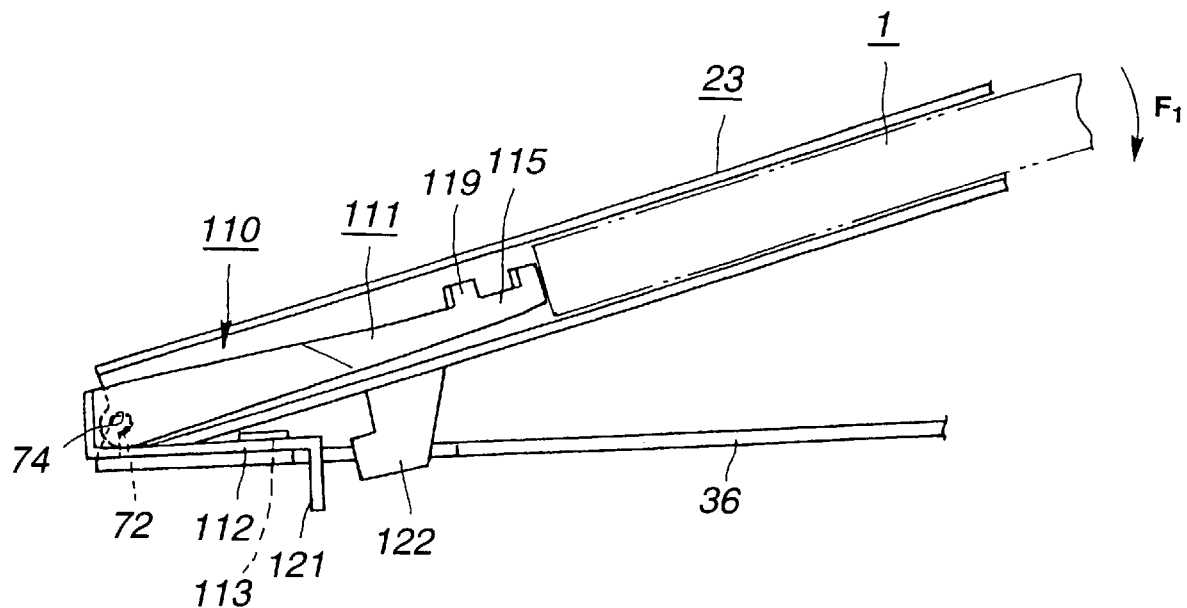
FIG. 25 is a side view showing the state in which the ejection lever has been thrust and actuated by the disc cartridge intruded into the holder.

Referring to FIG. 25, if the disc cartridge 1 is inserted into the holder 23 rotated to the elevated position enabling insertion/ejection of the disc cartridge 1, the ejection lever 111 has the thrusting operating portion 115 extended into the inside of the holder 23 thrust by the intruding end of the disc cartridge 1 so that the ejection lever 111 is rotated in the direction indicated by arrow $E_1$ in FIG. 24, about the caulking pin 113 as the center of rotation, so that the engagement piece 121 will compress against a lateral side of the rotation restricting opening 120. When the disc cartridge is inserted further into the holder 23 from the state in which the engagement piece 121 compresses against a lateral side of the rotation restricting opening 120 to restrict the rotation of the ejection lever 111, the thrusting operating portion 115 is thrust by the intruding end of the disc cartridge 1 so as to be elastically displaced towards the back side of the holder 23 in the direction indicated by arrow $E_1$ in FIG. 26. When the disc cartridge 1 is intruded to the holding position of the holder 23, as shown in FIG. 27, the thrusting operating portion 115 elastically deformed along the back side of the holder 23. Since the distal end of the thrusting operating portion 115 is inclined for extending towards the ceiling plate 62 of the holder 23, the engagement piece 119 provided on the distal end of the thrusting operating portion 115 is engaged with the engagement opening 118 in the back side of the ceiling plate 62 of the holder 23 from the lower surface side of the ceiling plate 62. By the engagement piece 119 being retained in the engagement opening 118 in the holder 23, the thrusting operating portion 115 of the ejection lever 111 is held in the elastically deformed position extending along the back side of the holder 23 to restrict the thrusting of the ejection lever 111 against the disc cartridge 1 held by the holder 23.

Figure 29:
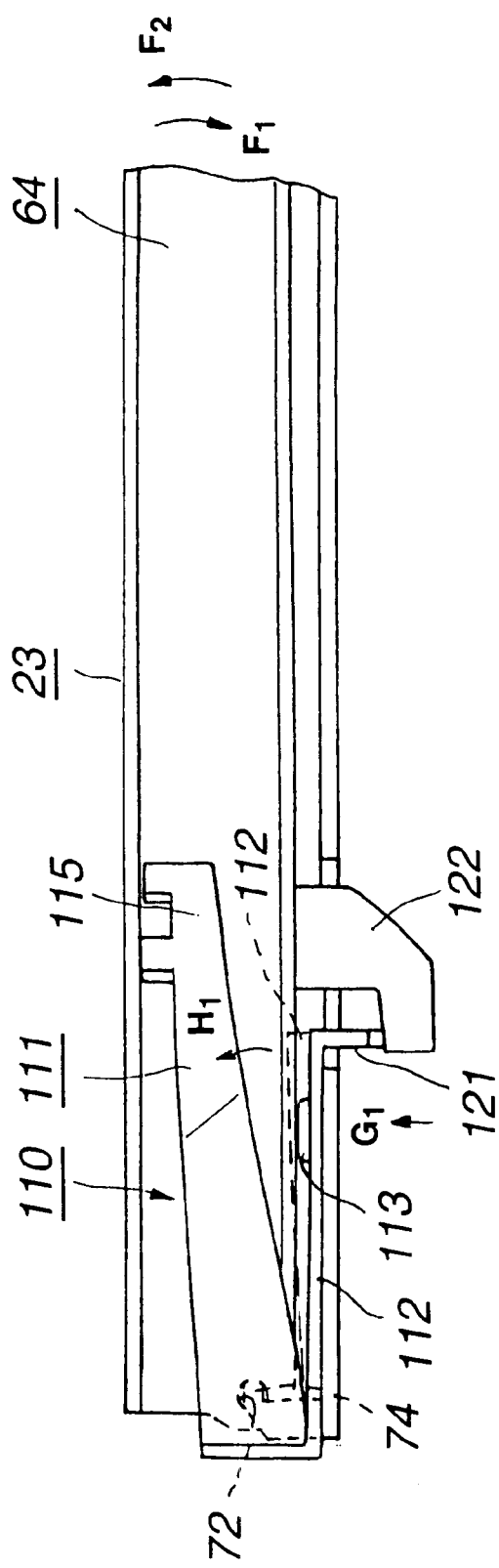
FIG. 29 is a side view showing the state of rotationally displacing the ejection lever by the holder.

The holder 23 is rotated in the direction indicated by arrow $F_1$ in FIG. 25, about pivot shafts 73, 74 provided on the base member 36 so that the holder 23 will descend towards the recording and/or reproducing apparatus to approach to the base member 36, as the disc cartridge 1 is held and as the ejection lever 111 is retained by the back side of the elastically flexed holder 23 until the holder reaches the recording and/or reproducing position approaching to the base member 36, as shown in FIG. 29. At this time, the disengagement piece 122 provided on the holder 23 is engaged with the engagement piece 121 provided on the ejection lever 111. At this time, the disengagement piece 122 provided on the holder 23 is engaged with the engagement piece 121 provided on the ejection lever 111.

When the holder 23 has been rotated to a first position as the recording and/or reproducing position, the disc cartridge 1 held by the holder 23 is loaded in position on the cartridge loading unit 37. The optical disc 5 housed in the disc cartridge 1 is clamped by the disc table 44 of the disc rotating driving unit 41 to establish the state in which the optical disc 5 can be rotationally driven to enable recording and/or reproduction of information signals.

Figure 27:
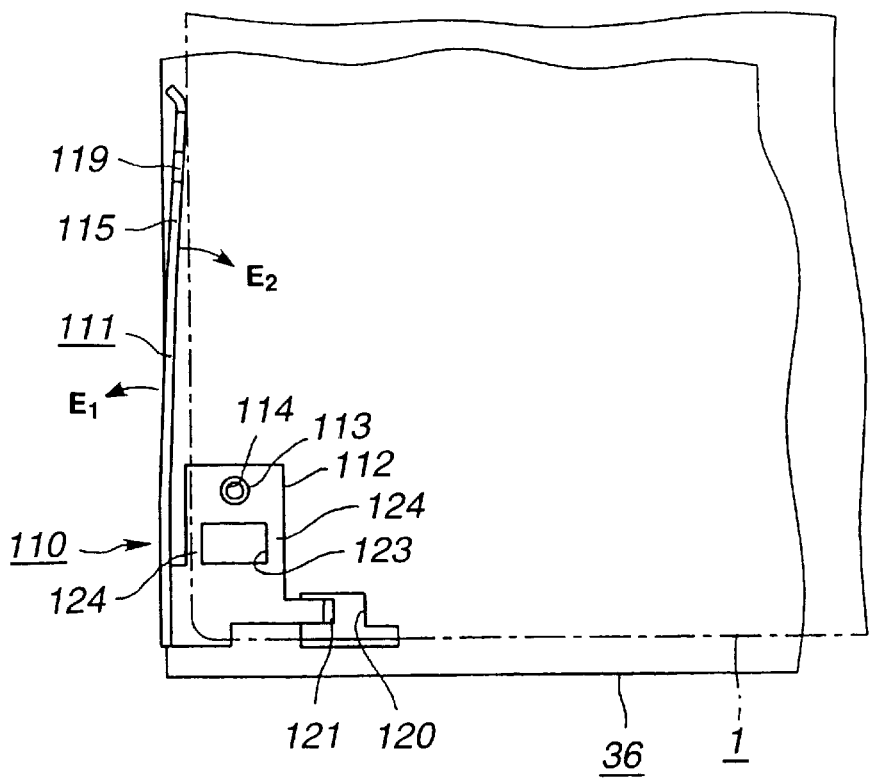
FIG. 27 is a plan view showing the state in which the disc cartridge has been intruded into the holder and the ejection lever is retained by the back side of the holder.
Figure 28:
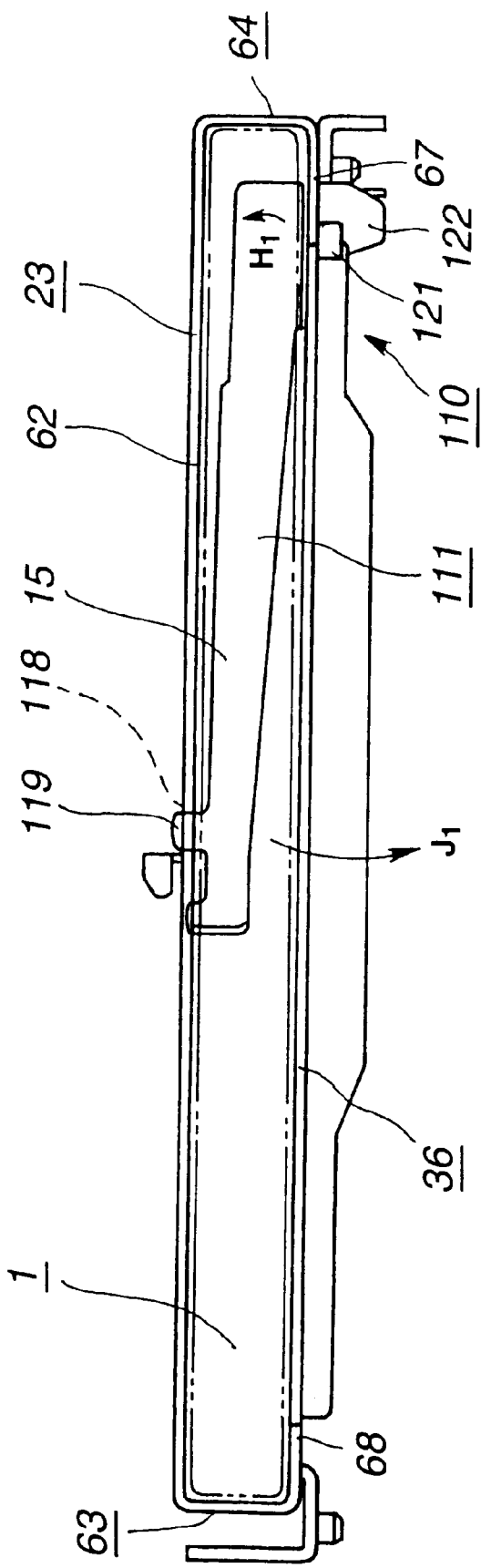
FIG. 28 is a back-side view showing the state in which the ejection lever has been retained by the back side of the holder.
Figure 30:
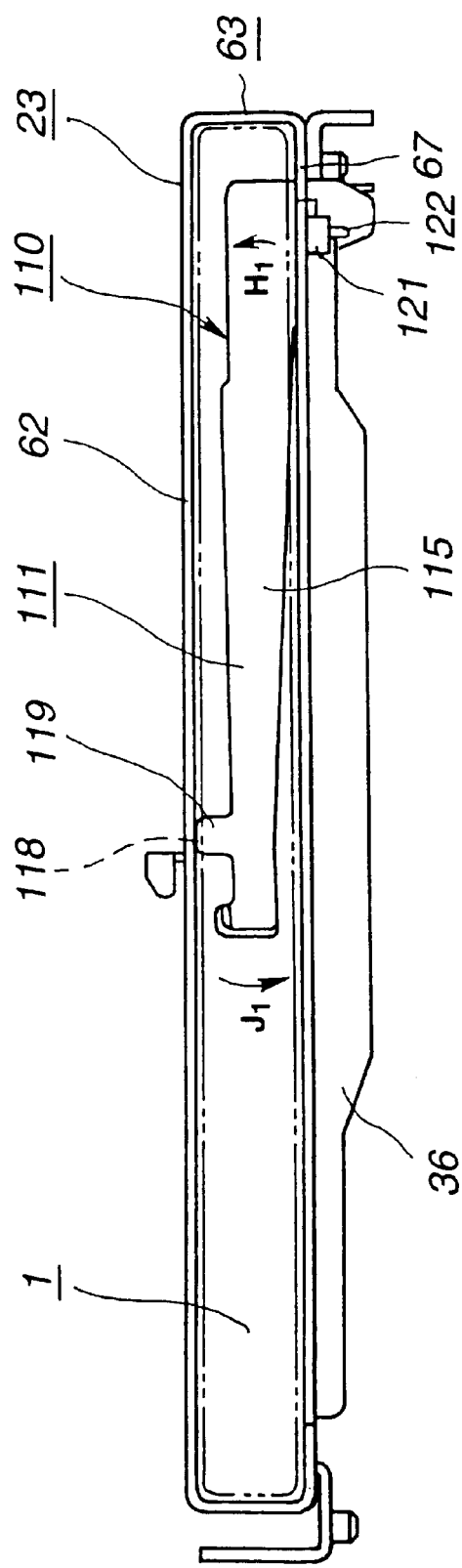
FIG. 30 is a back side view showing the state in which the ejection lever retained by the back side of the holder is disengaged from the holder.

If, for ejecting the disc cartridge 1 loaded on the cartridge loading unit 37, the holder 23 is rotated, along with the lid 22, in an uplifting direction indicated by arrow $F_2$ in FIG. 29 in which the holder 23 is moved away from the base member 36, the disengagement piece 122 thrusts the engagement piece 121 to uplift it in the direction indicated by arrow $G_1$ in FIG. 29. If the engagement piece 121 is thrust in the direction indicated by arrow $G_1$ in FIG. 29, the mounting piece 112 is rotated in the direction indicated by arrow $E_2$ in FIG. 27, about the caulking pin 113 as the center of rotation, while being rotated in the direction indicated by arrow $H_1$ in FIGS. 23, 28 and 29, away from the base member 36, about the elastic flexing portions 124, 124 as the center of rotation. If the thrusting operating portion 115 is rotationally flexed in the direction indicated by arrow $H_1$ in FIG. 23, the thrusting operating portion 115 is rotationally flexed in the direction indicated by arrow $J_1$ in FIG. 28 away from the ceiling plate 62 of the holder 23. If the thrusting operating portion 115 is rotationally flexed in the direction indicated by arrow $J_1$ in FIG. 28, the engagement piece 119 ceases to be engaged in the engagement opening 118, as shown in FIG. 30. if the engagement piece 119 ceases to be engaged in the engagement opening 118, the thrusting operating portion 115 of the ejection lever 111, elastically flexed by the insertion of the disc cartridge 1 into the holder 23 to store the force of elastic flexure, the thrusting operating portion 115 of the ejection lever 111 is elastically restored, in the direction indicated by arrow $E_2$ in FIGS. 26 and 27, so that the thrusting operating portion 115 of the ejection lever 111, in which the force of elastic flexure has been stored by elastic flexure brought about by the intrusion of the disc cartridge 1 into the holder 23, will be protruded into the holder 23, to eject the disc cartridge 1 held by the holder 23 to outside the holder 23 to enable it to be taken outside the holder 23.

Meanwhile, if the holder 23 is rotated in the uplifting direction towards the second position away from the base member 36, the mounting piece 112 is rotated in the direction indicated by arrow $E_2$ in FIG. 27, about the caulking pin 113 as the center of rotation, the engagement piece 121 is kept in the state of being separated from the disengagement piece 122. Since the caulking pin 113 is supports the mounting piece 112 in a fixed state, the mounting piece 112 is held in the rotated position, with the engagement piece 121 being spaced apart from the disengagement piece 122. Thus, when the disc cartridge 1 is ejected, thee 121 is kept in the separated state from the disengagement piece 122. Thus, when the holder 23 into which the disc cartridge 1 is not inserted is rotated in the direction indicated by arrow $F_1$ in FIG. 25 towards the recording and/or reproducing position, or if the holder 23 is rotated from the recording and/or reproducing position towards the uplifted position, the engagement piece 121 is prohibited from compressing against the disengagement piece 122, thus preventing disagreeable sound of collision from being produced.

In the above-described ejection mechanism 110, in which the ejection system for the disc cartridge 1 inserted into the holder 23 is constituted solely by the ejection lever 111 formed by an elastically flexible metal plate, the number of component parts can be decreased to simplify the structure significantly.

The above-described ejection mechanism 110 is arranged so that, when the disc cartridge 1 is held by the holder 23, the e112 is retained by the holder 23. However, it is also possible to have the thrusting operating portion 115 of the ejection lever 111 inclined towards the base member 36 and to provide the base member 36 with the retainer 119 to have the ejection lever 111 retained by the base member 36.

Figure 31:
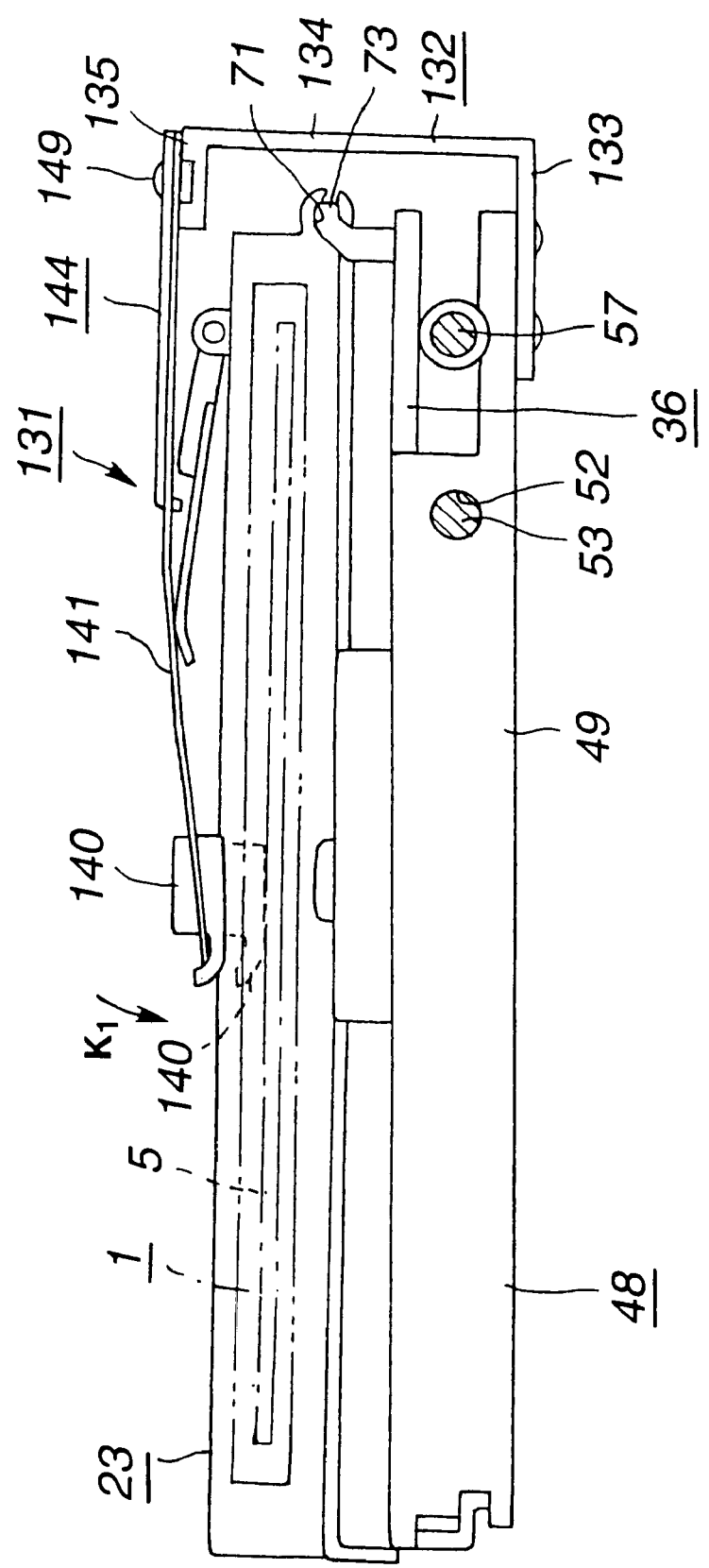
FIG. 31 is a side view showing the state in which the magnetic head device has been connected to the optical pickup device.
Figure 32:
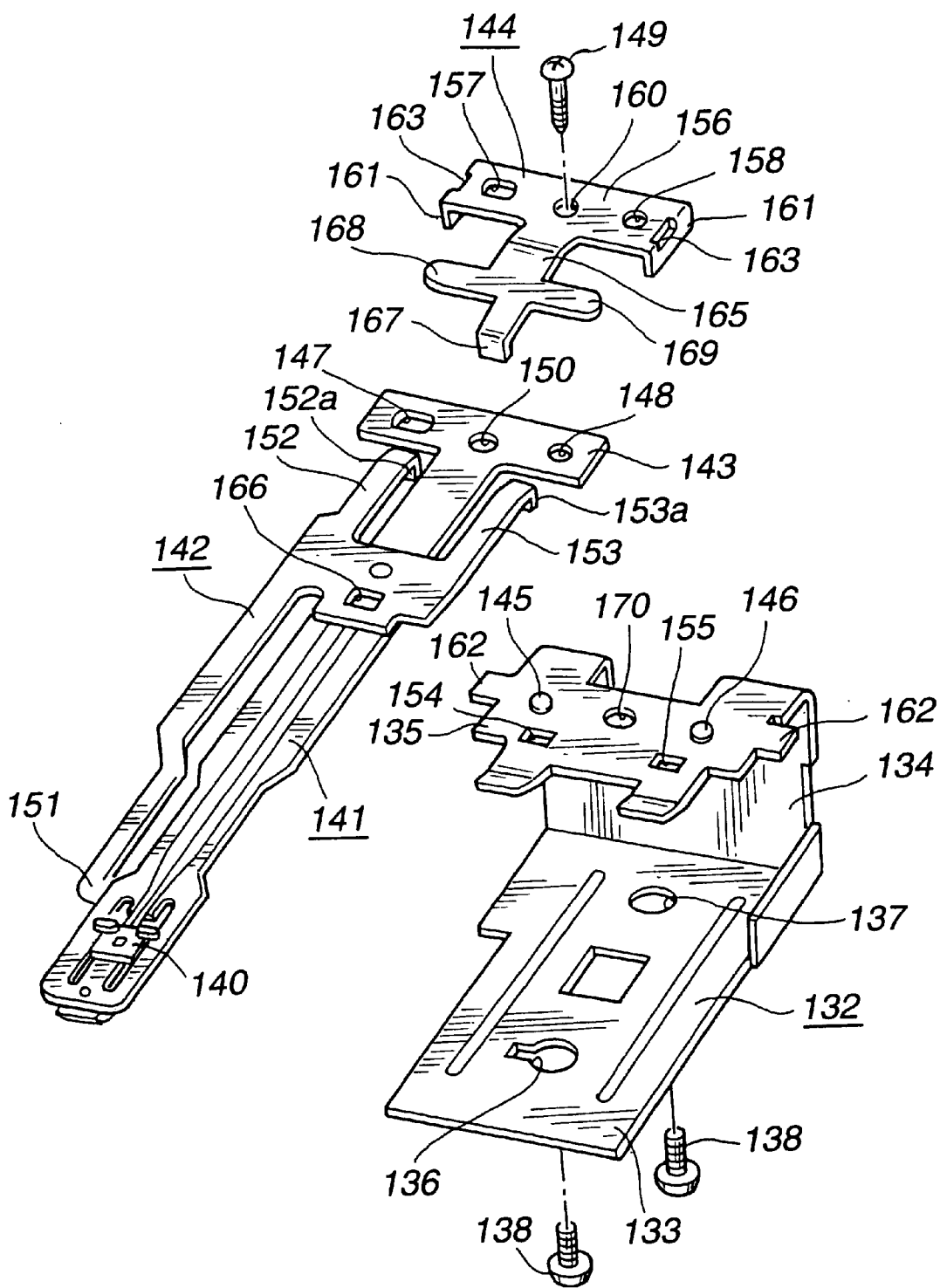
FIG. 32 is an exploded perspective view showing a magnetic head device according to the present invention.

The disc recording and/or reproducing apparatus according to the present invention includes a magnetic head device 131 for recording information signals on the optical disc 5 rotationally driven by the disc rotating driving unit 41, as shown in FIG. 8. Since the magnetic head device 131 records information signals on the optical disc 5 in cooperation with the optical pickup device 48, it is arranged facing the optical pickup device 48, with the optical disc rotationally driven by the disc rotating driving unit 41, as shown in FIG. 31. In order to apply an external magnetic field, modulated depending on the information signals for recording, at a position illuminated by the light beam radiated from the optical pickup device 48 of the optical disc 5, the magnetic head device 131 is moved along the radius of the optical disc 5 in synchronism with the movement of the optical pickup device 48. To this end, the magnetic head device 131 is connected to the optical block 49 of the optical pickup device 48 through a connecting member 132, as shown in FIG. 31. The connecting member 132 for connecting the magnetic head device 131 is formed by bending a tough metal sheet in the cross-sectional shape of a letter U, as shown in FIGS. 31 and 32. Specifically, the connecting member 132 is made up of a lower stationary piece 133 for securing to the lower surface of the optical block 49 a vertically extending upstanding piece 134 continuing to an end of the stationary piece 133 and a supporting arm mounting piece 135, as a supporting base, bent for facing the stationary piece 133 from the distal end of the upstanding piece 134. The connecting member 132 is connected to the optical pickup device 48 by securing the stationary piece 133 to the lower surface of the optical block 49 so that the supporting arm mounting piece 135 will face the ceiling plate 62 of the holder 23. The stationary piece 133 is secured to the optical block 49 by threading set screws 138, 138, passed through the screw holes 136, 137 bored in the stationary piece 133, to the lower surface of the optical block 49.

Referring to FIGS. 8 and 32, the magnetic head device 131, supported on the supporting arm mounting piece 135 of the connecting member 132 connected to the optical pickup device 48, includes a head supporting arm 141 for restricting excessive flexing of the head supporting arm 141 carrying a magnetic head element 140 at a distal end, an arm supporting piece 142 for restricting excess flexure of the head supporting arm 141 and an arm securing member 144 for clamping a supporting piece 143 formed at the proximal end of the head supporting arm 141 along with the supporting arm mounting piece 135 to secure the supporting piece 143 to the supporting arm mounting piece 135.

The head supporting arm 141, carrying the magnetic head element 140 at its distal end, is produced by punching an elastic thin metal sheet, such as a sheet of phosphor bronze. The magnetic head element 140 is supported by the distal end of the elastically flexible head supporting arm 141, so that. If the optical disc 5 suffers from deviation from planarity when run in rotation, the head supporting arm 141 is elastically deformed to prevent floating of the head supporting arm 141 from the major surface of the optical disc 5 to scan the signal recording area correctly.

In the supporting piece 143 formed on the proximal end of the head supporting arm 141 are bored positioning holes 147, 148 engaged by positioning projections 145, 146 protuberantly formed on the supporting arm mounting piece 135. One 147 of the positioning holes is formed so that its long axis coincides with the direction perpendicular to the direction of extension of the head supporting arm 141, in order to adjust the position of engagement by the positioning projection 145. The head supporting arm 141 has its mounting position relative to the supporting arm mounting piece 135 set by being supported on the supporting arm mounting piece 135 as the positioning projections 145, 146 are engaged in the positioning holes 147, 148, respectively. Partway between the positioning holes 147, 148 of the supporting piece 143 is bored a screw opening 150 passed through by a set screw 149 securing the arm securing member 144 to the supporting arm mounting piece 135.

Referring to FIG. 32, the arm supporting piece 142 is provided with an L-shaped arm supporting portion 151 on its distal end for supporting the lower surface on the distal end of the head supporting arm 141 carrying the magnetic head element 140. The arm supporting piece 142 is also provided with a pair of support lugs 152, 153 on its proximal end. These support lugs 152, 153 are set on the supporting arm mounting piece 135. The distal ends of these support lugs 152, 153 are warped to form engaging protuberances 152a, 153a engaged in engagement openings 154, 155 bored in the supporting arm mounting piece 135. The arm supporting piece 142 is superposed on this head supporting arm 141 so that the arm supporting portion 151 faces the lower surface of the head supporting arm 141. The arm supporting piece 142 then is mounted integrally on the head supporting arm 141 such as by welding portions thereof superposed on the head supporting arm 141. At this time, the support lugs 152, 153 are extended towards the proximal ends of the head supporting arm 141 on both lateral sides of the head supporting arm 141.

The arm securing member 144 is formed from a thin elastic metal sheet and is provided on the proximal end thereof with a securing portion 156 to the supporting arm mounting piece 135, as shown in FIG. 32. The securing portion 156 is formed with positioning holes 157, 158 engaged by the positioning projections 145, 146 provided on the supporting arm mounting piece 135. Similarly to the positioning hole 147 provided in the head supporting arm 141, the positioning hole 157 has, as its long axis, the direction perpendicular to the direction of extension of the arm securing member 144 in order to adjust the engagement position with the positioning projection 145. The arm securing member 144 has its mounting position relative to the supporting arm mounting piece 135 set by being supported on the supporting arm mounting piece 135 as the positioning holes 157, 158 are engaged bathe positioning projections 145, 146, respectively. Partway between the positioning holes 157, 158 is bored a screw inserting hole 160 passed through by a set screw 149 adapted for securing the arm securing member 144 to the supporting arm mounting piece 135. On both lateral sides of the securing portion 156 are formed mounting position control pieces 161, 161, by warping, in a depending fashion on both sides of the supporting arm mounting piece 135, as shown in FIG. 32. In the vicinity of the mounting position control pieces 161, 161 are formed engaging holes 163, 163 engaged by engagement lugs 162, 162 formed on both lateral sides of the supporting arm mounting piece 135. The arm securing member 144 is positively restricted in its movement in the rotational direction centered about the set screw 149 by being mounted on the supporting arm mounting piece 135 with both sides of the supporting arm mounting piece 135 being clamped by the mounting position control pieces 161, 161, and by engaging the engagement lugs 162, 162 in the engaging holes 163, 163.

On the distal end of the securing portion 156, the arm securing member 144 is provided with a thrusting supporting portion 165 mounted in superposition on the head supporting arm 141 as it is extended over the arm supporting piece 142. During recording of information signals, this thrusting supporting portion 165 thrusts and biases the head supporting arm 141 towards the optical disc 5 in the direction indicated by arrow $K_1$ in FIG. 31 so that the magnetic head element 140 will be contacted with a pre-set contact pressure against the optical disc 5. The thrusting supporting portion 165 is warped and deformed so that, when the thrusting supporting portion 165 is mounted on the supporting arm mounting piece 135, the head supporting arm 141 will be thrust and biased towards the optical disc 5. The distal end of the thrusting supporting portion 165 is formed by warping with an engagement end 167 engaged in a registering engagement opening 166 bored in each of the arm supporting piece 142 and in the head supporting arm 141. On both lateral sides of the thrusting supporting portion 165, there are formed thrusting supporting pieces 168, 169 thrusting and supporting support lugs 152, 153 formed on the proximal end of the arm supporting piece 142.

The head supporting arm 141 of the magnetic head device 131, constructed as described above, is supported on the supporting arm mounting piece 135 in position with respect to the supporting arm mounting piece 135 by having the positioning projections 145, 146 engaged in the positioning holes 147, 148 formed in the supporting piece 143. At this time, the support lugs 152, 153 provided on the arm supporting piece 142 mounted in unison in superposition on the head supporting arm 141 are set on the supporting arm mounting piece 135 by having the end engaging protuberances 152a, 153a engaged in the engagement openings 154, 155 bored in the supporting arm mounting piece 135.

Figure 33:
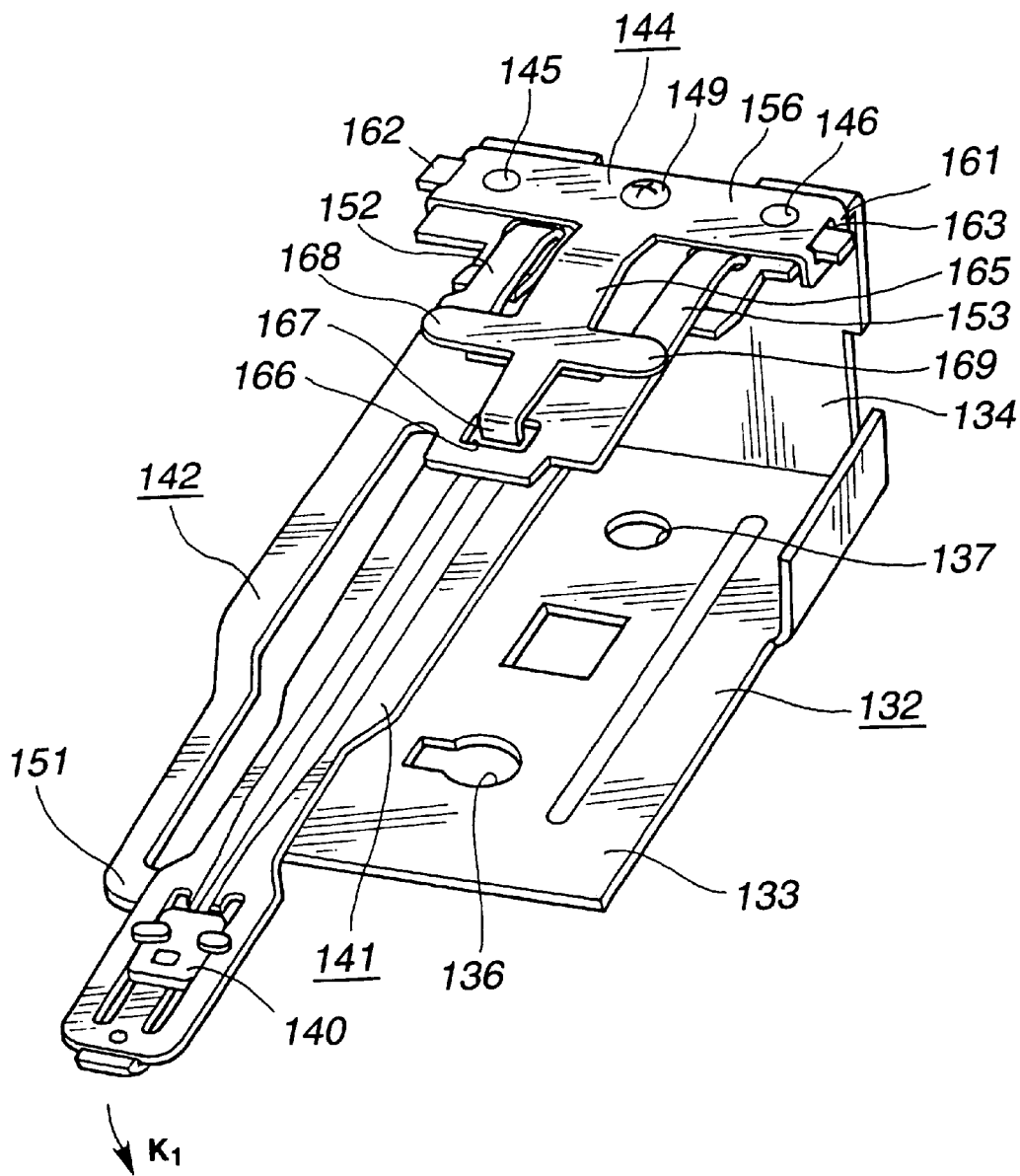
FIG. 33 is a perspective view showing a magnetic head device according to the present invention.
Figure 34:
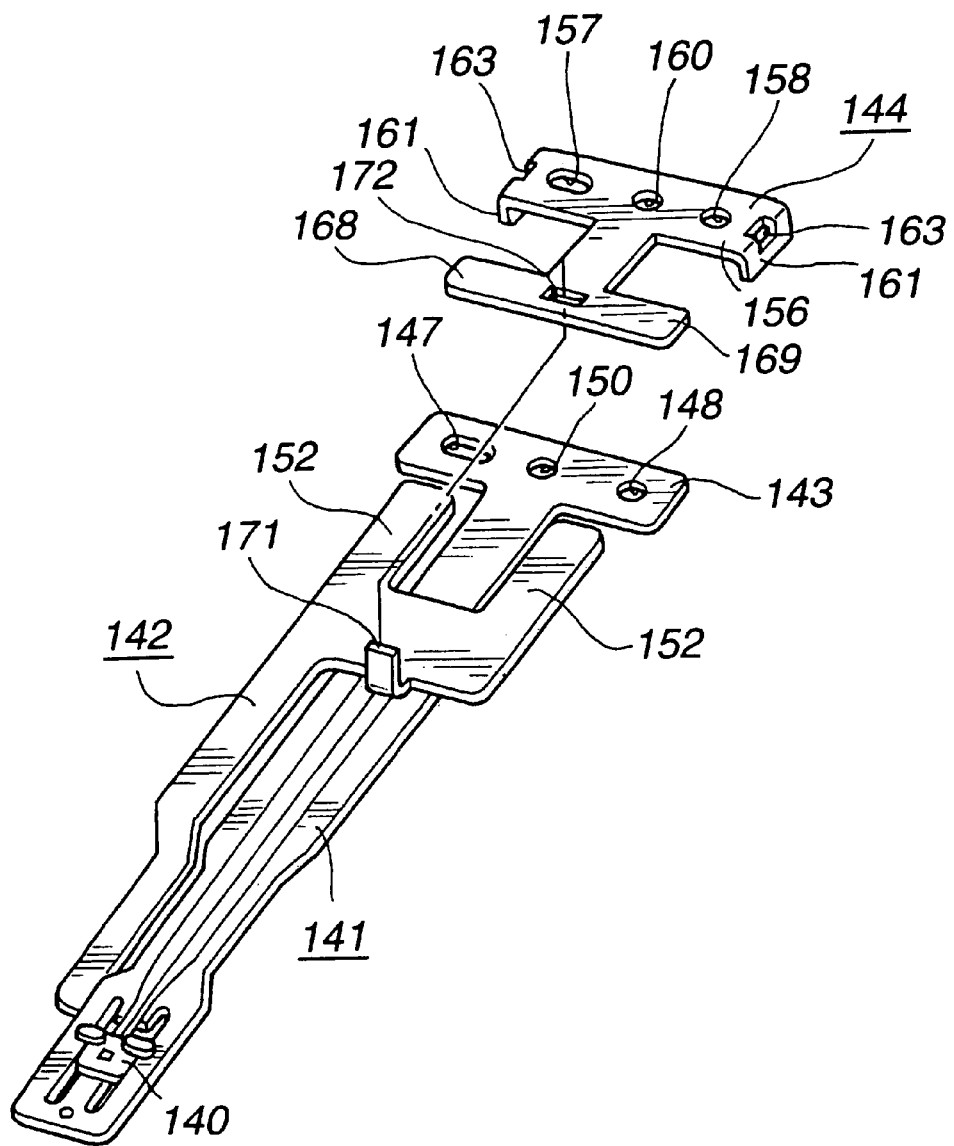
FIG. 34 is an exploded perspective view showing another magnetic head device according to the present invention.

On the supporting arm mounting piece 135 carrying the head supporting arm 141 is mounted the arm securing member 144, as shown in FIG. 33. The arm securing member 144 has its mounting position on the supporting arm mounting piece 135 set by having the positioning projections 145, 146 protruded from the positioning holes 147, 148 formed in the head supporting arm 141 supported by the supporting arm mounting piece 135 engaged in the positioning holes 157, 158 formed in the securing portion 156. At this time, the mounting position control pieces 161, 161 are bent on both sides of the supporting arm mounting piece 135 so that the engagement lugs 162, 162 are engaged in the engaging holes 163, 163, as shown in FIG. 33.

When the arm securing member 144 is superposed on the head supporting arm 141 and supported in this state on the supporting arm mounting piece 135, the thrusting supporting portion 165 is extended over the arm supporting piece 142 from the head supporting arm 141 to thrust the head supporting arm 141 towards the optical disc 5 in the direction indicated by arrow $K_1$ in FIG. 33. At this time, the engagement end 167 provided on the distal end of the thrusting supporting portion 165 is engaged in the engagement opening 166 bored through the arm supporting piece 142 and the head supporting arm 141. On the other hand, the support lugs 152, 153, formed on the proximal end of the arm supporting piece 142, are thrust and supported by thrusting supporting pieces 168, 169 protuberantly formed on both lateral sides of the thrusting supporting portion 165.

Figure 35:
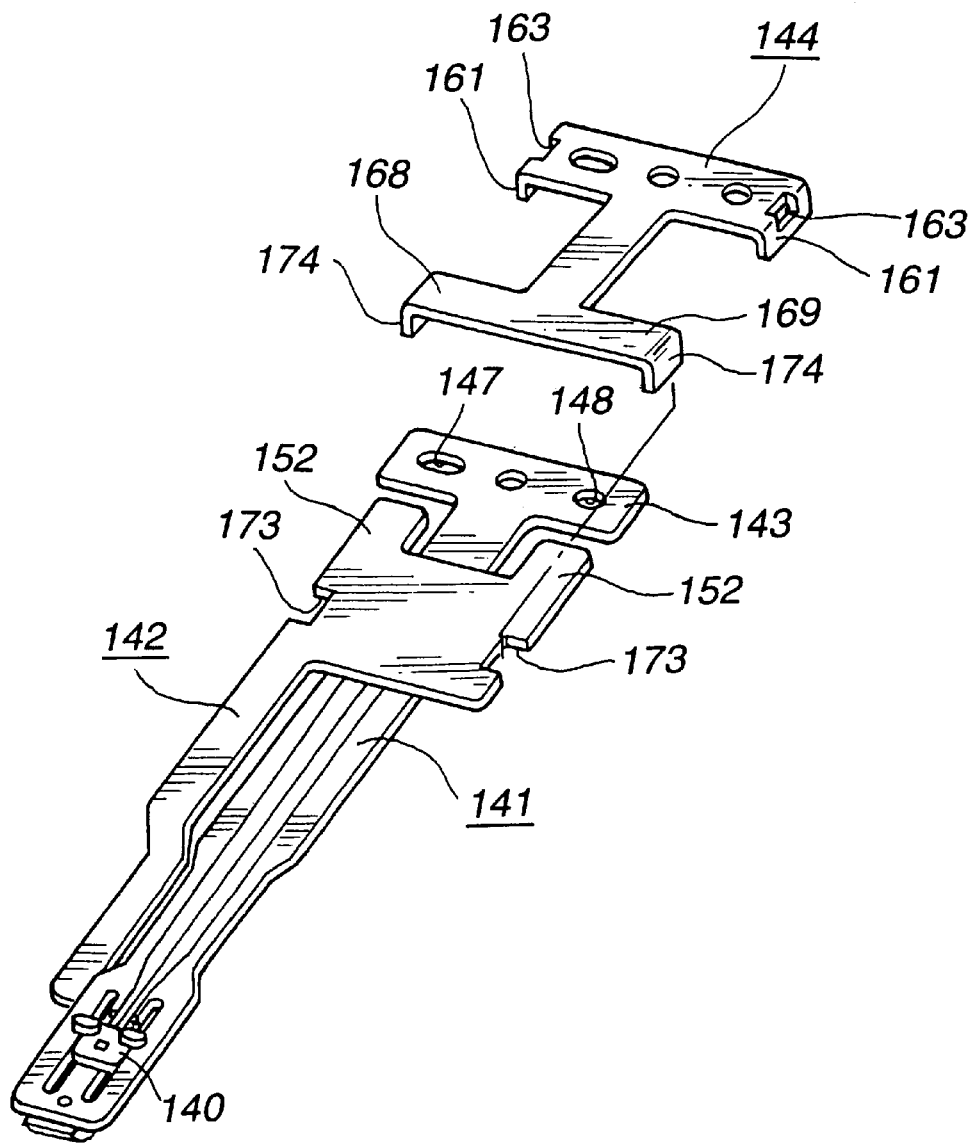
FIG. 35 is an exploded perspective view showing still another magnetic head device according to the present invention.

The arm securing member 144, supported on the supporting arm mounting piece 135 by being superposed on the head supporting arm 141, secures the head supporting arm 141 to the supporting arm mounting piece 135 by screwing a set screw 149 in a screw inserting hole 160 bored in the arm securing member 144 and in a screw inserting hole 150 bored in the head supporting arm 141 in a screw inserting hole 171 bored in the supporting arm mounting piece 135, with the supporting piece 143 of the head supporting arm 141 being clamped along with the supporting arm mounting piece 135, as shown in FIG. 35.

With the above-described magnetic head device 131, the arm securing member 144 for champing the supporting arm mounting piece 135 and the head supporting arm 141 to secure them to the supporting arm mounting piece 135 is provided with the thrusting supporting portion 165 to thrust and bias the head supporting aim 141 against the optical disc 5, there is no necessity of using an independent spring member for flexing the head supporting arm 141 towards the optical disc 5, thus decreasing the number of component parts to facilitate the assembling.

On the other hand, the head supporting arm 141, formed as a fragile spring plate, is supported by the arm securing member 144 by an engagement mechanism in which the engagement end 167 provided on the arm securing member 144 is engaged in the engagement opening 166, it is possible to prevent the elastic flexing portion of the supporting arm mounting piece 135 operating as a hinge from being deformed reliably.

Moreover, the support lugs 152, 153, provided on the proximal end of the arm supporting piece 142 superposed on the head supporting arm 141, are supported by the thrusting supporting pieces 168, 169 protuberantly formed on both lateral sides of the thrusting supporting portion 165, the head supporting arm 141 is restricted in its flexure in the torsional direction of the head supporting arm 141 to enable the magnetic head element 140 carried on the distal end to be kept in stable state in sliding contact with the optical disc 5.

In the above-described magnetic head device 131, the engagement end 167 is provided on the arm securing member 144, as the engagement mechanism for prohibiting deformation of the head supporting arm 141, whilst the engagement opening 166 is formed in the head supporting arm 141. However, the relative positions of the engagement end 167 and the engagement opening 166 may be reversed, that is, thea 142 superposed on the head supporting arm 141 may be partially segmented and provided with an engagement lug 171 and an engagement hole 172 engaged by the engagement lug 171 may be provided in the arm securing member 144.

Alternatively, the distal ends of the thrusting supporting pieces 168, 169, protuberantly formed on both lateral sides of the thrusting supporting portion 165 of the arm securing member 144, may be provided with a pair of engagement lugs 174, 174 engaged in paired engagement recesses 173, 173 formed on both lateral sides of the proximal end of the arm supporting piece 142 superposed on the head supporting arm 141, as shown in FIG. 35.

Meanwhile, the head supporting arm 141 is formed in its entirety as an elastic plate spring member so that the arm 141 in its entirety is elastically deformable. Alternatively, an elastic plate spring member may be molded partway with a synthetic resin and a the plate spring member may be partially protruded at a securing portion thereof to the supporting arm mounting piece 135 as well as the distal end thereof carrying the magnetic head element 140 to constitute an elastic flexible portion.

In the magnetic head device 131, connected through the connecting member 132 to the optical pickup device 48 and arranged facing the optical pickup device 48 with the interposition of the optical disc 5 run in rotation by the disc rotating driving unit 41, the head supporting arm 141 is extended over the ceiling plate 62 of the holder 23, as shown in FIG. 8. the head supporting arm 141, extended over the ceiling plate 62 of the holder 23, is rotationally flexed, with rotation of the holder 23, with the securing side thereof to the supporting arm mounting piece 135 as a hinge for rotational flexing.

It is noted that, when recording information signals on the optical disc 5, the magnetic head element 140, carried by the distal end of the head supporting arm 141, is caused to approach to the optical disc into sliding contact with the optical disc 5 in order to apply an external magnetic field to the signal recording area of the disc with a marked magnetic field strength. At this time, the head supporting arm 141 is intruded into the holder 23 through a head introducing aperture 180 provided in the ceiling plate 62 of the holder 23, as shown in FIGS. 8 and 9. The magnetic head element 140, carried by the distal end of the head supporting arm 141 intruded into the holder 23 moved to the recording and/or reproducing position, is intruded into the main cartridge body portion 4 of the disc cartridge 1 held by the holder 23 into sliding contact with the major surface of the optical disc 5 run in rotation within the main cartridge body portion 4.

For reproducing information signals recorded on the optical disc 5, the external magnetic field from the magnetic head device 131 need not be applied, it being only sufficient to scan the signal recording area of the optical disc 5 with a light beam radiated from the optical pickup device 48. Therefore, the magnetic head element 140 is separated away from the major surface of the optical disc 5 to prevent wear and resultant damages caused by sliding contact between the magnetic head element 140 and the optical disc 5. In the halt state in which the rotation of the optical head 5 ceases, the magnetic head element 140 is separated from the major surface of the optical disc 5 so that the head supporting arm 141 is moved to outside of the holder 23.

When ejecting the disc cartridge held by the holder 23 or introducing the disc cartridge into the holder 23, the head supporting arm 141 is moved to the first position outside of the holder 23 to prevent damages to the magnetic head element 140 due to collision thereof against the disc cartridge 1.

In the disc recording and/or reproducing apparatus according to the present invention, there is provided a head uplifting and lowering mechanism 181 for uplifting/lowering the head supporting arm 141 for moving the magnetic head element 140 towards and away from the optical disc 5 responsive to the operating mode. Referring to FIGS. 8 and 9, the head uplifting and lowering mechanism 181 includes an uplifting/lowering plate 182 rotatably supported on the ceiling plate 62 of the holder 23 for uplifting/lowering the head supporting arm 141, a rotation operating lever 183 arranged on the lower surface side of the base member 36 as shown in FIG. 7 for rotationally actuating the uplifting/lowering plate 182, an uplifting/lowering control lever 184 for controlling the rotation of the uplifting/lowering plate 182 and a driving motor 185 for moving the uplifting/lowering control lever 184.

Figure 36:
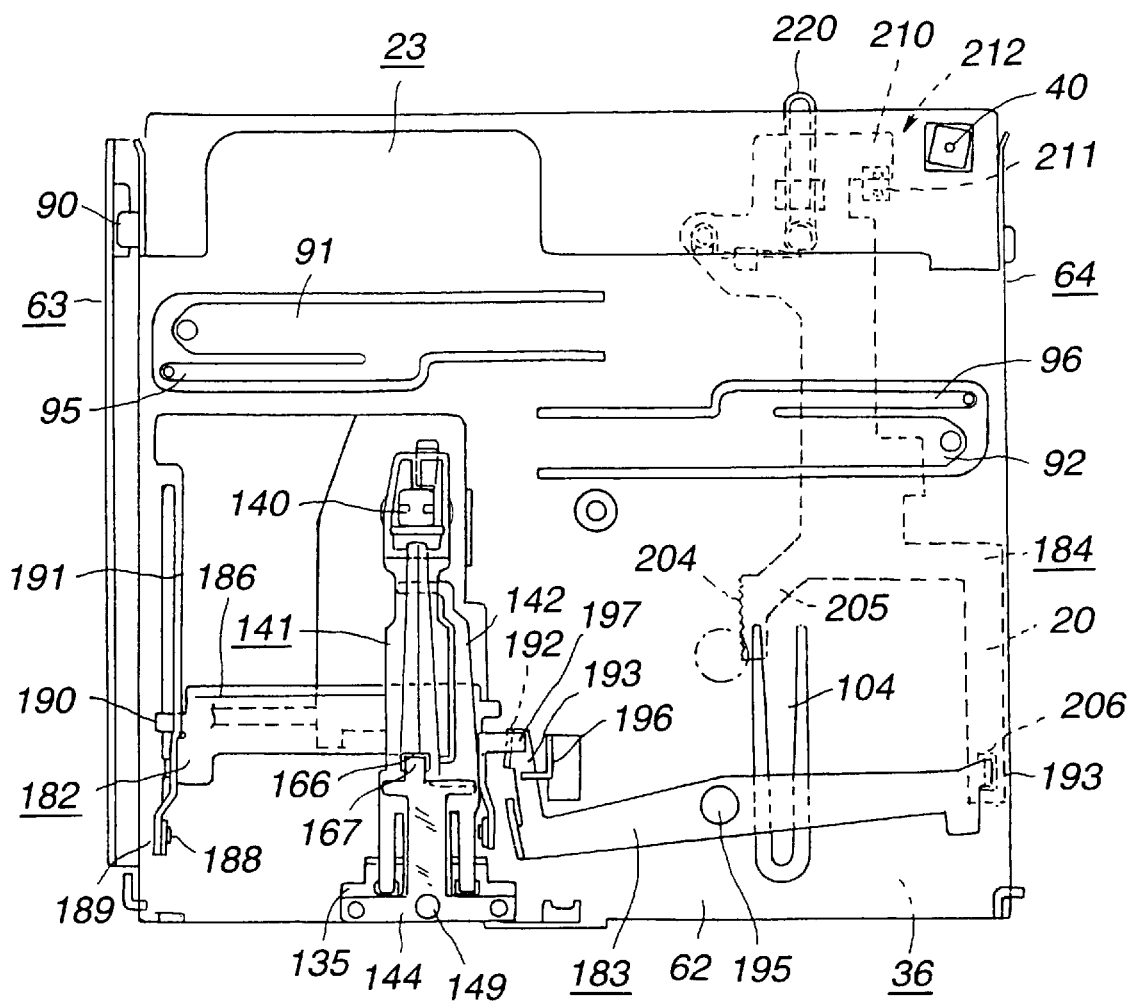
FIG. 36 is a plan view showing an uplifting/lowering actuating mechanism for uplifting/lowering a head supporting arm of the magnetic head device.

The uplifting/lowering plate 182 includes, on the lower surface side of the head supporting arm 141, a rotation actuating portion 186 for causing the rotation of the head supporting arm 141, as shown in FIGS. 9 and 36. From both sides of the proximal end of the rotation actuating portion 186, there are protruded a pair of supporting arms 187, 187. The uplifting/lowering plate 182 is arraigned to overlie the head introducing aperture 180 and is rotatably supported, about pivots 188, 188, protruded on the proximal ends of the supporting arms 187, 187, as the center of rotation, for uplifting/lowering the head supporting arm 141, by pivotally mounting the pivots 188, 188 by rotation supporting pieces 189, 189 formed by partially segmenting the ceiling plate 62. When uplifting/lowering plate 182 is supported on the ceiling plate 62, a lug 190 provided on one side of the rotation actuating portion 186 is thrust and supported by an elastic supporting arm 191 formed by partially cutting off the ceiling plate 62, whereby the uplifting/lowering plate 182 is rotationally biased towards the ceiling plate 62.

Figure 37:
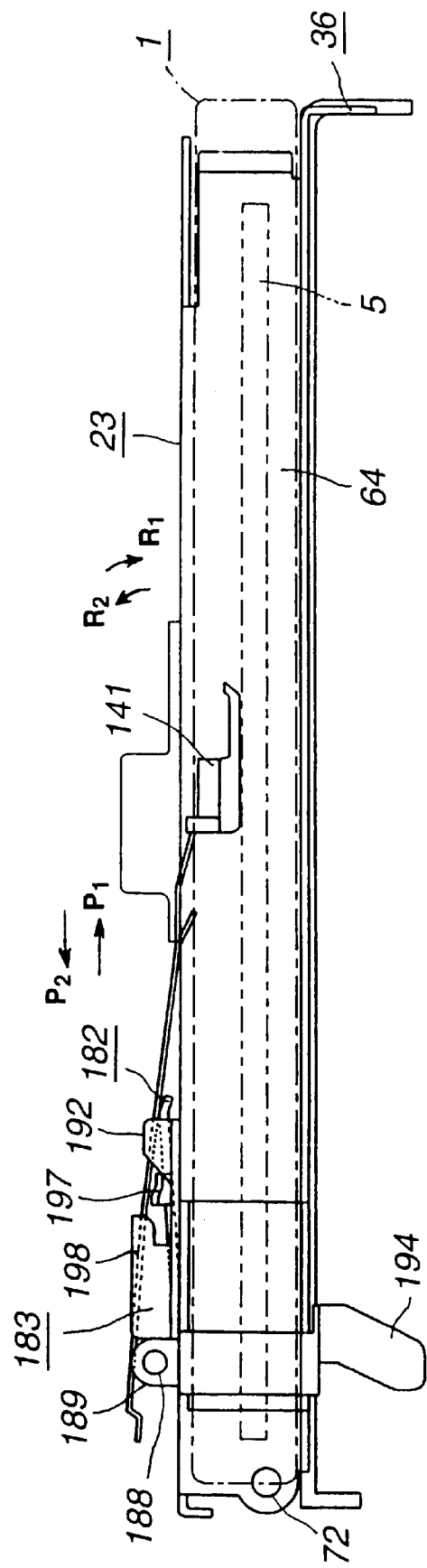
FIG. 37 is a side view showing the state of descent of the head supporting arm.

The rotation operating lever 183 is provided with a rotation actuating piece 193 having an upstanding cam piece 192 on its one end for rotationally actuating the uplifting/lowering plate 182. On the opposite side of the rotation operating lever 183, there is formed, by warping, a connecting piece 194 depending along the second cartridge holding portion 64 of the holder 23 so as to be connected to then uplifting/lowering control lever 184 provided on the lower surface side of the base member 36, as shown in FIG. 37. This rotation operating lever 183 has its mid portion rotatably supported by a pivot 195 mounted on the ceiling plate 62, as shown in FIG. 36. On one side of the rotation actuating piece 193, formed with the cam piece 192 of the rotation operating lever 183, there is superposed an actuatable piece 197 protruded from the rotation actuating portion 186 of the uplifting/lowering plate 182. The actuatable piece 197 rides on the cam piece 192 as the rotation operating lever 183 is run in rotation.

The rotation actuating piece 193 is retained by an L-shaped retainer 196, formed by partially segmenting the ceiling plate 62, to prevent the floating of the rotation operating lever 183 from the ceiling plate 62. On a side of the rotation actuating piece 193 there is provided a rotation control piece 198 which, when the rotation operating lever 183 is rotated to the position of descent in which the rotation operating lever 183 rotates the uplifting/lowering plate 182 towards the holder 23, as shown in FIGS. 8 and 36, is engaged by the actuatable piece 197 provided on the uplifting/lowering plate 182 to restrict the rotation of the uplifting/lowering plate 182 in an upward direction in which the uplifting/lowering plate 182 is spaced apart from the ceiling plate 62.

Figure 40:
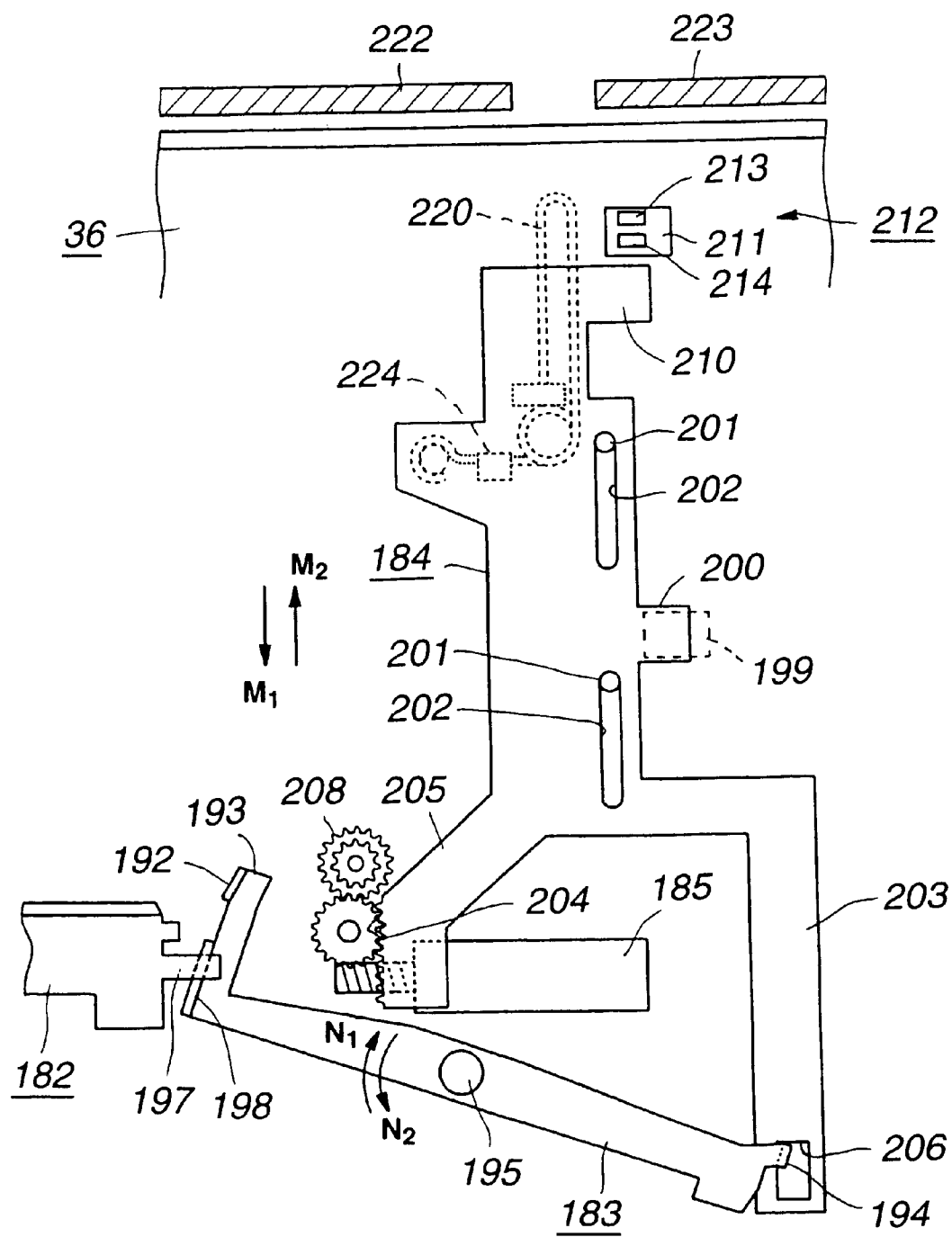
FIG. 40 is a plan view showing the state in which the uplifting control lever has shifted the head supporting arm to its lower position.

The uplifting/lowering control lever 184 is arranged on the bottom surface side of the base member 36 so as to be movable in the direction indicated by arrows M1 and $M_2$ in FIGS. 7 and 40, that is in the fore-and-aft direction within the extent of elongate openings 202, 202 provided in pivots 201, 201 provided in turn on the base member 36, as shown in FIGS. 7 and 40. On one end of the uplifting/lowering control lever 184, there are formed, in a bifurcated fashion, a connection arm 203 connected to the rotation operating lever 183 and a rack plate 205, formed with a rack gear 204, on its lateral side connected to a driving motor 185. In the distal end of the connection arm 203, there is bored an engagement opening 206 into which is intruded the distal end of the connecting piece 194 provided on the opposite end of the rotation operating lever 183 extended to the lower surface side of the base member 36.

The rotation operating lever 183, having the connecting piece 194 connected to the uplifting/lowering control lever 184, is rotated in the directions indicated by arrows $N_1$ and $N_2$ in FIG. 40, about the pivot 195 as the center of rotation, by the uplifting/lowering control lever 184 bing shifted in the directions indicated by arrows $N_1$ and $N_2$ in FIG. 40.

The uplifting/lowering control lever 184 is connected to the driving motor 185 by meshing the rack gear 204 with the last gear of a speed-reducing gear train 208 meshing with a worm gear 207 mounted on the driving shaft of the driving motor 185. As the driving motor 185 is run in rotation, the uplifting/lowering control lever 184 is moved in the directions indicated by arrows $M_1$ or $M_2$ of FIG. 40, depending on the direction of rotation of the driving motor 185 so that the rotation operating lever 183 is run in rotation in the directions indicated by arrows $N_1$ or $N_2$ in FIG. 40 to rotate the uplifting/lowering plate 182 to uplift/lower the head supporting arm 141 to cause the movement of the magnetic head element 140 in a direction towards and away from the optical disc 5.

The head uplifting and lowering mechanism 181 is provided with an uplifting/lowering control mechanism for the magnetic head device 131 which detects the (position of the uplifting/lowering control lever 184 to control the driving direction of the driving motor 185 based on the detected output, to cause movement of the magnetic head element 140 to a lowered position approaching the optical disc 5 or to an uplifted position spaced apart from the optical disc 5. This uplifting and lowering mechanism includes a detection mechanism 212 made up of a detection piece 210 protruded on one side of the opposite end side of the uplifting/lowering control lever 184 and a detection element 211 for detecting the position of the detection piece 210, as shown in FIG. 40. The detection element 211 is a photodetector such as a photocoupler having a light emitting element 213 and a light receiving element 214 parallel to the movement direction of the uplifting/lowering control lever 184.

If the recording mode for information signals is selected, with the uplifting/lowering control lever 184 being at the innermost position of the base member 36, to rotate the rotation operating lever 183 in the direction indicated by arrow $N_2$ in FIG. 40 about the pivot 195 as the center of rotation, the head supporting arm 141 being at a lower position, and with the magnetic head element 140 contacting with the optical disc 5, the detection mechanism 212 is moved to a position in which the detection piece 210 is out of contact with the detection element 211, as shown in FIG. 40. If the detection piece 210 is out of contact with the detection element 211, the detection mechanism 212 is in an off-state in which there is no detection output from the detection element 211. That is, if the detection piece 210 is out of contact with the detection element 211, there is no return light radiated by the light-emitting element 213 and reflected back from the detection piece 210, so that no return light is detected by the light-receiving element 214 with the detection element 211 not issuing a detection output.

Meanwhile, if the uplifting/lowering control lever 184 has been moved to a position selecting the recording mode, the holder lock piece 200 provided on one side of the uplifting/lowering control lever 184 is engaged, as shown in FIG. 40, by an engagement piece 199 formed by segmenting a portion of the cartridge supporting piece 68 constituting the second cartridge holding portion 64 of the holder 23, as shown in FIGS. 9 and 11, to restrict the rotation of the holder 23 in a direction away from the base member 36.

Figure 42:
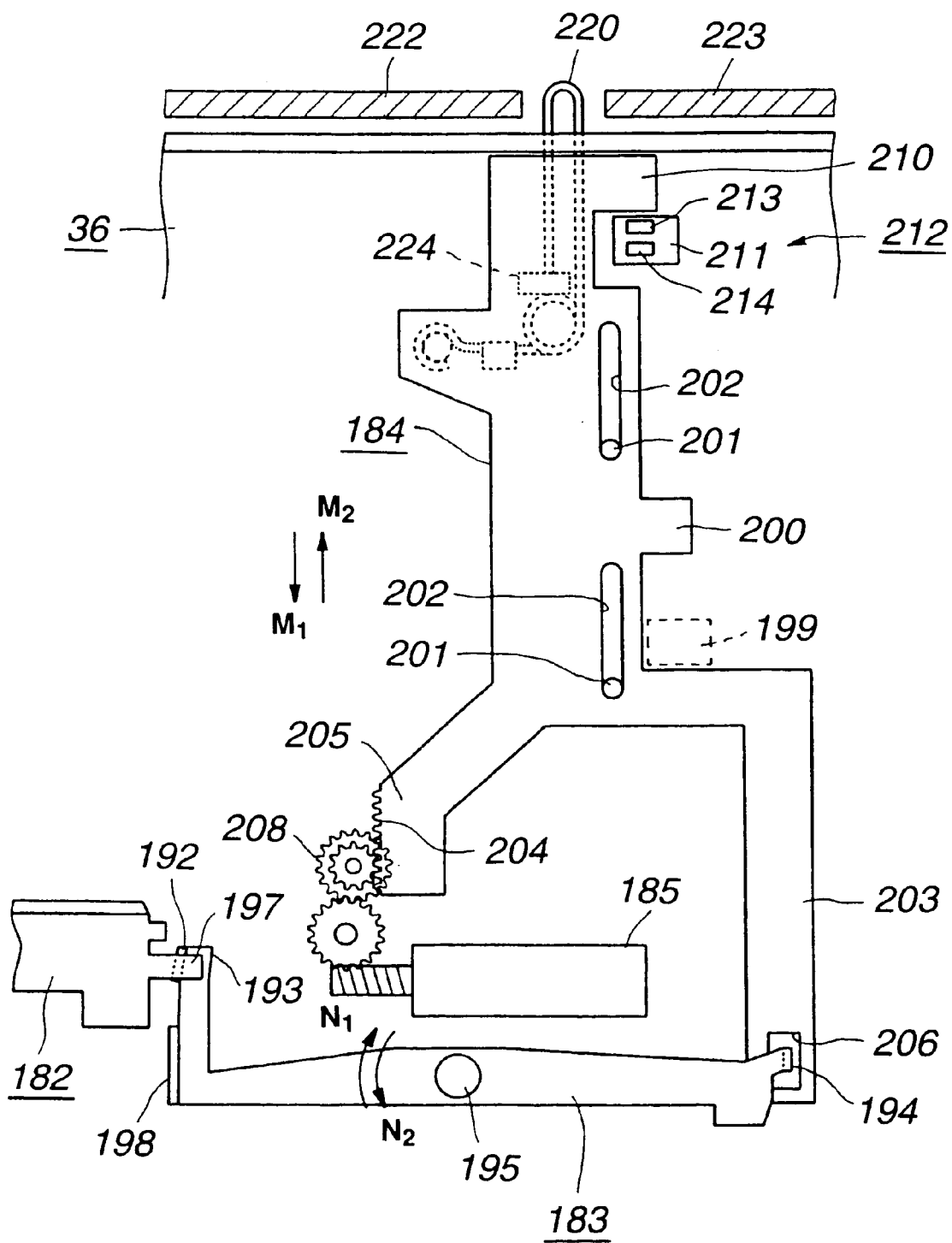
FIG. 42 is a plan view showing the state in which the uplifting control lever has uplifted the head supporting arm.

If the playback mode or the stop mode has been selected, in which the uplifting/lowering control lever 184 has been moved to a position closest to the front surface of the base member 36 to cause rotation of the rotation operating lever 183 about the pivot 195 as the center of rotation in the direction indicated by arrow $N_1$ in FIG. 42 to uplift the head supporting arm 141 to separate the magnetic head element 140 from the optical disc 5, the detection piece 210 is moved t a position out of contact with the detection element 211 to turn off the detection mechanism 212.

Figure 41:
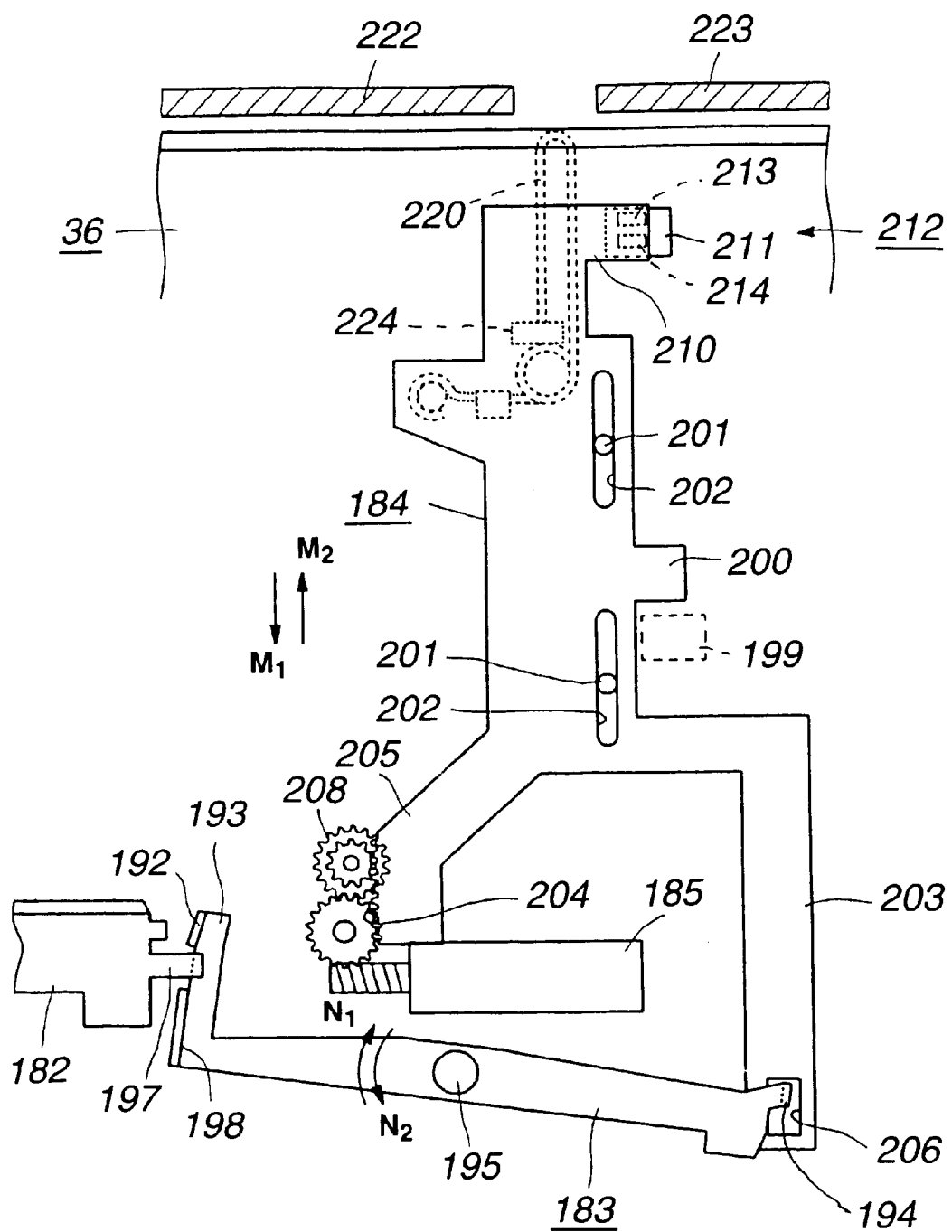
FIG. 41 is a plan view showing the state in which the uplifting control lever is at a mid position.

When the uplifting/lowering control lever 184 is at a position of FIG. 41 intermediate between an innermost position in the base member 36 as shown in FIG. 40 and a position closest to the front side of the base member 36 in FIG. 42, the detection piece 210 faces the detection element 211, the detection light radiated from the light emitting element 211 being reflected back from the detection piece 210 and detected by the light-receiving element 214 to issue a detection output of the detection element 211 to turn on the detection mechanism 212.

The operation of detecting, by this detection mechanism 212, that the operating mode is the stop mode, with the head supporting arm 141 being separated from the optical disc 5 and uplifted to an upper side of the holder 23, is hereinafter explained.

In the present detection mechanism 212, it is verified, in order to detect the position of the uplifting/lowering control lever 184 and the vertical position of the head supporting arm 141, whether or not there is an output from the detection element 211, that is whether the detection mechanism 212 is on or off. This is performed by a control circuit section provided in the disc recording and/or reproducing apparatus. If it is confirmed that a detection output can be issued by the detection element 211 (on-state), it is detected that the uplifting/lowering control lever 184 is at an intermediate position shown in FIG. 41. After detecting that the detection mechanism 212 is in the on-state, it is detected that the uplifting/lowering control lever 184 has been moved towards the front side of the base member 36, with the magnetic head element 140 being away from the optical disc 5 (stop mode).

If, in the initial state of power up, it is confirmed that the detection mechanism 212 is in the off-state, with there being no detection output issued by the detection element 211, it is detected whether the uplifting/lowering control lever 184 is moved to the innermost side of the base member 36 shown in FIG. 40, with the head supporting arm 141 being in the position of descent (recording mode), or the uplifting/lowering control lever 184 is moved to a position closest to the front side of the base member 36 shown in FIG. 42, with the head supporting arm 141 being in the uplifted position (stop mode). The driving motor 185 then is rotationally driving in one direction for causing the movement of the uplifting/lowering control lever 184 in the direction indicated by arrow $M_2$ in FIG. 41. If the detection mechanism 212 continues to be in the off-state even after the driving motor 185 is rotationally driving uni-directionally for a pre-set time duration, it is detected that the uplifting/lowering control lever 184 has been moved to the stop mode position in which the detection mechanism 212 has been moved to a position closest to the front side of the base member 36. If, after the driving motor 185 has been run in rotation uni-directionally for a pre-set time, the detection mechanism 212 is transiently turned on and subsequently the off-state is detected, it is detected that the uplifting/lowering control lever 184 has been moved to a position closest to the front side of the base member 36 shown in FIG. 42 (stop mode position).

In the above-described uplifting/lowering control mechanism for the magnetic head device 131, the position of the uplifting/lowering control lever 184 is detected by the detection mechanism 212 made up of a sole detection piece 210 provided on the uplifting/lowering control lever 184 and a sole detection element 211 detecting the position of the detection piece 210, whilst the driving motor 185 is run in rotation in one direction to cause movement of the uplifting/lowering control lever 184 to a pre-set position, the position of the uplifting/lowering control lever 184 moved to plural positions can be detected by the sole detection mechanism 212 to simplify the structure of the detection mechanism 212 to reduce the mounting space on the disc recording and/or reproducing apparatus to contribute to size reduction of the recording and/or reproducing apparatus.

In the above-described embodiment, in which the uplifting/lowering control lever 184 is moved most significantly to the front surface side of the base member 36, as shown in FIG. 42, to cause movement of the head supporting arm 141 to its elevated position, the magnetic head element 140 can be set to the position spaced apart from the optical disc 5 unless the recording mode is selected to evade inadvertent sliding contact of the magnetic head element 140 with the optical disc 5 to protect the magnetic head element 140 and the optical disc 5.

Although the detection mechanism 212 is made up of the detection element 211 and optical detection means comprised of the light emitting element 213 and the light receiving element 214, a thrusting detection switch, thrust by the detection piece 210 to detect the lever position, may be used as the detection element.

On the opposite side of the uplifting/lowering control lever 184, there is provided an unlock transmitting member 220, adapted for associating a lock lever 222 locking the lid 22 in the position of closing the main body portion 21 with an unlock lever 223 adapted to be moved on thrusting the lid opening actuating button 24, as shown in FIG. 42. This unlock transmitting member 220 is formed by bending a linear spring into a U-shape and is mounted for rotational flexing in a direction perpendicular to the direction of movement of the uplifting/lowering control lever 184 by having its proximal end carried by a support 224 provided on the opposite end of the uplifting/lowering control lever 184.

When the uplifting/lowering control lever 184 is moved to the stop mode position in which the uplifting/lowering control lever 184 has been moved to the front surface side of the base member 36 and the magnetic head element 140 is in a raised position spaced apart from the optical disc 5, the unlock transmitting member 220 is protruded to the front surface side of the base member 36 between the lock lever 222 and the unlock lever 223 to enable the movement operation of the lock lever 222 by the unlock lever 223 moved on thrusting the lid opening actuating button 24, as shown in FIG. 42.

When the uplifting/lowering control lever 184 has been moved to the innermost side of the base member 36, with the magnetic head element 140 being at a position of descent lying closest to the optical disc 5, the unlock transmitting member 220 is protruded to the front side of the base member 36 to enable movement of the lock lever 222 by the unlock lever 223 moved by the thrusting of the lid opening actuating button 24 to enable the unlocking of the lid 22.

When the uplifting/lowering control lever 184 is moved to the innermost side of the base member 36 and the magnetic head element 140 is at the lower position close to the optical disc 5, the unlock transmitting member 220 is receded from between the lock lever 222 and the unlock lever 223 to disable the operation on the lock lever 222.

By having this unlock transmitting member 220, the lid 22 is prohibited from being opened if the magnetic head element 140 has been lowered to the inner position in the holder 23 to permit the magnetic head element 140 to have sliding contact with the optical disc 5, it is possible to prevent inadvertent ejection of the disc cartridge 1 during recording or reproducing information signals thereon to prevent failure in recording the information signals.

The sequence of operations of loading the disc cartridge 1 on the disc recording and/or reproducing apparatus having the above-described structure, information signals are recorded and/or reproduced on or from the optical disc 5 accommodated in the loaded disc cartridge 1 and ejecting the loaded disc cartridge 1 is hereinafter explained.

For loading the disc cartridge 1 on the present disc recording and/or reproducing apparatus, the lid opening actuating button 24 is thrust to unlock the lid 22 which is in the position of closing the main body portion 21.

If, in the present disc recording and/or reproducing apparatus, the recording mode is halted, that is if the stop button is actuated, the driving motor 185 is driven to shift the uplifting/lowering control lever 184 to a position closest to the front side of the base member 36, as shown in FIG. 41, with the magnetic head element 140 being moved to the uplifted position away from the optical disc 5. The unlock transmitting member 220 is intruded to a space between the lock lever 222 and the unlock lever 223 to enable movement of the lock lever 222 subject to actuation of the lid opening actuating button 24.

If the lid 22 is unlocked, the lid 22 is thrust by first and second lid rotation biasing plates 91, 92, provided as-one with the ceiling plate 62 of the holder 22, whereby the lid is rotated in a direction away from the holder 23. The lid 22 is unlocked and the holder 23 is rotated along with the lid 22 to a first uplifted position away from the base member 36 to expose the cartridge entrance/ejection opening 69 on the front side to outside.

At this time, the holder 23 has the engagement piece 86 on the first cartridge holding portion 63 held by the retainer 87 provided on the base member 36 to restrict further rotation in the uplifting direction to prevent the first shaft 73 from being disengaged through the cut-out 75 from the first shaft opening 71 provided in the holder 23.

The disc cartridge 1 then is introduced into the holder 23 through the cartridge entrance/ejection opening 69. The disc cartridge 1 is introduced at this time into the holder 23 with the surface perpendicular to the lateral side carrying the shutter member 10 first.

When the disc cartridge 1 is introduced into the holder 23, the shutter opening member 99 is introduced into the groove 12 provided in the lateral surface of the main cartridge body portion 4 to unlock the shutter member 10, at the same time as the engagement projection 102 provided on the distal end of the shutter member holding piece 101 is engaged in the engagement opening 13 in the shutter member 10 to restrict movement of the shutter member 10.

Figure 26:
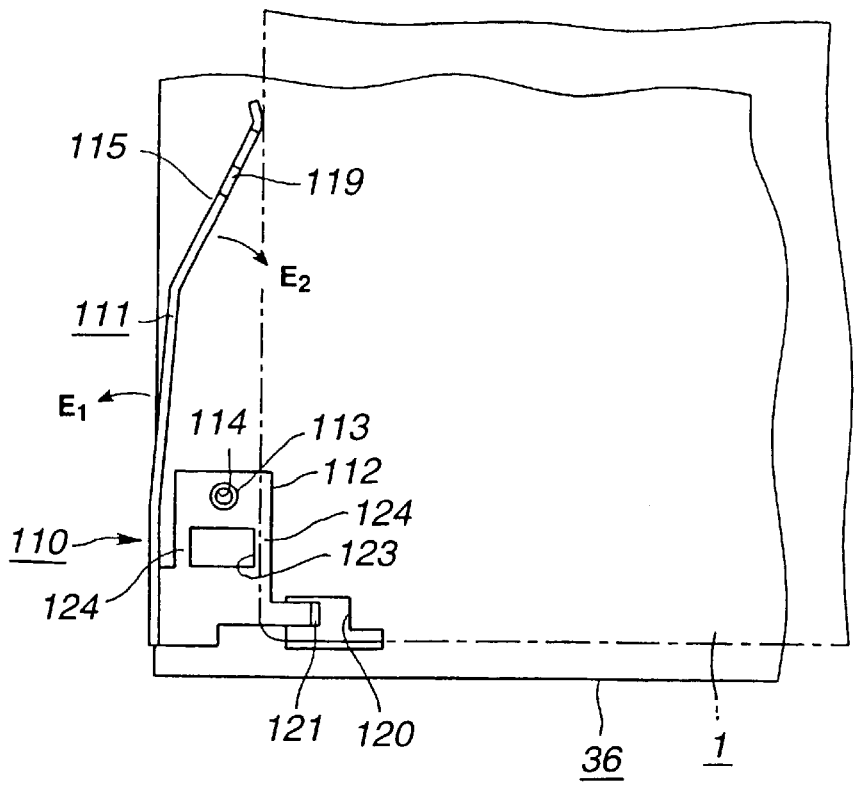
FIG. 26 is a plan view showing the state in which the ejection lever has been thrust and actuated by the disc cartridge intruded into the holder.

If the disc cartridge 1 is further introduced into the holder 23, the thrusting operating portion 115 of the ejection lever 111 is elastically flexed towards the back side of the base member 36 in the direction indicated by arrow $E_1$ in FIG. 26 by the inserting side end of the disc cartridge 1. If the disc cartridge 1 is intruded to a position of holding by the holder 23, the ejection lever 111 has the engagement piece 119 on the thrusting operating portion 115 engaged by a retention opening 118 provided in the back side of the holder 23 so as to be held by the back side of the holder 23 in the stored state of the elastic flexing power to release the force of thrusting the disc cartridge 1 from the holder 23.

If, when the disc cartridge 1 has been inserted to the inserting and holding position of the holder 23, the holder 23 is rotated along with the lid 22 towards the base member 36 lying towards the main body portion 21, the disc cartridge 1 held by the holder 23 is loaded in position on the cartridge loading unit 37 on the base member 36 by having the positioning pins 38, 39 being engaged in the positioning holes 14, 15. The optical disc 5 housed in the disc cartridge 1 then is clamped by the disc table 44 so as to be run in rotation as one with the disc table 44.

If the holder 23 is moved along with the lid 22 to the position of descent which is the second position towards the base member 36, with the lid 22 being moved to the position of closing the main body portion 21 and locked by the lock mechanism provided on the main body portion 21, the first and second paired lid rotation biasing plates 91, 92 provided on the ceiling plate 62 of the holder 23 is thrust by the inner surface of the lid 22 and is elastically flexed so as to be flush with the ceiling plate 62. The first and second cartridge thrusting pieces 95, 96 provided as-one on the first and second paired lid rotation biasing plates 91, 92 are elastically flexed and intruded into the inside of the holder 23 to thrust the disc cartridge 1 loaded in the cartridge loading unit 37 to prohibit floating from the cartridge loading unit 37. At this time, the third cartridge thrusting piece 104 provided on the ceiling plate 62 thrusts the disc cartridge 1 towards the cartridge loading unit 37. The disc cartridge 1 loaded on the cartridge loading unit 37 is thrust and biased by the first and second cartridge thrusting pieces 95, 96 and the third cartridge thrusting piece 104 so as to be thereby positioned correctly in the height-wise direction.

When the disc cartridge 1 is loaded on the cartridge loading unit 37, a playback button, for example, is actuated to turn the power source on the detection mechanism 212 then detects the position of the uplifting/lowering control lever 184, while the driving motor 185 is rotationally driving in one direction to shift the uplifting/lowering control lever 184 to be moved to the front surface of the base member 36 to separate the magnetic head element 140 away from the optical disc 5 (stop mode state).

If the playback button is operated, the playback mode is selected to drive the disc rotating driving unit 41 to run the optical disc in rotation, at the same time as the optical pickup feed unit 56 is driven to shift the optical pickup device 48 along the radius of the optical disc 5 to scan the signal recording area of the optical disc 5 by a light beam radiated from the semiconductor laser to reproduce the information signals recorded on the optical disc 5.

If the recording button is actuated to record information signals ti turn on the power source, the detection mechanism 212 detects the position of the uplifting/lowering control lever 184, at the same time as the driving motor 185 is rotationally driving in one direction to shift the uplifting/ lowering control lever 184 towards the front side of the base member 36 to separate the magnetic head element 140 away from the optical disc 5, as shown in FIG. 42 (stop mode state).

If the recording button is operated and the recording mode selected, the uplifting/lowering control lever 184 transiently is moved to the stop mode position. The driving motor 185 then is rotationally driving in the other reverse direction to shift the uplifting/lowering control lever 184 in the direction indicated by arrow $M_1$ in FIG. 42. If the detection mechanism 212 detects the detection piece 210 to set up the on-state followed by the off state. The uplifting/lowering control lever 184 then is moved to the innermost position in the base member 36 shown in FIG. 40 to set the state of descent of the head supporting arm 141.

If the recording mode is selected such that the uplifting/ lowering control lever 184 starts to be moved in the direction indicated by arrow $M_1$ in FIG. 42, the rotation operating lever 183, connected to the uplifting/lowering control lever 184 by the connecting piece 194 being engaged in the engagement opening 206, is rotated in the direction indicated by arrow $N_1$ in FIG. 42, about the pivot 195 as the center of rotation. If the rotation operating lever 183 is rotated in the direction indicated by arrow $N_1$ in FIG. 41, the cam piece 192 provided on one side of the rotation actuating piece 193 is moved towards the front side of the holder 23 in the direction indicated by arrow $P_1$ in FIG. 37. If the cam piece 192 is moved in the direction indicated by arrow $P_1$ in FIG. 38, the actuatable piece 197 of the uplifting/lowering plate 182 positioned on the horizontal plane on the upper side of the cam piece 192 is moved along the inclined surface of the cam piece 192 towards the lower side and positioned on the rotation actuating piece 193. If the actuatable piece 197 is moved to the lower side under the guidance of the cam piece 192, the uplifting/lowering plate 182 is rotated towards the ceiling plate 62 of the holder 23 in the direction indicated by arrow $R_1$ in FIG. 37 about the pivots 188, 188 as the center of rotation. That is, since the uplifting/lowering plate 182 is rotationally biased by the elastic supporting arm 191 provided on the holder 23 and by the head supporting arm 141 extended on the uplifting/lowering plate 182 and elastically flexed towards the inside of the holder 23, the actuatable piece 197 is thrust against the cam piece 192. Thus, the uplifting/lowering plate 182 is rotated about the pivots 188, 188 as the center of rotation.

Figure 38:
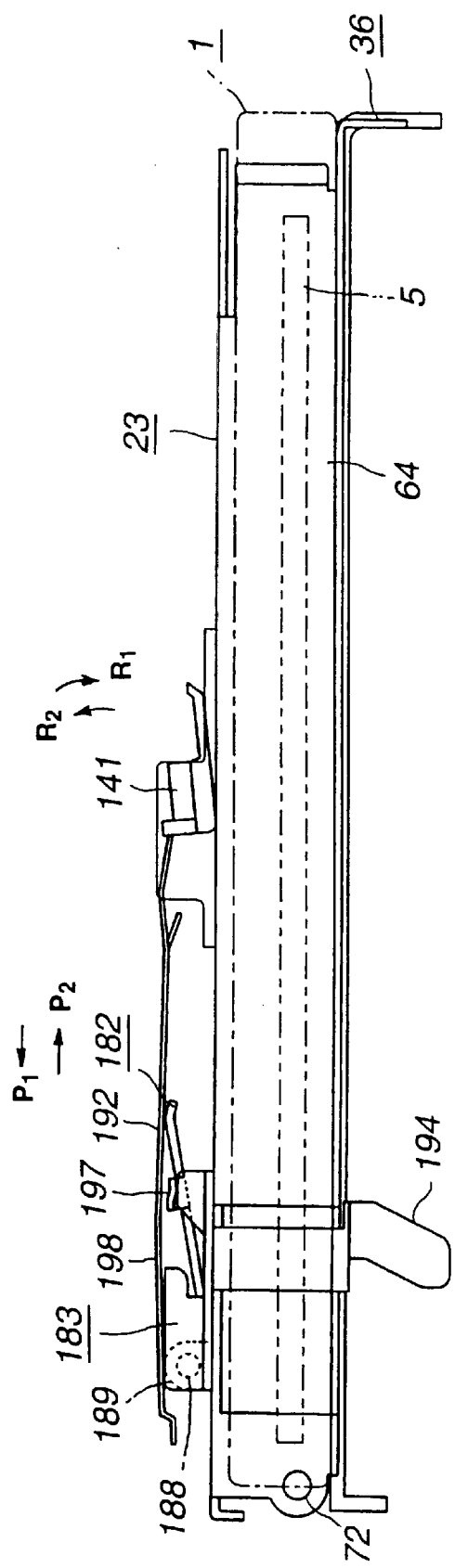
FIG. 38 is a side view showing the uplifted state of the head supporting arm.

If the uplifting/lowering plate 182 is rotated towards the ceiling plate 62 of the holder 23 in the direction indicated by arrow $R_1$ in FIG. 38, the head supporting arm 141 extended over the uplifting/lowering plate 182 is rotated in a lowering direction towards the inside of the holder 23 in the direction indicated by arrow $R_1$ in FIGS. 37 and 38 under the bias of the thrusting supporting portion 165 provided on the arm securing member 144. If the head supporting arm 141 us turned towards the inside of the holder 23, the magnetic head element 140 mounted on the distal end of the head supporting arm 141 is contacted with the major surface of the optical disc 5 clamped on the disc table 44. At this time, the head supporting arm 141 is rotationally biased towards the inside of the holder 23 under the bias of the thrusting supporting portion 165, and hence causes the magnetic head element 140 to be contacted with the optical disc with a pre-set contact pressure.

When the uplifting/lowering plate 182 is rotated to the position of descent, the rotation operating lever 183 causes the actuatable piece 197 provided on the uplifting/lowering plate 182 to be engaged with the rotation control piece 198. The uplifting/lowering plate 182 has its actuatable piece 197 engaged by the rotation control piece 198 so that its upward rotation in the direction away from the holder 23 as indicated by arrow $R_2$ in FIG. 37 is restricted. Therefore, the head supporting arm 141 is kept in its inwardly rotated state to prevent the magnetic head element 140 from being spaced from the optical disc 5 to render it possible to apply the external magnetic field correctly to the optical disc 5 to record the information signals.

If the recording mode in which the uplifting/lowering control lever 184 is moved to the innermost position in the base member 36 shown in FIG. 40 is selected, the engagement piece 199 provided on the holder 23 is engaged with the holder lock piece 200 provided on the uplifting/lowering control lever 184 to restrict the rotation of the holder 23 in the upward direction away from the base member 36 to maintain the disc cartridge in the loaded state on the cartridge loading unit 37.

If it is detected that the recording mode has been selected such that the uplifting/lowering control lever 184 has been moved to the innermost position in the base member 36 shown in FIG. 40, the disc rotating driving unit 41 is driven to run the optical disc 5 in rotation. The optical pickup feed unit 56 starts its operation so that the magnetic head device 131 causes the head supporting arm 140 to be moved along the radius of the optical disc 5 in synchronism with the optical pickup device 48 as the magnetic head element 140 is kept in sliding contact with the optical disc 5. At this time, the light beam radiated from the semiconductor laser of the optical pickup device 48 scans the signal recording area of the optical disc 5, at the same time as the external magnetic field modulated in accordance with the information signals for recording is applied from the magnetic head element 140 to the position of the optical disc illuminated by the light beam to record the information signals.

If, after recording the desired information signals, the stop button of the disc recording and/or reproducing apparatus is actuated to halt the recording mode, the disc recording and/or reproducing apparatus proceeds to the stop mode after recording the control signals such as address signal of the information signals recorded on the optical disc 5.

When the disc recording and/or reproducing apparatus is changed over from the recording mode top the stop mode, the driving motor 185 is driven unidirectionally to shift the uplifting/lowering control lever 184 towards the front side of the base member 36 as indicated by arrow $M_2$ in FIG. 40. If, as the detection mechanism 212 detects the detection piece 210, the driving motor 185 is turned on transiently and again turned off, the uplifting/lowering control lever 184 is moved to a position towards the front side of the base member 36, as shown in FIG. 42.

If the uplifting/lowering control lever 184 is moved in the direction indicated by arrow $M_2$ in FIG. 40, the rotation operating lever 183 connected to the uplifting/lowering control lever 184 is rotated in the direction indicated by arrow $N_2$ in FIG. 40 about the pivot 195 as the center of rotation. If the rotation operating lever 183 is rotated in this manner, the cam piece 192 provided on one side of the rotation actuating piece 193 is moved towards the back side of the holder 23, as indicated by arrow $P_2$ in FIG. 36. If the cam piece 192 is moved in the direction indicated by arrow $P_2$ in FIG. 37, the actuatable piece 197 of the uplifting/lowering plate 182 rides on the upper horizontal surface of the cam piece 192 along the inclined surface of the cam piece 192. If the actuatable piece 197 rides on the cam piece 192, the uplifting/lowering plate 182 is rotated in the direction away from the ceiling plate 62 of the holder 23, as indicated by arrow $R_2$ in FIG. 37, about the pivots 188, 188 as the center of rotation. If the uplifting/lowering plate 182 is rotated in the direction indicated by arrow $R_2$ in FIG. 37, the head supporting arm 141 extended over the uplifting/lowering plate 182 is rotated in the upward direction away from the inner side of the holder 23 as indicated by arrow $R_2$ in FIGS. 37 and 38 against the bias of the thrusting supporting portion 165 provided on the arm securing member 144. If the head supporting arm 141 is rotated towards the outside of the holder 23, the magnetic head element 140 mounted on the distal end of the head supporting arm 141 is separated from the major surface of the optical disc clamped on the disc table 44 so as to be moved from inside to outside of the holder, as shown in FIG. 38.

At this time, the engagement between the engagement piece 199 provided on the holder 23 and the holder lock piece 200 provided on the uplifting/lowering control lever 184 is released to enable the holder 23 to be rotated in the upward direction away from the base member 36.

If the uplifting/lowering control lever 184 is moved towards the front side of the base member 36, as shown in FIG. 42, the unlock transmitting member 220 is moved to a position between the lock lever 222 and the unlock lever 223 to enable movement of the lock lever 222 subject to actuation of the lid opening actuating button 24.

If now the lid opening actuating button 24 is actuated to unlock the lid 22, the latter is rotated in the direction away from the holder 23, under the bias of the first and second paired lid rotation biasing plates 91, 92 formed as-one with the holder 23, to open the cartridge entrance/ejection opening 69 of the holder 23.

Figure 39:
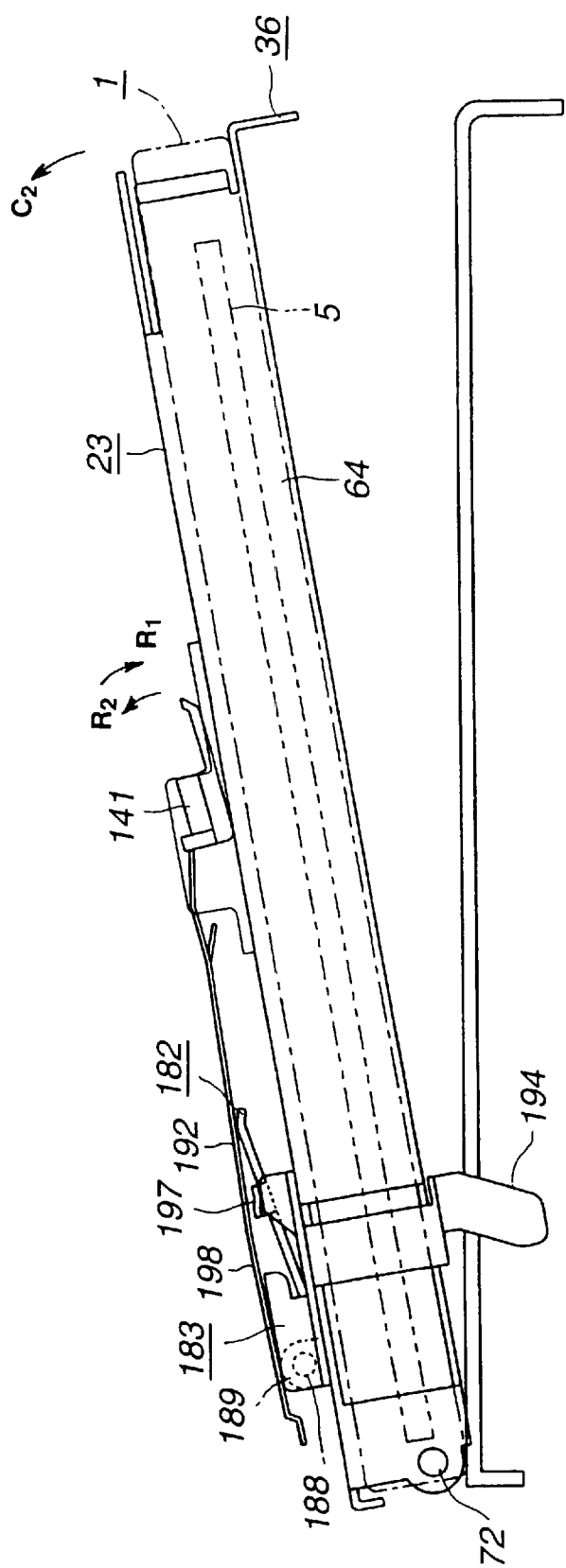
FIG. 39 is a side view showing the head supporting arm when the holder is moved to a position enabling disc cartridge insertion/ejection.

If, as the lid 22 is unlocked and moved away from the holder 23, the latter is rotated in the direction indicated by arrow $C_2$ in FIG. 39 along with the lid 22, the disengagement piece 122 provided on the holder 23 thrusts the engagement piece 121 of the ejection lever 111 in an uplifting direction as indicated by arrow $C_1$ in FIG. 29. If the engagement piece 121 is thrust in the direction indicated by arrow $G_1$ in FIG. 29, the mounting piece 112 is rotated in the direction indicated by arrow $E_2$ in FIG. 27, about the caulking pin 113 as the center of rotation, at the same time as the mounting piece 112 is rotationally flexed way from the base member 36, about the elastic flexing portions 124, 124 as the center of rotation, in the direction indicated by arrow $H_1$ in FIGS. 23 and 28. If the mounting piece 112 is rotationally flexed in the direction indicated by arrow $H_1$ in FIGS. 23, 28, the thrusting operating portion 115 is rotationally flexed in the direction away from the ceiling plate 62 of the holder 23 as indicated by arrow $J_1$ in FIG. 28. If the thrusting operating portion 115 is rotationally flexed in the direction indicated by arrow $J_1$ in FIG. 28, the engagement piece 119 ceases to be engaged with the engagement opening 118. If the engagement piece 119 ceases to be engaged with the engagement opening 118, the thrusting operating portion 115 of the ejection lever 111, in which the force of elastic flexure has been accumulated due to elastic flexure caused by the intrusion of the disc cartridge 1 into the engagement opening 118, is elastically recoiled in the direction indicated by arrow $E_2$ in FIGS. 26, 27 and intruded in this manner into the holder 23 to cause the disc cartridge 1 inserted and held in the holder 23 to outside of the holder 23. The disc cartridge 1 can now be taken out from the holder 23.

In the above-described embodiment, the present invention is applied to an embodiment of the disc recording and/or reproducing apparatus in which the optical disc is used as a recording medium for recording the information signals thereon. However, the present invention can also be applied to a recording and/or reproducing apparatus employing a disc cartridge in which is housed a disc serving as an information signal recording medium.

An ejection mechanism or a holder device applied to the above-described disc recording and/or reproducing apparatus can directly be applied with equal advantages to the replay-only disc player in which there is no necessity of providing a magnetic head device.

Industrial Applicability

In the recording and/or reproducing apparatus according to the present invention, the ejection lever itself is elastically flexible, the ejection lever is elastically flexed by the inserting operation of the disc cartridge into the holder, this ejection lever is engaged with the holder or the base member to maintain the elastically flexed state and the engaged state of the ejection lever is released on ejecting the disc cartridge to permit the disc cartridge to be protruded from the holder. Thus, there is no necessity of providing a biasing member for elastically flexing the ejection lever, while there is no necessity of providing a mechanism for retaining the ejection lever at the elastically flexed state, so that it is possible to reduce the number of component parts nd to simplify the structure to reduce the size of the recording and/or reproducing apparatus.

In the present recording and/or reproducing apparatus, since the uplifting/lowering control device of the magnetic head detects the movement position of the uplifting/lowering lever controlling the uplifting/lowering of the magnetic head by sole detection means, so that it is possible to simplify the structure of the detection means and to reduce the mounting space in the apparatus. Moreover, since the position of the uplifting/lowering lever is detected on power up and control is performed to move the magnetic head to its raised position based on the detected output, it is possible to prevent the magnetic head from being damaged by the subsequent operation to protect the magnetic head.

In addition, since the elastic flexing portion for biasing the lid provided on the holder away from the holder and the elastic flexing portion for holding the shutter member provided on the cartridge holder are mounted as-one with the holder, it is possible to reduce the number of component parts to facilitate the assembling.

Thus, according to the present invention, it is possible to reduce the number of component parts of the recording and/or reproducing apparatus and to simplify the mechanism to reduce the size of the apparatus.

What is claimed is:

1. A recording and/or reproducing apparatus comprising:
   a base member provided on a main body portion of the apparatus and having a loading unit on which is loaded a disc housed in a disc cartridge having a shutter for opening/closing a recording and/or reproducing aperture adapted to cause the disc to face outwards;
   a holder into which is inserted said disc cartridge, said holder being mounted for movement between a first position in which the disc inserted in said disc cartridge is loaded on said rotation driving mechanism and a second position in which the disc housed in said disc cartridge is spaced apart from the rotation driving mechanism, said second position being higher in level than said first position;
   a lid rotationally mounted on said main body portion of the apparatus for rotation along with said holder;
   an ejection lever formed by an elastically flexible lever, said ejection lever being elastically flexed by the disc cartridge inserted into said holder from a position protruded into the holder to the position extending along the back side of the holder;
   a lock mechanism for locking said lid at the position of closing the loading unit;
   said ejection lever when elastically flexed to said position extending along the back surface of the holder being engaged with said holder moved to said first position;
   an optical pickup device movable alone the radius of the disc housed in the disc cartridge loaded on said rotation driving mechanism;
   a magnetic head device mounted on said holder for facing said optical pickup device, said magnetic head device being movable along the radius of said disc as one with said optical pickup device,
   wherein said holder has an opening;
   an uplifting/lowering mechanism for being moved between a position of descent in which the magnetic head device is protruded through said opening into the holder and an uplifted position in which the magnetic head device is moved away from the opening and the holder; and said magnetic head device includes a magnetic head portion and a supporting arm carrying said magnetic head portion on its distal end, said supporting arm being rotationally mounted between said position of descent and said uplifted position, said uplifting/lowering mechanism including an uplifting/lowering portion for rotationally driving said supporting arm, a driving portion for driving said uplifting/lowering portion and a detection portion for detecting the position of said driving portion, said driving portion being controlled in its operation based on a detection output of said detection portion.

2. The recording and/or reproducing apparatus according to claim 1 wherein the engaged state of the ejection lever with the holder is released by movement of said holder towards said second position.

3. The recording and/or reproducing apparatus according to claim 2 wherein said ejection lever is provided with an engagement portion, said holder is provided with a releasing portion engaged with said engagement portion, said holder being moved from said first position to said second position to cause the releasing portion to actuate the engagement portion to release the engaged state of the ejection lever with said holder, said ejection lever being elastically restored towards said projecting position to permit said disc cartridge to be protruded from said holder.

4. The recording and/or reproducing apparatus according to claim 3 wherein the engagement portion of said ejection lever is formed as one with a thrusting actuating portion thrust by the disc cartridge inserted into the holder, and an elastic flexible portion, said engagement portion being actuated by said releasing portion to flex said elastic flexible portion to release the engagement of said ejection lever with said holder.

5. The recording and/or reproducing apparatus according to claim 1 wherein the engagement portion is provided in one of the ejection lever and the holder and a mating engagement portion engaging with said engagement portion is provided in the other of the ejection lever and the holder.

6. The recording and/or reproducing apparatus according to claim 1 wherein said driving portion has a control lever engaged with said uplifting/lowering portion when the holder is at said first position and a motor for driving said control lever, said detection portion detecting the position of said control lever, said motor being controlled in its operation based on a detected result from said detection portion.

7. The recording and/or reproducing apparatus according to claim 6 wherein the engaged state between the uplifting/lowering portion and the control lever is released by said holder being moved towards said second position.

8. The recording and/or reproducing apparatus according to claim 6 wherein said driving portion is rotationally driven in a direction of moving said magnetic head device to said uplifted position temporarily after power up of the apparatus.

9. The recording and/or reproducing apparatus according to claim 8 wherein the position of said magnetic head device is detected by detection of said detection portion of said control lever rotationally driven in the direction of moving said magnetic head device in said uplifted position after the power source of the apparatus is turned on by said driving portion.

10. The recording and/or reproducing apparatus according to claim 9 wherein if a detection output is not acquired from said detection unit on power up of the apparatus, said driving portion is driven in the direction in which the magnetic head device is moved to said uplifted position, said magnetic head portion being positioned at said uplifted position if a detection output from said detection unit is acquired and again the detection output from said detection portion ceased to be acquired.

11. The recording and/or reproducing apparatus according to claim 10 wherein if a detection output is not acquired from said detection unit on power up of the apparatus, said driving portion is driven in the direction in which the magnetic head device is moved to said uplifted position, said magnetic head portion being positioned at said uplifted position if a detection output from said detection unit has not been acquired.

12. The recording and/or reproducing apparatus according to claim 9 wherein if a detection output is acquired from said detection unit on power up of the apparatus, said driving portion is driven in the direction in which the magnetic head device is moved to said uplifted position, said magnetic head portion being positioned at said uplifted position if a detection output from said detection unit is not acquired.

13. The recording and/or reproducing apparatus according to claim 1 wherein said magnetic head device includes a magnetic head portion, a supporting arm carrying said magnetic head portion at its distal end and arranged for rotation between the position of descent and the uplifted position and a biasing portion provided at the proximal end of said supporting arm for biasing said supporting arm towards said position of descent.

14. The recording and/or reproducing apparatus according to claim 1 wherein said holder is integrally formed by an elastic flexing piece comprised of a thrusting portion for thrusting the intruded disc cartridge to said loading unit and a biasing portion for biasing said lid from the closure position in a direction of opening said loading unit, and an opening actuating unit for moving the shutter of the intruded disc cartridge in a direction of opening said recording and/or reproducing aperture.

15. The recording and/or reproducing apparatus according to claim 14 wherein said elastic flexing piece is formed by said thrusting portion and the biasing portion each with urging operating in contrary directions.

16. The recording and/or reproducing apparatus according to claim 14 wherein said holder has a shutter holding portion holding the shutter in the position of opening said recording and/or reproducing aperture.

17. The recording and/or reproducing apparatus according to claim 16 wherein said shutter holding portion is engaged with said shutter to move said shutter in a direction of closing said recording and/or reproducing aperture when said disc cartridge is ejected by said ejection lever.

18. The recording and/or reproducing apparatus according to claim 14 further comprising:
an optical pickup device movable along the radius of the disc housed in the disc cartridge loaded on said loading unit; and
a magnetic head device mounted on said holder for facing said optical pickup device;
said magnetic head device being movable along the radius of said disc as one with said optical pickup device.

19. The recording and/or reproducing apparatus according to claim 18 wherein
said magnetic head device includes a magnetic head portion and a supporting arm carrying said magnetic head portion on its distal end, said supporting arm being rotationally mounted between said position of descent and said uplifted position, said uplifting/lowering mechanism including an uplifting/lowering portion for rotationally driving said supporting arm,
said holder also having an engagement piece engaged with said uplifting/lowering portion.

20. A recording and/or reproducing apparatus comprising:
a base member provided on a main body portion of the apparatus and having a loading unit on which is loaded a disc housed in a disc cartridge having a shutter for opening/closing a recording and/or reproducing aperture adapted to cause the disc to face outwards;
a holder into which is inserted said disc cartridge, said holder being mounted for movement between a first position in which the disc inserted in said disc cartridge is loaded on said rotation driving mechanism and a second position in which the disc housed in said disc cartridge is spaced apart from the rotation driving mechanism, said second position being higher in level than said first position;
a lid rotationally mounted on said main body portion of the apparatus for rotation along with said holder;
a lock mechanism for locking said lid at a position of closing said loading unit;
said holder being integrally formed by an elastic flexing piece comprised of a thrusting portion for thrusting the intruded disc cartridge to said loading unit and a biasing portion for biasing said lid from the closure position in a direction of opening said loading unit, and an opening actuating unit for moving the shutter of the intruded disc cartridge in a direction of opening said recording and/or reproducing aperture;
an optical pickup device movable along the radius of the disc housed in the disc cartridge loaded on said rotation driving mechanism;
a magnetic head device mounted on said holder for facing said optical pickup device, said magnetic head device being movable along the radius of said disc as one with said optical pickup device,
wherein said holder has an opening;
an uplifting/lowering mechanism for being moved between a position of descent in which the magnetic head device is protruded through said opening into the holder and an uplifted position in which the magnetic head device is moved away from the opening and the holder; and
said magnetic head device includes a magnetic head portion and a supporting arm carrying said magnetic head portion on its distal end, said supporting arm being rotationally mounted between said position of descent and said uplifted position, said uplifting/lowering mechanism including an uplifting/lowering portion for rotationally driving said supporting arm, a driving portion for driving said uplifting/lowering portion and a detection portion for detecting the position of said driving portion, said driving portion being controlled in its operation based on a detection output of said detection portion.

21. The recording and/or reproducing apparatus according to claim 20 wherein
said elastic flexing piece is formed by said thrusting portion and the biasing portion each with urging operating in contrary directions.

22. The recording and/or reproducing apparatus according to claim 20 wherein
said holder has a shutter holding portion holding the shutter in the position of opening said recording and/or reproducing aperture.

23. The recording and/or reproducing apparatus according to claim 20 wherein
said shutter holding portion is engaged with said shutter to move said shutter in a direction of closing said recording and/or reproducing aperture when said disc cartridge is ejected by said ejection lever.

24. The recording and/or reproducing apparatus according to claim 20 further comprising:
an optical pickup device movable along the radius of the disc housed in the disc cartridge loaded on said loading unit; and
a magnetic head device mounted on said holder for facing said optical pickup device;
said magnetic head device being movable along the radius of said disc as one with said optical pickup device.

25. The recording and/or reproducing apparatus according to claim 24 wherein
said magnetic head device includes a magnetic head portion and a supporting arm carrying said magnetic head portion on its distal end, said supporting arm being rotationally mounted between said position of descent and said uplifted position, said uplifting/lowering mechanism including an uplifting/lowering portion for rotationally driving said supporting arm,
said holder also having an engagement piece engaged with said uplifting/lowering portion.

26. A recording and/or reproducing apparatus comprising:
a base member provided on a main body portion of the apparatus and having a loading unit on which is loaded a disc housed in a disc cartridge having a shutter for opening/closing a recording and/or reproducing aperture adapted to cause the disc to face outwards;
a holder into which is inserted said disc cartridge, said holder being mounted for movement between a first position in which the disc inserted in said disc cartridge is loaded on said rotation driving mechanism and a second position in which the disc housed in said disc cartridge is spaced apart from the rotation driving mechanism, said second position being higher in level than said first position;
a lid rotationally mounted on said main body portion of the apparatus for rotation along with said holder;
an ejection lever formed by an elastically flexible lever, said ejection lever being elastically flexed by the disc cartridge inserted into said holder from a position protruded into the holder to the position extending along the back side of the holder;

a lock mechanism for locking said lid at the position of closing the loading unit;

said ejection lever when elastically flexed to said position extending along the back surface of the holder being engaged with said holder moved to said first position, an optical pickup device movable along the radius of the disc housed in the disc cartridge loaded on said rotation driving mechanism;

a magnetic head device mounted on said holder for facing said optical pickup device;

said magnetic head device being movable along the radius of said disc as one with said optical pickup device, wherein said holder has an opening;

an uplifting/lowering mechanism for being moved between a position of descent in which the magnetic head device is protruded through said opening into the holder and an uplifted position in which the magnetic head device is moved away from the opening and the holder;

said magnetic head device includes a magnetic head portion and a supporting arm carrying said magnetic head portion on its distal end, said supporting arm being rotationally mounted between said position of descent and said uplifted position, said uplifting/lowering mechanism including an uplifting/lowering portion for rotationally driving said supporting arm, a driving portion for driving said uplifting/lowering portion and a detection portion for detecting the position of said driving portion, said driving portion being controlled in its operation based on a detection output of said detection portion;

said driving portion has a control lever engaged with said uplifting/lowering portion when the holder is at said first position and a motor for driving said control lever, said detection portion detecting the position of said control lever, said motor being controlled in its operation based on a detected result from said detection portion;

said driving portion is rotationally driven in a direction of moving said magnetic head device to said uplifted position temporarily after power up of the apparatus; and the position of said magnetic head device is detected by detection of said detection portion of said control lever rotationally driven in the direction of moving said magnetic head device in said uplifted position after the power source of the apparatus is turned on by said driving portion.

27. The recording and/or reproducing apparatus according to claim 26 wherein if a detection output is not acquired from said detection unit on power up of the apparatus, said driving portion is driven in the direction in which the magnetic head device is moved to said uplifted position, said magnetic head portion being positioned at said uplifted position if a detection output from said detection unit is acquired and again the detection output from said detection portion ceased to be acquired.

28. The recording and/or reproducing apparatus according to claim 27 wherein if a detection output is not acquired from said detection unit on power up of the apparatus, said driving portion is driven in the direction in which the magnetic head device is moved to said uplifted position, said magnetic head portion being positioned at said uplifted position if a detection output from said detection unit has not been acquired.

29. The recording and/or reproducing apparatus according to claim 26 wherein if a detection output is acquired from said detection unit on power up of the apparatus, said driving portion is driven in the direction in which the magnetic head device is moved to said uplifted position, said magnetic head portion being positioned at said uplifted position if a detection output from said detection unit is not acquired.

* * * * *

UNITED STATES PATENT AND TRADEMARK OFFICE
CERTIFICATE OF CORRECTION

PATENT NO. : 6,741,525 B2
DATED : May 25, 2004
INVENTOR(S) : Kurita et al.

It is certified that error appears in the above-identified patent and that said Letters Patent is hereby corrected as shown below:

<u>Title page, Item [54] and Column 1, lines 1-3,</u>
Title, should read -- RECORDING AND/OR REPRODUCING APPARATUS EMPLOYING A DISC CARTRIDGE HAVING A POSITION DETECTION PORTION --

Signed and Sealed this

Twentieth Day of July, 2004

JON W. DUDAS
*Acting Director of the United States Patent and Trademark Office*